US007729940B2

(12) United States Patent
Harvey et al.

(10) Patent No.: US 7,729,940 B2
(45) Date of Patent: Jun. 1, 2010

(54) ANALYZING RETURN ON INVESTMENT OF ADVERTISING CAMPAIGNS BY MATCHING MULTIPLE DATA SOURCES

(75) Inventors: William Morris Harvey, Gardiner, NY (US); Gerald Leo Despain, St. George, UT (US); Mark Lieberman, Thornwood, NY (US); Brian P. Canning, Brooklyn, NY (US); Pavel Bochman, Plainview, NY (US)

(73) Assignee: TRA, Inc., New York, NY (US)

( * ) Notice: Subject to any disclaimer, the term of this patent is extended or adjusted under 35 U.S.C. 154(b) by 0 days.

(21) Appl. No.: 12/102,388

(22) Filed: Apr. 14, 2008

(65) Prior Publication Data

US 2009/0259518 A1    Oct. 15, 2009

(51) Int. Cl.
*G06F 17/30* (2006.01)
*G07G 1/00* (2006.01)

(52) U.S. Cl. .............................. 705/10; 705/14; 705/35; 725/1; 725/9; 725/14; 725/20; 725/34; 725/46

(58) Field of Classification Search ................... 705/10, 705/14
See application file for complete search history.

(56) References Cited

U.S. PATENT DOCUMENTS

| | | |
|---|---|---|
| 3,639,686 A | 2/1972 | Walker et al. |
| 4,225,884 A | 9/1980 | Block et al. |
| 4,331,973 A | 5/1982 | Eskin et al. |
| 4,361,730 A | 11/1982 | Barber et al. |
| 4,528,589 A | 7/1985 | Block et al. |
| 5,483,276 A | 1/1996 | Brooks et al. |
| 5,515,098 A | 5/1996 | Carles |
| 5,579,124 A | 11/1996 | Aijala et al. |
| 5,584,025 A * | 12/1996 | Keithley et al. .......... 707/104.1 |

(Continued)

FOREIGN PATENT DOCUMENTS

WO    WO 03053056 A1 *    6/2003

OTHER PUBLICATIONS

Harvey, Better Television Audience Measurement Through the Research Integration of Set-Top Box Data, (http://web.archive.org/web/20060425131211/www.nextcenturymedia.com/library/index.htm).*

(Continued)

*Primary Examiner*—Beth V. Boswell
*Assistant Examiner*—Nadja Chong Cruz
(74) *Attorney, Agent, or Firm*—K&L Gates LLP

(57) ABSTRACT

In various embodiments, strategies, tools and techniques are provided for processing and analyzing data in an advertising measurement system accessible through a software-as-a-service model or a client-downloaded computer program. The system may be configured to receive and process household media exposure data, product purchase data, advertising data, program data, and demographic data, wherein the data may be obtained from various sources, including from a program delivery source (e.g., a television set-top box) located in a household of a consumer. The data may be matched and cross-correlated for calculating return on advertising investment measurements and other metrics. The data may be used to optimize media placement generally or to address advertising content to specific households. Methods for storing data in the advertising measurement system by distributing the data across multiple shards are also provided. In addition, methods for protecting privacy of communicated data are disclosed.

71 Claims, 51 Drawing Sheets

U.S. PATENT DOCUMENTS

| | | | |
|---|---|---|---|
| 5,661,516 | A | 8/1997 | Carles |
| 5,961,593 | A | 10/1999 | Gabber et al. |
| 6,463,585 | B1 | 10/2002 | Hendricks et al. |
| 6,698,020 | B1* | 2/2004 | Zigmond et al. ............... 725/34 |
| 6,708,335 | B1* | 3/2004 | Ozer et al. .................... 725/20 |
| 6,718,551 | B1 | 4/2004 | Swix et al. |
| 6,738,978 | B1 | 5/2004 | Hendricks et al. |
| 6,958,710 | B2 | 10/2005 | Zhang et al. |
| 6,983,478 | B1 | 1/2006 | Grauch et al. |
| 7,139,723 | B2 | 11/2006 | Conkwright et al. |
| 7,146,329 | B2 | 12/2006 | Conkwright et al. |
| 7,194,421 | B2 | 3/2007 | Conkwright et al. |
| 7,197,472 | B2 | 3/2007 | Conkwright et al. |
| 7,222,071 | B2 | 5/2007 | Neuhauser et al. |
| 7,239,981 | B2 | 7/2007 | Kolessar et al. |
| 7,248,777 | B2 | 7/2007 | Feininger et al. |
| 7,272,982 | B2 | 9/2007 | Neuhauser et al. |
| 7,316,025 | B1 | 1/2008 | Aijala et al. |
| 2002/0013943 | A1 | 1/2002 | Haberman et al. |
| 2002/0049968 | A1 | 4/2002 | Wilson et al. |
| 2002/0059094 | A1* | 5/2002 | Hosea et al. .................. 705/10 |
| 2002/0104083 | A1* | 8/2002 | Hendricks et al. ............. 725/34 |
| 2002/0122430 | A1 | 9/2002 | Haberman et al. |
| 2002/0133817 | A1* | 9/2002 | Markel ........................ 725/23 |
| 2003/0045957 | A1 | 3/2003 | Haberman et al. |
| 2003/0055759 | A1 | 3/2003 | Conkwright et al. |
| 2003/0070167 | A1* | 4/2003 | Holtz et al. ................... 725/32 |
| 2003/0101454 | A1* | 5/2003 | Ozer et al. .................... 725/42 |
| 2003/0105693 | A1 | 6/2003 | Conkwright et al. |
| 2003/0110499 | A1* | 6/2003 | Knudson et al. ............... 725/42 |
| 2003/0142689 | A1 | 7/2003 | Haberman et al. |
| 2003/0145323 | A1* | 7/2003 | Hendricks et al. ............. 725/34 |
| 2003/0172374 | A1 | 9/2003 | Vinson et al. |
| 2003/0229893 | A1* | 12/2003 | Sgaraglino ................... 725/37 |
| 2005/0228806 | A1 | 10/2005 | Haberman |
| 2005/0234992 | A1 | 10/2005 | Haberman |
| 2006/0195866 | A1* | 8/2006 | Thukral ....................... 725/34 |
| 2006/0271594 | A1 | 11/2006 | Haberman |
| 2006/0287915 | A1 | 12/2006 | Boulet et al. |
| 2006/0293954 | A1 | 12/2006 | Anderson et al. |
| 2006/0293955 | A1 | 12/2006 | Wilson et al. |
| 2007/0011039 | A1* | 1/2007 | Oddo ......................... 705/10 |
| 2007/0022032 | A1 | 1/2007 | Anderson et al. |
| 2007/0073583 | A1 | 3/2007 | Grouf et al. |
| 2007/0073584 | A1 | 3/2007 | Grouf et al. |
| 2007/0073585 | A1* | 3/2007 | Apple et al. .................. 705/14 |
| 2007/0101375 | A1 | 5/2007 | Haberman |
| 2007/0130007 | A1 | 6/2007 | Haberman et al. |
| 2007/0156524 | A1 | 7/2007 | Grouf et al. |
| 2007/0156525 | A1 | 7/2007 | Grouf et al. |
| 2008/0250445 | A1* | 10/2008 | Zigmond et al. ............... 725/32 |
| 2008/0250448 | A1* | 10/2008 | Rowe et al. .................... 725/32 |
| 2009/0030942 | A1* | 1/2009 | Jiang ....................... 707/104.1 |

OTHER PUBLICATIONS

AGB Nielsen Media Research (http://web.archive.org/web/20061225143536/http://www.agbnielsen.net/).*

Chapter 2: Marketing Knowledge, What's inside most relevant when measuring Web ad traffic, The International Journal of Newspaper Technology, Apr. 2006.*

Knight, DigitalPlus to improve Nielsen numbers, Biz Report: Research: Feb. 16, 2007.*

Sean Baird, "Partitioning the Data in a Table," dated Sep. 20, 2000, printed from http://www.sqlteam.com/article/partitioning-the-data-in-a-table, Internet site, accessed on Feb. 24, 2009, 5 pages.

"Partition (database)—Wikipedia, the free encyclopedia," printed from http://en.wikipedia.org/w/index.php?title=Partition_(database)&oldi, Internet site, accessed on Feb. 24, 2009, 2 pages.

Bill Harvey, "A Channel is A Channel is A Channel, Not," printed from http://www.nextcenturymedia.com/library/myers_channel-new.htm, Internet site, accessed on Mar. 11, 2008, 2 pages.

Next Century Media, Inc., "AdSpace—CoolSign Advertising Effectiveness Study," Nov. 2000, printed from http://www.nextcenturymedia.com/library/adspace.htm, Internet site, accessed on Mar. 11, 2008, 1 page.

Next Century Media, Inc., "AdSpace—CoolAdvertising On CoolSign® Digital Displays Delivers Impressive Results," Jan. 24, 2002, printed from http://www.nextcenturymedia.com/library/adspace-2002.htm, Internet site, accessed on Mar. 11, 2008, 2 pages.

Bill Harvey, "Cable Advertising Revenue and Addressable Commercials," *CTAM Quarterly Journal*, Spring 1997, pp. 14-23.

Next Century Media, Inc., "Evoice Interactive Audio Ads Deliver Impressive Early Results For Procter & Gamble's Pringles Brand," Sep. 12, 2000, printed from http://www.nextcenturymedia.com/library/evoice-audioads.htm, Internet site, accessed on Mar. 11, 2008, 2 pages.

Bill Harvey, "Is There Life After CPMs?" Dec. 8, 2000, printed from http://www.nextcenturymedia.com/library/cpms-article.htm, Internet site, accessed on Mar. 11, 2008, 2 pages.

Bill Harvey, "The Expanded ARF Model: Bridge to the Accountable Advertising Future," *Journal of Advertising Research*, Mar. • Apr. 1997, pp. 11-20.

Doug Ross, "Targeted Television Advertising," printed from http://www.nextcenturymedia.com/library/dougross-article-b.htm, Internet site, accessed on Mar. 11, 2008, 13 pages.

Bill Harvey, "Better Television Audience Measurement Through the Research Integration of Set-Top Box Data, Phase Two," ESOMAR® / ARF, 21 pages.

Bill Harvey, "Measuring the Effects of Sponsorships," *Journal of Advertising Research*, Jan. • Feb. 2001, pp. 59-65.

Adapt Media, Inc., "adrunner® Digital Taxi Tops Advertising can equal or surpass recall of television spots, according to a new survey," Press Release dated Sep. 13, 2004, 3 pages.

Bill Harvey, "Upfront 2005," *The Myers Report*, Dec. 20, 1999, printed from http://www.nextcenturymedia.com/library/myers-2005.htm, Internet site, accessed on Mar. 11, 2008, 2 pages.

"TRA—True ROI Accountability," printed from http://www.traglobal.com, Internet site, accessed on May 1, 2008, 1 page.

"TRA—What we do," printed from http://www.traglobal.com/whatwedo.html, Internet site, accessed on May 1, 2008, 1 page.

"TRA—FAQs," printed from http://www.traglobal.com/FAQ.html, Internet site, accessed on May 1, 2008, 3 pages.

"TRA Introduces Media TRAnalytics 2.0," Press Release dated Apr. 28, 2008, 2 pages.

"MediaVest USA First Agency Employing TRA Solution to Marry Demo, Behavioral and Sales Data," Press Release dated Apr. 24, 2008, 2 pages.

"TRA's Bill Harvey Honored with Advertising Research Foundation's 2008 Great Mind Award," Press Release dated Apr. 7, 2008, 2 pages.

"New Media Research Firm TRA Matches the Ads People actually Receive with the Products They Actually Buy," Press Release dated Feb. 11, 2008, 2 pages.

David Goetzl, Joe Mandese, "On Eve Of TV Upfront, Neilsen Ratings Remain Unaccredited," *Media Post Publications*, printed from http://publications.mediapost.com/index.cfm?fuseaction=Articles.showArticleHomePage&art_aid=82374, Internet site, Accessed on May 13, 2008, 3 pages.

Joe Mandese, "Ever The Malcontent, Starcom MediaVest Turns Attention To Consumer Intent," May 1, 2008, printed from http://publications.mediapost.com/index.cfm?fuseaction=Articles.san&s=81745&Nid=42198&p=920120, Internet site, accessed on May 13, 2008, 3 pages.

Robert Marich, "MediaVest USA Takes TRA Consumer Data," Apr. 25, 2008, printed from http://www.broadcastingcable.com/index.asp?layout=articlePrint&articleID=CA6555169, Internet site, accessed on May 13, 2008, 1 page.

Shahnaz Mahmud, "MediaVest Partners With TRA on TV Data," Apr. 25, 2008, printed from http://www.adweek.com/aw/content_display/news/media/e3iddd17cfbd71296b9f681c858cfbb6d7d, Internet site, accessed on May 13, 2008, 1 page.

"MediaVest signs up for TRA's ad ROI service," printed from http://www.research-live.com/news_story.aspx?pageid=30&r=y&newsid=4557, Internet site, accessed on May 1, 2008, 2 pages.

"MediaVest Signs First for TRA's New Service," printed from http://www.mrweb.com/drno/news8268.htm, Internet site, accessed on May 1, 2008, 1 page.

"The roots of ROI: the new single-source," *Admap Audience Measurement Technology*, Apr. 2008, pp. 12-13.

Katy Bachman, "MediaVest Signs On to TRA Service," dated Apr. 23, 2008, printed from http://www.mediaweek.com/mw/news/recent_display.jsp?vnu_content_id=1003793746, Internet site, accessed on May 1, 2008, 3 pages.

"MediaVest TRA Partner To Measure Ad Effectiveness," dated Apr. 24, 2008, printed from http://publications.mediapost.com/index.cfm?fuseaction=Articles.showArticleHomePage&art_aid=81295, Internet site, accessed on May 1, 2008, 1 page.

Katy Bachman, "TRA Adds TV Viewing, Shopping Measure," dated Feb. 12, 2008, printed from http://www.mediaweek.com/mw/news/media_agencies/article_display.jsp?vnu_content_id=1003710014, Internet site accessed on May 1, 2008, 2 pages.

Stephanie Kang, "Couch to Supermarket: Connecting the Dots—New Firm Will Match Data From Cable Boxes, Frequent-Shopper Cards," *The Wall Street Journal*, Feb. 11, 2008, p. B7.

Brian Tarran, "TRA lifts the veil to reveal new advertising ROI system," dated Feb. 11, 2008, printed from http://www.research-live.com/news_story.aspx?pageid=30&r=y&newsid=4238, Internet site accessed on May 1, 2008, 1 page.

"Arbitron Cuts Forecast after Pulling Apollo Plug," dated Feb. 26, 2008, printed from http://www.mrweb.com/drno/news8011.htm, Internet site, Accessed on May 1, 2008, 1 page.

"TRA—Products" printed from http://www.traglobal.com/products.html, Internet site, accessed on May 1, 2008, 1 page.

"TRA—v1.0," printed from http://www.traglobal.com/tra10.html, Internet site, accessed on May 2, 2008, 1 page.

"TRA—Media TRAnalytics v2.0," printed from http://www.traglobal.com/tra20.html, Internet site, accessed on May 2, 2008, 9 pages.

"TRA—Media TRAnalytics v2.0," printed from http://traglobal.com/tra20.html, Internet site, accessed on May 6, 2008, 5 pages.

"TRA—TAM Reports," printed from http://www.traglobal.com/tamrprts.html, Internet site, accessed on May 2, 2008, 1 page.

"TRA—ROI Reports," printed from http://www.traglobal.com/roirprts.html; Internet site, accessed on May 2, 2008, 1 page.

"TRA—Unique Technology," printed from http://www.traglobal.com/uniteq.html, Internet site, accessed on May 2, 2008, 2 pages.

"TRA—Marketplace—Television Measurement," printed from http://www.traglobal.com/marketplace.html, Internet site, accessed on May 2, 2008, 1 page.

"TRA—Marketplace—Possible solutions," printed from http://www.traglobal.com/marketplaceSol.html, Internet site, accessed on May 2, 2008, 1 page.

Megan McIlroy, "Another piece That Aims to Solve ROI Puzzle," *Advertising Age*, Apr. 23, 2008, printed from http://adage.com/print?article_id=12661, Internet site, accessed on Jul. 14, 2008, 2 pages.

Bill Harvey, *Media Science Newsletter*, New York, vol. 1, No. 2, May 1-14, 1979, 4 pages.

Bill Harvey, *Media Science Newsletter*, New York, vol. 1, No. 15, Nov. 15-30, 1979, 4 pages.

Bill Harvey, Tony Jarvis, Russ Booth, "Better Television Audience Measurement Through Cable and Satellite Set Top Boxes," presentation to ESOMAR/ARF Week of Audience Measurement Television Conference, Jun. 9-14, 2002, 22 pages.

Bill Harvey, Tony Jarvis, Russ Booth, "Better Television Audience Measurement Through Cable and Satellite Set Top Boxes," Powerpoint presentation to ESOMAR/ARF Jun. 10, 2002, 40 pages.

"TRA's Media TRAnalytics™ Enables Media Buying Based on Sales, Not Just Impressions," Press Release dated Nov. 10, 2008, 2 pages.

"TRA Meets Year-End Momentum with Expansion of Executive Team and Advisory Board," Press Release dated Dec. 8, 2008, 2 pages.

\* cited by examiner

| Ad Schedule | | | | |
|---|---|---|---|---|
| Field | Field Definition | Field Type | Max Character Length | Example |
| Campaign Name | Name of an advertising campaign. | alphanumeric | 200 | Wheaties2000 |
| Duration | Number of seconds of content in the ad | integer | 4 | 30 |
| ScheduleOfAirings | List ID of channel/starttime list | char | 32000 | 23234,34345 |
| PurchLevelDesignator | National or Local purchase | char | 1 | L |
| Markets | List of markets for Local Ads | char | 32000 | Los Angeles |
| MSO-Zones | List of MSO-Zones for local Ads | char | 32000 | |
| Cost | Cost Paid for Ad Campaign | numeric | 8 | 150000 |
| ExpectedGRP | Expected Gross Rating Points | numeric | 4 | 2.7 |

FIG. 8

| UPC Code | CATEGORY | Product | Product Description |
|---|---|---|---|
| 1 | 1 | 1 | Cereal (Baby) |

FIG. 9A

| UPC Code | Product | Brand |
|---|---|---|
| 1 | 1 | Wheaties |

FIG. 9B

| PDI (Category and Product codes) | | | |
|---|---|---|---|
| Field | Field Definition | Field Type | Max. Character Length | Example |
| CategoryID | | numeric | 10 | 0003 |
| ProductID | | numeric | 10 | 0004 |
| Product Description | | numeric | 150 | Cereal (Baby) |

FIG. 9C

| Attr | Col | Type | Size | Comment |
|---|---|---|---|---|
| FK | Viewing_Start | Int | 4 | seconds since 1/1/2000 |
| FK | HHSTB | Int | 4 | Composed of<br>- HH (1 <= 268,435,455 = xFFFFFFF) - 3.5 bytes<br>- STB (1 <= 15) - 0.5 byte |
| FK | Ad Airing | smallint | 2 | |
| FK | Associated Program | smallint | 2 | |
| | Viewing Duration | tinyint | 1 | Seconds |
| | Jump in Second | tinyint | 1 | |
| | Stay Away Seconds | smallint | 2 | |
| Total | | | 16 | |

FIG. 10

| Attr | Col | Type | Size | Comment |
|---|---|---|---|---|
| FK | Start | int | 4 | seconds since 1/1/2000 |
| FK | Program Airing | smallint | 2 | |
| FK | HHSTB | int | 4 | Composed of<br>- HH (1 <= 268,435,455 = xFFFFFFF) - 3.5 bytes<br>- STB (1 <= 15) - 0.5 byte |
| | Duration | smallint | 2 | seconds |
| Total | | | 8 | |

FIG. 11

| Attr | Col | Type | Size | Comment |
|---|---|---|---|---|
| FK | Household | int | 4 | |
| FK | Product | int | 4 | |
| FK | Transaction Date | smallint | 2 | days only since 1/1/2000 |
| | price | float | 4 | |
| | quantity | smallint | 2 | |
| Total | | | 16 | |

FIG. 12

| Attr | Col | Type | Size (bytes) | Comment | |
|---|---|---|---|---|---|
| Key | ID | int | 4 | 1 <= 268,435,455 = xFFFFFFF) - 3.5 bytes | |
| | ZIP | int | 4 | Zip+4 | |
| | Advertising Zone | tinyint | 1 | | |
| | in ratings | bit | 1 | 0 - no, 1 - yes | |
| | out of ratings from | int | 4 | Second since 1/1/2000 | |
| | out of ratings Duration | smallint | 2 | seconds since from | |
| | Demographics | bit | 15 | Demographics elements bit map | |
| | | | | Length (bits) | Element |
| | | | | 3 | Adult Gender/Age |
| | | | | 2 | Marital Status |
| | | | | 1 | Home Ownership |
| | | | | 3 | Length of Residence |
| | | | | 3 | Household Income |
| | | | | 4 | Current State Family Income Deciles |
| | | | | 8 | Home Purchase Value |
| | | | | 8 | DWELLING UNIT SIZE |
| | | | | 3 | DWELLING TYPE |
| | | | | 3 | Education Level |
| | | | | 3 | Occupation Group |
| | | | | 5 | Occupation Type |
| | | | | 2 | Car Buyer's Behavior |
| | | | | 3 | Credit Card Ownership |
| | | | | 1 | Cat Ownership |
| | | | | 1 | Dog Ownership |
| | | | | 2 | Investment Holdings |
| | | | | 2 | PC/Internet Usage |
| | | | | 2 | Purchase Categories |
| | | | | 4 | Current Market Value of Home |
| | | | | 8 | Ethnic Group |
| | | | | 8 | Language Preference |
| | | | | 2 | Ratio of Persons to Households |
| | | | | 3 | Hispanic-Age/Gender |
| | | | | 3 | Hispanic-Household Income |
| | | | | 3 | Hispanic Assimilation |
| | | | | 1 | Presence of Children (Ages 0-18) |
| | | | | 3 | Number of Children in HH |
| | | | | 3 | Children's Age Range/Gender |
| | | | | 4 | MOSAIC Group Type |
| | | | | 3 | Shopping Behavior |

FIG. 13

| Attr | Col | Type | Size | Comment |
|---|---|---|---|---|
| PK | ID | smallint | 2 | 0 - State<br>1 - County<br>2 - Precinct<br>3 - Voting District<br>4 - City<br>5 - Block Group<br>6 - Block<br>7 - Census Block<br>8 - Census Tact<br>9 - DMA |
| | Type Name | tinyint<br>varchar | 1<br>50 | |
| Total | | | 53 | |

FIG. 14A

| Attr | Col | Type | Size | Comment |
|---|---|---|---|---|
| FK | Geographic Area | smallint | 2 | |
| FK | Zip | Int | 4 | |
| Total | | | 6 | |

FIG. 14B

| Attr | Col | Type | Size | Comment |
|---|---|---|---|---|
| | | | | Composed of<br>- HH (1 <= 268,435,455 = xFFFFFFF) - 3.5 bytes<br>- STB (1 <= 15) - 0.5 byte |
| Key | HHSTB | int | 4 | |
| Key | Start Time | int | 4 | seconds from 1/1/2000 |
| Key | Duration | smallint | 2 | seconds from Start Time |
| Key | Channel | smallint | 2 | |
| Total | | | 12 | |

FIG. 15

| Attr | Col | Type | Size | Comment |
|---|---|---|---|---|
| PK | ID | smallint | 2 | |
| FK | Campaign | smallint | 2 | |
| FK | Name | smallint | 2 | String dictionary |
| | Cost Type | Tinyint | 1 | 1 - CPM, 2 - CPP, 3 - total cost, or 0 - GRP |
| | Cost | Float | 4 | |
| | Expected GRP | Float | 4 | |
| Total | | | 15 | |

FIG. 16

| Attr | Col | Type | Size | Comment |
|---|---|---|---|---|
| Key | ID | int | 4 | |
| FK | Ad | smallint | 2 | |
| | Scheduled Channel | smallint | 2 | |
| | Scheduled Start Time | int | 4 | seconds from 1/1/2000 |
| | Scheduled Duration | smallint | 2 | seconds from Start Time |
| | Actual Channel | smallint | 2 | |
| | Actual Start Time | int | 4 | seconds from 1/1/2000 |
| | Actual Duration | smallint | 2 | seconds from Start Time |
| | Associated Program | smallint | 2 | |
| | Pod Position in Program | tinyint | 1 | |
| | Ad Position in Pod | tinyint | 1 | |
| Total | | | 26 | |

FIG. 17

| Attr | Col | Type | Size | Comment |
|---|---|---|---|---|
| Key | ID | smallint | 2 | |
| | Name | smallint | 2 | String dictionary |
| | Purch Level Designator | | | |
| | DMA | tinyint | 1 | |
| | MSO Zone | smallint | 2 | |
| | Cost Type | tinyint | 1 | 1- CPM, 2 - CPP, 3 - total cost, or 0 - GRP |
| | Cost | int | 4 | |
| | Expected GPR | float | 4 | |
| | Product | smallint | 2 | |
| Total | | | 14 | |

FIG. 18

| Attr | Col | Type | Size | Comment |
|---|---|---|---|---|
| Key | ID | smallint | 2 | |
| | Network | smallint | 2 | Dictionary index |
| | Name | smallint | 2 | |
| Total | | | 6 | |

FIG. 19

| Attr | Col | Type | Size | Comment |
|---|---|---|---|---|
| Key | ID | smallint | 2 | |
| | Name | varchar | 50 | Full name of organization (required) |
| | Street address | varchar | 50 | Address and location information |
| | City | smallint | 2 | Dictionary index |
| | ZIP Code | int | 4 | |
| | Contact name | varchar | 50 | Primary contact information |
| | Contact phone | varchar | 50 | |
| | Contact email | varchar | 50 | |
| | Contact mobile | varchar | 50 | |
| | status | bit | 1 | 1 - active, 0 – inactive |
| | entitlements | int | 4 | Bitmap<br>0 - report1<br>1 - report2<br>...<br>n - report n |
| Total | | | 313 | |

FIG. 20

| Attr | Col | Type | Size | Comment |
|---|---|---|---|---|
| Key | ID | tinyint | 1 | |
| | Name | varchar | 50 | |
| | Day | tinyint | 1 | Day of week |
| | Start | tinyint | 1 | Hour of day |
| | End | tinyint | 1 | Hour of day |
| Total | | | 51 | |

| Attr | Col | Type | Size (bytes) | Comment |
|---|---|---|---|---|
| Key | ID | smallint | 2 | |
| | Name | varchar | 50 | |
| | Call Letters | varchar | 8 | |
| Total | | | 52 | |

FIG. 23

| Attr | Col | Type | Size | Comment |
|---|---|---|---|---|
| Key | ID | smallint | 2 | |
| | Name | varchar | 50 | |
| Total | | | 52 | |

FIG. 24

| Attr | Col | Type | Size | Comment |
|---|---|---|---|---|
| Key | id | int | 4 | |
| | Category | smallint | 2 | Dictionary index |
| | UPC | bigint | 8 | |
| | Manufacturer | smallint | 2 | Dictionary index |
| | Brand | smallint | 2 | Dictionary index |
| | Mfg. Name | smallint | 2 | Dictionary index |
| | Description | smallint | 2 | Dictionary index |
| Total | | | 22 | |

| Attr | Col | Type | Size | Comment |
|---|---|---|---|---|
| FK | Household | int | 4 | |
| FK | product | int | 4 | |
| FK | Transaction Date | smallint | 2 | days only since 1/1/2000 |
| | price | float | 4 | |
| | quantity | smallint | 2 | |
| Total | | | 16 | |

FIG. 25

| Attr | Col | Type | Size | Comment |
|---|---|---|---|---|
| PK | ID | int | 2 | |
| FK | Airing Date/Time | int | 4 | seconds from 1/1/2000 |
| FK | Program | smallint | 2 | |
| FK | Channel | smallint | 2 | |
| | Time Zone | tinyint | 1 | |
| | Duration | smallint | 2 | seconds |
| Total | | | 11 | |

FIG. 26

| Attr | Col | Type | Size | Comment |
|---|---|---|---|---|
| PK | ID | int | 4 | |
| | Title | smallint | 2 | Dictionary index |
| | Genre | smallint | 2 | Dictionary index |
| | Duration | smallint | 2 | seconds |
| Total | | | 10 | |

FIG. 27

| Attr | Col | Type | Size | Comment |
|---|---|---|---|---|
| PK | ID | smallint | 2 | |
| | User | smallint | 2 | |
| | Name | varchar | 50 | |
| | Saved Date | | | Seconds since 1/1/2000 |
| | Report | smallint | 2 | |
| | Start Time | int | 4 | Seconds since 1/1/2000 |
| | End Time | int | 4 | Seconds since 1/1/2000 |
| | Campaign | smallint | 2 | |
| | Ad | smallint | 2 | |
| | Pod Position in Program | tinyint | 1 | |
| | Ad Position in Pod | tinyint | 1 | |
| | Daypart | tinyint | 1 | |
| | Network | smallint | 2 | |
| | Program Type | tinyint | 1 | |
| | Program | smallint | 2 | |
| | Content Length | smallint | 2 | |
| | ZIP | int | 4 | |
| | Geo Area | smallint | 2 | |
| | Loyalty | tinyint | 1 | |
| | Demographics | bit | 15 | See demographic elements in Households |
| | Reporting Type | smallint | 2 | 0 - Item by item<br>1 - Half-hour<br>2 - Daypart<br>3 - Program<br>4 - Reach/Frequency<br>5 - TTI<br>6 - Ranking<br>7 - Selected Rollups |
| | Selected Column | tinyint | 1 | Rollup or ranking column, depending on Reporting Type |
| | Ranking or Rollup Type | tinyint | 1 | Top 10, 100, ... if ranking or type (see Reporting Type) |
| Total | | | 104 | |

| Attr | Col | Type | Size | Comment |
|---|---|---|---|---|
| PK | ID | smallint | 2 | |
| | Date | int | 4 | Seconds since 1/1/2000 |
| | Network | smallint | 2 | |
| | Surfing Rating | float | 4 | |
| | Name | smallint | 2 | Dictionary index |
| | Length | smallint | 2 | |
| | Environment | smallint | 2 | Dictionary index |
| | Rating | float | 4 | |
| | Rating Index | float | 4 | |
| | % Perfect Play | float | 4 | |
| | % Switch Away | float | 4 | |
| | % Jump In | float | 4 | |
| | % Change | float | 4 | |
| | Stayed Away | float | 4 | |
| | Stay Away Seconds | smallint | 2 | |
| | Modal Second | tinyint | 1 | |
| Total | | | 49 | |

| Attr | Col | Type | Size | Comment |
|---|---|---|---|---|
| PK | ID | Smallint | 2 | |
| | Touchpoint | Smallint | 2 | |
| | Cost | Float | 4 | |
| | #Insertions | Smallint | 2 | |
| | Target Reach % | Float | 4 | |
| | Target Avg Freq | Smallint | 2 | |
| | TRP | Float | 4 | |
| | CPM Targets | Float | 4 | |
| | % of Reached Increasing Purchase of Brand | Float | 4 | |
| | Incremental Sales Dollars as Result of Increasers | Float | 4 | |
| | Sales Dollars among Reached | Float | 4 | |
| | ROI | Float | 4 | |
| | TRA ROI Index | Float | 4 | |
| Total | | | 44 | |

FIG. 30

| Attr | Col | Type | Size | Comment |
|---|---|---|---|---|
| PK | ID | smallint | 2 | |
| | Start Date/Time | int | 4 | Seconds since 1/1/2000 |
| | Start Date/Time | int | 5 | Seconds since 1/1/2001 |
| | Channel | smallint | 2 | |
| | Program | smallint | 2 | |
| | Surfing Rating | float | 4 | |
| | Rating | float | 4 | |
| | Share | float | 4 | |
| | Cume | float | 4 | |
| Total | | | 31 | |

| Key | Col | Type | Size | Comment |
|---|---|---|---|---|
| | HHSTB | int | 4 | Composed of<br>- HH (1 <= 268,435,455 = xFFFFFFF) - 3.5 bytes<br>- STB (1 <= 15) - 0.5 byte |
| | InTab Starting date | int | 4 | Seconds since 2000 |
| | InTab | bit | 27 | InTab bitmap Possible compression: <compression 1/0>,n1,n2,... of 000.../111.../000.../....<br><br>Element / Length (bits)<br>Months 1-6 / 6<br>Weeks 1-26 / 26<br>Days 1-183 / 183<br>Total bits / 215 |
| Total | | | 35 | |

This table combines InTab and Not False Positive, so 1 means that an STB was InTab and it was not false positive, while 0 means that either a STB was not InTab, or it was a False Positive

FIG. 33

| Col | Type | Size | Comment |
|---|---|---|---|
| HHSTB | int | 4 | Composed of<br>- HH (1 <= 268,435,455 = xFFFFFFF) - 3.5 bytes<br>- STB (1 <= 15) - 0.5 byte |
| Start Time | smallint | 4 | seconds since 1/1/2000 |
| Duration | smallint | 2 | seconds after Start Time |
| | | 10 | |

| Col | Type | Size | Comment |
|---|---|---|---|
| ID | smallint | 2 | |
| Client ID | smallint | 2 | TRA sys admins have this = 0 |
| Name | varchar | 50 | |
| Pwd | varchar | 50 | Encrypted |
| Role | tinyint | 1 | 0 – user, 1 – admin |
| Street address | varchar | 50 | Address and location information |
| City | smallint | 2 | Dictionary index |
| ZIP Code | Int | 4 | |
| Phone | varchar | 50 | |
| Email | varchar | 50 | |
| Mobile | varchar | 50 | |
| Status | Bit | 1 | 1 – active, 0 – passive |
| | | 310 | |

FIG. 34

Audience Retention

| Report Period | Jul 02 to Jul 29, 2003 |
|---|---|
| Advertiser | General Mills |
| Brand(s) | Wheat Chex |
| Market: | Atlanta |
| Report | Commercial Rollup |
| Intab HHs | 442 |
| Target Audience | Heavy/Moderate Category Purchasers Who Bought Brand Non-Loyally |

| Network | Audience | Sample Size | Prgrm Rating | Comm Rating | Prgrm CPM | Comm CPM | Perfect Play | Switch Away | Jump In | Modal Switch Away Second |
|---|---|---|---|---|---|---|---|---|---|---|
| BET | Target | 121 | 0.04 | 0.02 | $22.93 | $40.20 | 90.50% | 9.50% | 0.00% | 6 |
|  | Total | 442 | 0.07 | 0.03 | $3.45 | $6.60 | 89.20% | 10.80% | 0.00% | 6 |
| Cartoon | Target | 121 | 0.76 | 0.56 | $12.68 | $17.14 | 99.00% | 1.00% | 0.00% | 6 |
|  | Total | 442 | 0.77 | 0.54 | $3.45 | $4.93 | 96.40% | 3.60% | 0.00% | 3 |
| CMT | Target | 121 | 0.24 | 0.18 | $12.11 | $15.98 | 98.70% | 1.30% | 0.00% | 2 |
|  | Total | 442 | 0.23 | 0.15 | $3.45 | $5.06 | 96.90% | 3.10% | 0.00% | 2 |
| Comedy C | Target | 121 | 0.63 | 0.47 | $8.73 | $11.62 | 93.60% | 4.50% | 1.90% | 6 |
|  | Total | 442 | 0.44 | 0.34 | $3.45 | $4.45 | 93.50% | 5.50% | 1.00% | 12 |
| E! | Target | 121 | 0.16 | 0.1 | $27.45 | $42.95 | 99.40% | 0.60% | 0.00% | 1 |
|  | Total | 442 | 0.34 | 0.26 | $3.45 | $4.52 | 97.70% | 2.30% | 0.00% | 4 |
| ESPN | Target | 121 | 0.58 | 0.39 | $11.00 | $16.40 | 98.70% | 1.30% | 0.00% | 5 |
|  | Total | 442 | 0.51 | 0.43 | $3.45 | $4.05 | 98.60% | 1.40% | 0.00% | 5 |
| ESPN2 | Target | 121 | 0.03 | 0.06 | $30.34 | $13.07 | 100.00% | 0.00% | 0.00% |  |
|  | Total | 442 | 0.06 | 0.04 | $3.45 | $5.56 | 95.70% | 4.30% | 0.00% | 6 |
| MTV | Target | 121 | 0.17 | 0.15 | $18.47 | $20.37 | 96.90% | 1.50% | 1.70% | 6 |
|  | Total | 442 | 0.25 | 0.21 | $3.45 | $3.96 | 92.30% | 7.40% | 0.30% | 1 |
| Sci-Fi | Target | 121 | 0.52 | 0.42 | $9.11 | $11.32 | 96.10% | 3.90% | 0.00% | 3 |
|  | Total | 442 | 0.38 | 0.29 | $3.45 | $4.47 | 95.90% | 4.10% | 0.00% | 3 |

Audience Retention Report

Report Period: July 2, 2007 to July 29 2007
Advertiser: General Mills
Brand: General Mills
Market: Atlanta
Report Name: AR Report
Intab Households: 442
Target Audience: Heavy/Moderate Category Purchases Who Bought Brand Non-Loyally

Details | Chart

☐ Export with Header

*Drag a column header here to group by that column*

| Networ | Audien... | Sample Size | Program Rating | Comm Rating | Program CPM | Comm CPM | Perfect Play | Switch Away | Jump In | Modal Switch Away, Second | Stayed Away | Stay Away Second |
|--------|-----------|-------------|----------------|-------------|-------------|----------|--------------|-------------|---------|---------------------------|-------------|------------------|
| BET | Target | 121 | 0.04 | 0.02 | $22.93 | $40.20 | 90.51% | 9.51% | 0.00% | 6 | 10 | 3.5 |
| BET | Total | 442 | 0.07 | 0.03 | $3.45 | $6.60 | 89.20% | 10.80% | 0.00% | 6 | 10 | 3.5 |
| Cartoon | Target | 121 | 0.76 | 0.56 | $12.68 | $17.14 | 99.00% | 1.00% | 0.00% | 6 | 10 | 3.5 |
| Cartoon | Total | 442 | 0.77 | 0.54 | $3.45 | $4.93 | 96.40% | 3.60% | 0.00% | 3 | 10 | 3.5 |
| CMT | Target | 121 | 0.24 | 0.18 | $12.11 | $15.98 | 98.70% | 1.30% | 0.00% | 2 | 10 | 3.5 |
| CMT | Total | 442 | 0.23 | 0.15 | $3.45 | $5.06 | 96.90% | 3.10% | 0.00% | 2 | 10 | 3.5 |
| Come... | Target | 121 | 0.63 | 0.47 | $8.73 | $11.62 | 93.60% | 4.50% | 0.00% | 6 | 10 | 3.5 |
| Come... | Total | 442 | 0.44 | 0.34 | $3.45 | $4.45 | 93.50% | 5.50% | 0.00% | 12 | 10 | 3.5 |
| E! | Target | 121 | 0.16 | 0.1 | $27.45 | $42.95 | 99.40% | 0.60% | 0.00% | 1 | 10 | 3.5 |
| E! | Total | 442 | 0.34 | 0.26 | $3.45 | $4.52 | 97.70% | 2.30% | 0.00% | 4 | 10 | 3.5 |

Page 1 of 2 (20 Items)   < Prev  [1]  2  Next >

Save

Summary

Start Date: 11/20/2007
Broadcast Period: Broadcast Day
Geographic:
  ⊟ Zip Code
      90650
      92509
      90640
Demographic:
      Essex Homeowner
Groupings:
  ⊟ Grouping
      By Program
Filters:

| HOME | REPORTS | ▲ DEMOGRAPHICS | CAMPAIGNS | PROFILE | PURCHASER TARGETS | INCLUDED MEDIA |

| MARKET | TARGET | CAMPAIGNS | GROUPING | FILTERS | REPORT |

? HELP

AUDIENCE RETENTION REPORT
REPORT PERIOD: JULY 2, 2007 TO JULY 29, 2007
ADVERTISER: GENERAL MILLS
BRAND: GENERAL MILLS
MARKET: ATLANTA
REPORT NAME: AR REPORT
INTAB HOUSEHOLDS: 442
TARGET AUDIENCE: HEAVY/MODERATE CATEGORY PURCHASES WHO BOUGHT BRAND NON-LOYALLY

DETAILS CHART

☐ EXPORT WITH HEADER  ☒ △

DRAG A COLUMN HEADER HERE TO GROUP BY THAT COLUMN

| NETWORK | AUDIENC | SAMPLE SIZE | PROGRAM RATING | COMM RATING | PROGRAM CPM | COMM CPM | PERFECT PLAY | SWITCH AWAY | JUMP IN | MODAL SWITCH AWAY SECOND | STAYED AWAY | STAY AWAY SECOND |

| SUMMARY ◁ |
|---|
| START DATE: 11/20/2007 |
| BROADCAST PERIOD: BROADCAST DAY |
| GEOGRAPHIC: ☐ ZIP CODE 90650 |

*FIG. 35B1*

| | | | | | | | | | | |
|---|---|---|---|---|---|---|---|---|---|---|
| BET | TARGET | 121 | 0.04 | 0.02 | $22.93 | $40.20 | 90.51% | 9.51% | 6 | 10 | 3.5 |
| BET | TOTAL | 442 | 0.07 | 0.03 | $3.45 | $6.60 | 89.20% | 10.80% | 6 | 10 | 3.5 |
| CARTOON | TARGET | 121 | 0.76 | 0.56 | $12.68 | $17.14 | 99.00% | 1.00% | 6 | 10 | 3.5 |
| CARTOON | TOTAL | 442 | 0.77 | 0.54 | $3.45 | $4.93 | 96.40% | 3.60% | 3 | 10 | 3.5 |
| CMT | TARGET | 121 | 0.24 | 0.18 | $12.11 | $15.98 | 98.70% | 1.30% | 2 | 10 | 3.5 |
| CMT | TOTAL | 442 | 0.23 | 0.15 | $3.45 | $5.06 | 96.90% | 3.10% | 2 | 10 | 3.5 |
| COME.. | TARGET | 121 | 0.63 | 0.47 | $8.73 | $11.82 | 93.60% | 4.50% | 6 | 10 | 3.5 |
| COME.. | TOTAL | 442 | 0.44 | 0.34 | $3.45 | $4.45 | 93.50% | 5.50% | 12 | 10 | 3.5 |
| E) | TARGET | 121 | 0.16 | 0.1 | $27.45 | $42.95 | 99.40% | 0.60% | 1 | 10 | 3.5 |
| E) | TOTAL | 442 | 0.34 | 0.26 | $3.45 | $4.52 | 97.70% | 2.30% | 4 | 10 | 3.5 |

PAGE 1 OF 2 (20 ITEMS)   <PREV [1] 2 NEXT>

| 92509 |
| 90640 |
| DEMOGRAPHIC<br>ESSEX HOMEOWNER |
| GROUPINGS:<br>☐ GROUPING<br>BY PROGRAM |
| FILTERS: |

SAVE

*FIG. 35B2*

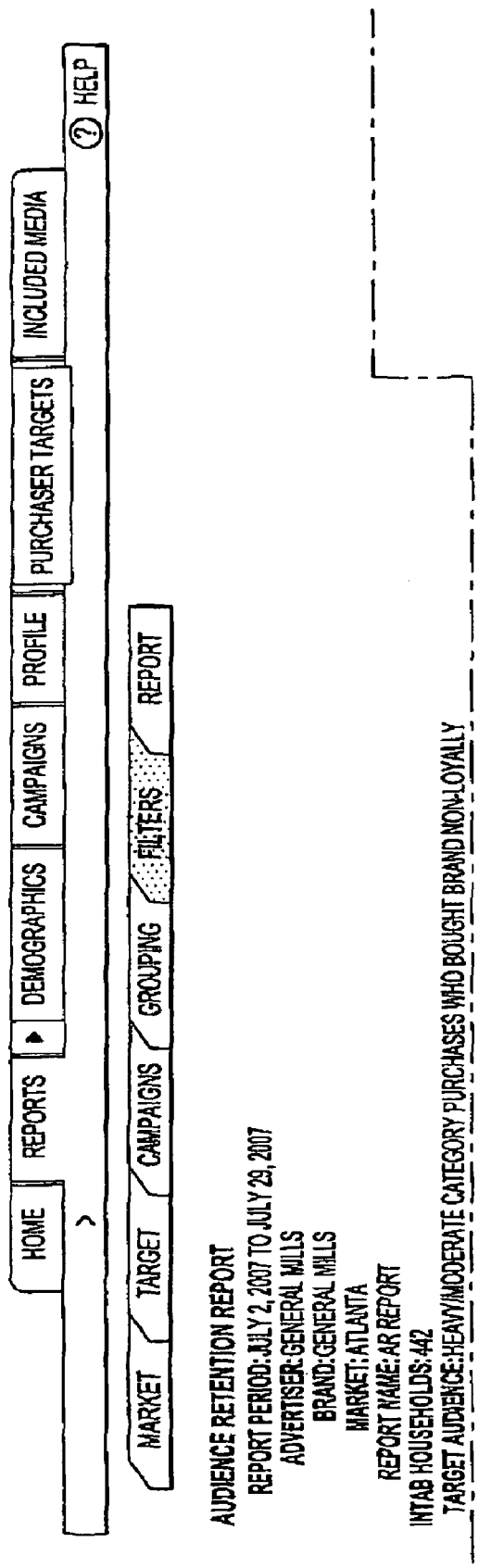
FIG. 35C1

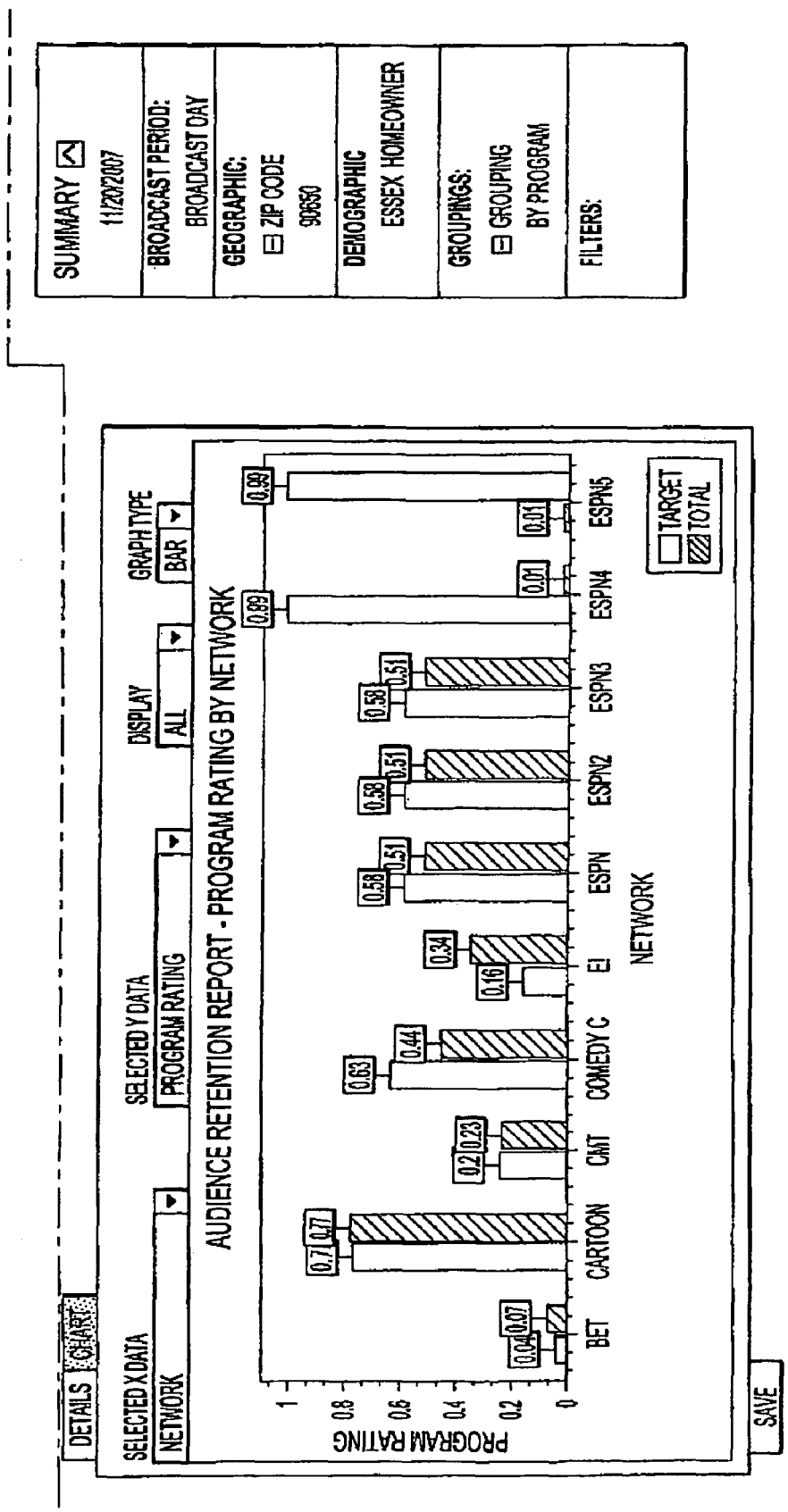
FIG. 35C2

| Daypart Name | Description – Eastern Time Zone Default |
|---|---|
| Weekday Early Morning | Mon.-Fri. 6:00A-9:00A |
| Weekday Morning | Mon.-Fri. 9:00A-NOON |
| Weekday Afternoon | Mon.-Fri. NOON-4:00P |
| Weekday Early Fringe | Mon.-Fri. 4:00P-7:30P |
| Weekday Prime Access | Mon.-Fri. 7:30P-8:00P |
| Weekday Late News Time | Mon.-Fri. 11:00P-11:30P |
| Weekday Late Fringe | Mon.-Fri. 11:30P-1:00A |
| Prime Time | Mon.-Sat. 8:00P-11:00P & Sun. 7:00P-11:00P |
| Total Week | Mon.-Sun. 24 Hours |
| Saturday Morning | Sat. 7:00A-NOON |
| Saturday Afternoon | Sat. NOON-5:00P |
| Sunday Afternoon | Sun. 1:00P-6:00P |
| Overnight | Mon.-Sun. 2:00A - 6:00A |

FIG. 36

| Reach Frequency Report | | | | | | | | | | | |
|---|---|---|---|---|---|---|---|---|---|---|---|
| Report Period | Jul 02 to Jul 29, 2003 | | | | | | | | | | |
| Advertiser | General Mills | | | | | | | | | | |
| Brand | Wheat Chex | | | | | | | | | | |
| Market | Atlanta | | | | | | | | | | |
| Intab HHs | 1085 | | | | | | | | | | |
| Target Audience | Households w/Married Parents and 2 Children | | | | | | | | | | |
| | Cost | Rating Points | CPM | Impressions | Average Freq. | Freq. .1 | Freq. .2 | Freq. .3 | Freq. .4 | Freq. .5 | Freq. 6-10 | Freq. 10+ |
| Target | | | | | | | | | | | |
| Gross | | | | | | | | | | | |

FIG. 37A

REACH FREQUENCY REPORT
REPORT PERIOD: OCT 29, 2007 TO NOV 26, 2007
ADVERTISER: DEFAULT
MARKET: LOS ANGELES
REPORT NAME: RF REPORT
INTAB HOUSEHOLDS: 32558
TARGET AUDIENCE: HOUSEHOLDS W/ MARRIED PARENTS(AGES 34-54) AND 2 CHILDREN

| POPULATION | COST | RATING POINTS | PARENT TARGET REACHED | CPM | IMPRESSION | AVERAGE FREQ. | FREQ. 1 TO | FREQ. 4 TO | FREQ. 7 TO |
|---|---|---|---|---|---|---|---|---|---|
| TARGET | $50,000... | 2.2 | 50.00% | $567.09 | 88169 | 6.30% | 150205 | 150205 | 150205 |
| TOTAL | $50,000... | 3.1 | 50.00% | $298.51 | 167498 | 5.20% | 109549 | 109549 | 109549 |

SUMMARY
START DATE: 11/20/2007
BROADCAST PERIOD: BROADCAST DAY
GEOGRAPHIC:
DEMOGRAPHIC:
FILTERS:
FREQUENCIES:
  FREQUENCIES
    1-3
    4-6
    7-9

*FIG. 37B*

ROI Index

| Advertiser | General Mills |
|---|---|
| Brand: | Wheat Chex |
| Market | Atlanta |
| Reporting Period | Jul 02 to Jul 29, 2003 |
| Lag Time | 4 Weeks |
| Target: | Heavy/Moderate Category Purchasers Who Bought Brand Non-Loyally |

| Network | Cost (Test Period, not base period) | # insertions # of ad airings/runs for that touchpoint line during the Test Period | % Target Reach | Target Average Frequency | TRP | CPM Targets | % of Reached Increasing Purchase of Brand | Incremental Sales $'s as Result of Increasers | % Increase in Purchase Revenue Among Targets | ROI | ROI Index |
|---|---|---|---|---|---|---|---|---|---|---|---|
| WTBS ATL | | | 38.80% | 3.3 | 126 | $564.84 | 68.50% | | 151.20% | 8.68 | 133 |
| MTV | | | 9.10% | 2.6 | 24 | $200.69 | 79.90% | | 119.70% | 9.45 | 145 |
| BET | | | 4.10% | 1.4 | 5.8 | $100.00 | 39.00% | | 36.60% | 4.8 | 74 |
| ESPN | | | 6.60% | 2.9 | 19 | $145.65 | 36.60% | | 35.30% | 4.74 | 73 |
| USA | | | 2.50% | 1 | 2.5 | $86.67 | 65.10% | | 44.50% | 10.4 | 160 |
| TNN | | | 0.80% | 1 | 0.8 | $80.00 | 97.60% | | 80.00% | 5.38 | 83 |
| E! | | | 9.90% | 1 | 9.9 | $235.83 | 56.90% | | 44.20% | 2.22 | 34 |
| TNT | | | 3.30% | 1.5 | 5 | $153.33 | 48.80% | | 13.50% | 1.58 | 24 |
| VH1 | | | 5.00% | 1.2 | 5.8 | $118.57 | 48.80% | | 37.30% | 6.9 | 106 |
| CMT | | | 1.70% | 3.5 | 5.8 | $45.71 | 48.80% | | 63.10% | 18.2 | 279 |
| Comedy C | | | 18.20% | 3.2 | 57.9 | $96.86 | 48.80% | | 27.20% | 6.1 | 94 |
| Sci-Fi | | | 5.80% | 5 | 28.9 | $80.57 | 69.70% | | 30.10% | 3.83 | 59 |
| Cartoon | | | 9.90% | 4.2 | 41.3 | $159.00 | 65.10% | | 50.40% | 5.49 | 84 |
| ESPN2 | | | 1.70% | 2 | 3.3 | $47.50 | | | | 0 | |

FIG. 38A

| HOME | REPORTS | ▲ | DEMOGRAPHICS | CAMPAIGNS | PROFILE | PURCHASER TARGETS | INCLUDED MEDIA |

| MARKET | TARGET | CAMPAIGNS | GROUPING | FILTERS | PURCHASES | REPORT |

? HELP

ROI REPORT
REPORT PERIOD: 11/20/2007 TO 11/20/2007
ADVERTISER:
BRAND:
MARKET: ZIP-92509
REPORT NAME: ROI REPORT
INTAB HOUSEHOLDS: 1585
TARGET AUDIENCE: DEMOGRAPHICS & 33

DETAILS / CHART

☐ EXPORT WITH HEADER  ☒ ⊠

DRAG A COLUMN HEADER HERE TO GROUP BY THAT COLUMN

| CHANNEL | DAYPART | COST | NO. INSERTION | PERCENT TARGET REACH | AVERAGE FREQUEN | CPM | INCREASE AS PERCENT | INCREME SALES | PERCENT INCREASE IN REVENUE | ROI | ROI INDEX |
|---|---|---|---|---|---|---|---|---|---|---|---|
| ABC | DAYPART | 100000 | 15 | 9.70 | 3.5 | $0.34 | 7.00% | 11.53% | 1.70% | 6.1 | 108 |
| CBS | DAYPART | 175000 | 15 | 11.80 | 4.3 | $0.27 | 8.30% | 15.10% | 1.90% | 7.5 | 134 |
| CNN | DAYPART | 50000 | 10 | 7.90 | 7.1 | $0.35 | 4.50% | 5.65% | 1.00% | 5.4 | 95 |
| ESPN | DAYPART | 50000 | 10 | 3.10 | 1.4 | $0.46 | 4.10% | 7.79% | 0.10% | 1.1 | 20 |
| FOX | DAYPART | 10000 | 15 | 10.30 | 3.2 | $0.46 | 4.10% | 12.31% | 0.50% | 3.2 | 57 |
| FOX | DAYPART | 100000 | 15 | 12.50 | 4.4 | $0.23 | 10.20% | 19.85% | 2.10% | 10.3 | 183 |

SAVE

SUMMARY ☒
START DATE: 11/20/2007
BASE DATE: 11/20/2007
BROADCAST PERIOD: BROADCAST DAY
GEOGRAPHIC:
DEMOGRAPHIC:
FILTERS:

FIG. 38B

| AME Report | | | | | | | |
|---|---|---|---|---|---|---|---|
| Report Period | Jul 02 to Jul 29, 2003 | | | | | | |
| Advertiser | General Mills | | | | | | |
| Market | Atlanta | | | | | | |
| Intab HHs | 2064 | | | | | | |
| Min Tuning Part | 15 Minutes | | | | | | |
| Target Audience | Households w/Married Parents and 2 Children | | | | | | |
| Grouping | By Network | | | | | | |
| | HH Rating | HH Rating Index | HUT | HH Share | Reach | CUME |
| BET | | | | | | |
| Cartoon | | | | | | |
| Comedy Central | | | | | | |
| EI | | | | | | |
| ESPN | | | | | | |
| ESPN2 | | | | | | |
| MTV | | | | | | |
| TNN | | | | | | |

FIG. 39A

| HOME | REPORTS | ▲ | DEMOGRAPHICS | CAMPAIGNS | PROFILE | PURCHASER TARGETS | INCLUDED MEDIA |

| MARKET | TARGET | GROUPING | FILTERS | REPORT |

ⓘ HELP

AME REPORT
REPORT NAME: AME REPORT
REPORT PERIOD: OCT 29, 2007 TO NOV 26, 2007
ADVERTISER: DEFAULT
MARKET: LOS ANGELES
INTAB HOUSEHOLDS: 32558
MIN TUNING: 1
TARGET AUDIENCE: HOUSEHOLDS W/ MARRIED PARENTS (AGES 34-54) AND 2 CHILDREN
GROUPING: POPULATION

DETAILS | CHART

☐ EXPORT WITH HEADER  ☒ ⊠

DRAG A COLUMN HEADER HERE TO GROUP BY THAT COLUMN

| CHANNEL | HH RATING | HUT | HH SHARE | CUME |
|---|---|---|---|---|
| AMC | 0.48 | 1.22 | 39.56% | 0.08 |
| CNBC | 0.22 | 0.49 | 44.74% | 0.13 |
| CNBC | 0.19 | 0.66 | 29.55% | 0.50 |
| CNN | 0.19 | 0.66 | 29.55% | 0.50 |

SAVE

SUMMARY ⊠

START DATE:
11/20/2007

BROADCAST PERIOD:
BROADCAST DAY

GEOGRAPHIC:
⊟ ZIP CODE
92509

DEMOGRAPHIC:
ESSEX HOMEOWNER

GROUPINGS:
⊟ GROUPING
BY NETWORK

FILTERS:
⊟ DAY PART
WEEKDAY EARLY MORNING
⊟ CHANNEL TYPE
BROADCAST
⊟ OPTIONAL REACH MINIMUM
DWELL REQUIREMENT
900

*FIG. 39B*

True Target Index

| Advertiser | General Mills |
|---|---|
| Market | Atlanta |
| Reporting Period | Jul 02 to Jul 29, 2003 |

| Campaign | Target |
|---|---|
| Wheaties | Heavy/Moderate Category Purchasers Who sometimes Bought Brand |
| Wheat Chex | Heavy/Moderate Category Purchasers Who Bought Brand Non-Loyally |

| Program | Wheaties | Wheat Chex |
|---|---|---|
| Crocodile' Dundee | 128 | 162 |
| 120 Minutes | 173 | 28 |
| 1998 Home Run Derby | 98 | 86 |
| 2 Stupid Dogs | 97 | 99 |
| 20/20 | 101 | 118 |
| 227 | 123 | 159 |
| 3rd Rock From the Sun | 103 | 156 |
| 9 to 5 | 44 | 52 |
| ABC World News Tonight | 109 | 110 |
| Abducted! | 126 | 36 |

| Program | Wheaties | Wheat Chex |
|---|---|---|
| 'Crocodile' Dundee | 128 | 162 |
| 120 Minutes | 173 | 28 |
| 1998 Home Run Derby | 98 | 86 |
| 2 Stupid Dogs | 97 | 99 |

| Daypart | Wheaties | Wheat Chex |
|---|---|---|
| Weekday Early Morning | 128 | 162 |
| Weekday Morning | 173 | 28 |
| Weekday Afternoon | 98 | 86 |
| Weekday Early Fringe | 97 | 99 |

| Half-hour | Wheaties | Wheat Chex |
|---|---|---|
| Non-Primetime | 128 | 162 |
| 6-6:30PM M-F | 173 | 28 |
| 6-6:30PM Sat | 98 | 86 |
| 6-6:30PM Sun | 97 | 99 |

FIG. 40A

| HOME | REPORTS | ▼ | DEMOGRAPHICS | CAMPAIGNS | PROFILE | PURCHASER TARGETS |
|---|---|---|---|---|---|---|
| MARKET | TARGET | CAMPAIGNS | GROUPING | FILTERS | PURCHASES | REPORT | INCLUDED MEDIA |

? HELP

TTI REPORT
REPORT NAME: TTI REPORT
REPORT PERIOD: 11/20/2007 TO 11/20/2007
ADVERTISER: ESPN
MARKET: ZIP=92509
INTAB HOUSEHOLDS: 33
TARGET AUDIENCE: ESSEX HOME OWNER
GROUPING: CHANNEL

DETAILS | CHART
☐ EXPORT WITH HEADER

DROP FILTER FIELDS HERE

HH_RATING ▽ | HH_RATING_INDEX ▽ | DEMOGRAPHICS △ ▽

| CHANNEL △ ▽ | DEFAULT DEMOGRAPHICS | | ESSEX HOME OWNER | | NEW ENGLAND | |
|---|---|---|---|---|---|---|
| | HH_RATING | HH_RATING INDEX | HH_RATING | HH_RATING INDEX | HH_RATING | HH_RATING INDEX |
| ABC | 1.31520 | 69 | 1.58230 | 118 | 1.68430 | 125 |
| AMC | 1.14630 | 61 | 0.97520 | 73 | 0.31420 | 23 |
| CBS | 3.15270 | 167 | 1.91840 | 142 | 1.51320 | 113 |
| CNBC | 1.53210 | 81 | 0.10850 | 8 | 0.79810 | 59 |
| CNN | 1.41620 | 75 | 0.51480 | 38 | 0.81630 | 61 |
| ESPN | 0.56340 | 30 | 1.51640 | 113 | 2.68540 | 200 |
| FOX | 2.56980 | 135 | 2.51630 | 187 | 1.59420 | 119 |
| NBC | 3.45210 | 182 | 1.61270 | 120 | 1.31840 | 98 |

SAVE

SUMMARY ◁

START DATE:
11/20/2007

BROADCAST PERIOD:
BROADCAST DAY

GEOGRAPHIC:
⊟ ZIP CODE
  92509

DEMOGRAPHIC:
ESSEX HOMEOWNER
DEMOGRAPHIC GROUP 1
DEMOTEST22

BUYERGRAPHICS:
NABISCO SHREDDED WHEAT
FANATICS
HIGHLOYALTY_HIGHUSAGECHEC
CHEX BIG SPENDER

CAMPAIGN:
DEFAULT CAMPAIGN

GROUPINGS:
⊟ GROUPING
  BY NETWORK

INCLUDED MEDIA

INCLUDED MEDIA SAVED SETS

| PROGRAM NETWORK | | |
|---|---|---|
| INCLUDE | EXCLUDE | PROGRAM NAME |
| ☐ | ☑ | A&E HD |
| ☐ | ☑ | ABC NEWS NOW |
| ☐ | ☑ | ACCESS CALIF. 10 |
| ☑ | ☐ | @MAX |
| ☐ | ☐ | 5 STAR MAX |
| ☐ | ☐ | A&E |
| ☐ | ☐ | A&E PACIFIC |
| ☐ | ☐ | ABC FAMILY CHAN |
| ☐ | ☐ | ABC FAMILY CHAN PAC |
| ☐ | ☐ | ACCESS TELEVISION NETWORK |

PAGE 1 OF 67 (570 ITEMS) [<] [1] 2 3 4 5 6 7 ... 65 66 67 [>]

RESET | SAVE

Tabs: HOME | REPORTS | ▲ DEMOGRAPHICS | CAMPAIGNS | PROFILE | PURCHASER TARGETS | INCLUDED MEDIA

*FIG. 44*

| HOME | REPORTS | ▲ | DEMOGRAPHICS | CAMPAIGNS | PROFILE | PURCHASER TARGETS | INCLUDED MEDIA |

PURCHASER TARGETS

SAVED BUYERGRAPHIC SET [CHEX LOVERS ▼]

BRAND [CHEX ▼]
CATEGORY [CEREAL ▼]

LOYALTY SETTINGS

| ☐ NEVER BUYS BRAND | EQUAL TO | | 0 % |
| ☐ LOWEST QUARTILE SOR | 0 % | UP TO | 20 % |
| ☐ THIRD QUARTILE SOR | 25 % | UP TO | 50 % |
| ☐ SECOND QUARTILE SOR | 50 % | UP TO | 75 % |
| ☑ TOP QUARTILE SOR | 75 % | UP TO | 100 % |
| ☑ ABSOLUTE LOYAL | EQUAL TO | | 100 % |

CATEGORY PURCHASE LEVEL

| ☐ LOWEST USAGE | 0 | UP TO | 100 |
| ☐ USAGE 2 | 100 | UP TO | 200 |
| ☑ USAGE 3 | 200 | UP TO | 300 |
| ☑ USAGE 4 | 300 | UP TO | 400 |
| ☑ USAGE 5 | 400 | UP TO | 500 |
| ☑ HIGHEST USAGE | GREATER THAN | | 500 |

[DEFAULT] [SAVE]

ANALYZING RETURN ON INVESTMENT OF ADVERTISING CAMPAIGNS BY MATCHING MULTIPLE DATA SOURCES

FIELD OF THE INVENTION

The invention generally relates to systems, processes, tools and strategies for processing data and executing programs, services and other applications in a computer-based environment. In various embodiments, the invention more particularly relates to processing, analyzing and cross-correlating data associated with media programming, advertising, product or service purchases, voting results for political advertising, and demographic data.

BACKGROUND

Commercial enterprises need accountability for the significant financial resources they spend on advertising products and services. Industries such as television have seen an erosion of advertising resources spent relative to other media (e.g., the Internet), in large part because of the perception of a lack of return on investment (ROI) accountability. The marketplace requires a solution to a significant challenge in marketing: accurately measuring each of the media in which a product is advertised to determine each medium's relative contribution to ROI with respect to advertisement expense. Advertisers need to know not only which consumers potentially viewed their commercials, but also how many of the consumers exposed to the advertising actually made purchases or acted in response to the advertising content.

To measure advertising effectiveness in television media, for example, the viewing behavior of millions of households must be monitored and analyzed across an increasingly complex array of different television channels and program offerings. The problem has been exacerbated by the fragmentation of television programming options available to consumers through digital cable channels, video-on-demand (VOD), digital video recorder (DVR), interactive television (iTV), and other diverse programming options. This problem has caused many advertisers to question the adequacy of current media accountability methodologies.

It is important to find ways to measure television advertisement exposure that are cost effective for a relatively large sample size of consumer households. A large sample is needed because the number of channels has become so great that the ratings for the channels themselves and especially the breakdowns of the audiences of specific programs by demographic groups typically become unstable and unreliable with smaller sample sizes employed with prior analysis methods. This means that the sample size must be sufficiently large to facilitate dissection of the results by exposure to media and marketing communications. In order for statistically significant results to emerge from analysis for a typical brand, sample sizes in the hundreds of thousands of households may be deemed to be required. However, such sample sizes are typically not cost effective in systems that require installation of new data collection hardware in the home. For example, one important analysis negatively impacted by the unavailability of an appropriate sample size is a comparison of how the composition of marketing communications reaching consumers who switched to a subject product brand differs from the composition of other users within the product category who did not switch to the subject brand. Because of the importance of ROI, of making marketing investments more predictable, and of integrating marketing into a company's financial model, most companies have engaged in econometric modeling to try to solve this problem. Many agree that such modeling lacks granularity and has numerous validity gaps, leading to little or no impact on finding ways to understand and increase ROI.

In addition, privacy has become one of the most salient concerns of consumers and legislatures since the arrival of the Internet. There is a sensitivity to the potential for privacy to be compromised by modern technology, including marketing and advertising systems that acquire personally identifiable information about consumers. Accordingly, the ways in which advertising data and consumer information are collected, processed and analyzed must address the need for consumer privacy.

In view of the issues described above, more effective and efficient systems, processes, tools and strategies are needed to provide advertisers and other users with accurate measurements of the efficacy of their media advertising campaigns while promoting and protecting consumer privacy, and for purposes of media optimization, targeting and addressability.

BRIEF DESCRIPTION OF THE FIGURES

The utility of the embodiments of the invention will be readily appreciated and understood from consideration of the following description of the embodiments of the invention when viewed in connection with the accompanying drawings, wherein:

FIG. 8 includes a schematic example of an ad schedule;

FIGS. 9A through 9C include schematic examples of purchase data;

FIG. 10 includes a schematic example of an ad viewing table;

FIG. 11 includes a schematic example of a program viewing table;

FIG. 12 includes a schematic example of a purchases table;

FIG. 13 includes a schematic example of a households table;

FIG. 14A includes a schematic example of a geographic area table;

FIG. 14B includes a schematic example of a geographic ZIP codes table;

FIG. 15 includes a schematic example of a clickstream table;

FIG. 16 includes a schematic example of an ads table;

FIG. 17 includes a schematic example of an ad airings table;

FIG. 18 includes a schematic example of a campaigns table;

FIG. 19 includes a schematic example of a channels table;

FIG. 20 includes a schematic example of a clients table;

FIG. 21 includes a schematic example of a dayparts table;

FIG. 22 includes a schematic example of a networks table;

FIG. 23 includes a schematic example of a product categories table;

FIG. 24 includes a schematic example of a products table;

FIG. 25 includes a schematic example of a purchases table;

FIG. 26 includes a schematic example of a program airing table;

FIG. 27 includes a schematic example of a programs table;

FIG. 28 includes a schematic example of a report selection criteria table;

FIG. 29 includes a schematic example of an audience retention report table;

FIG. 30 includes a schematic example of a return on investment (ROI) table;

FIG. 31 includes a schematic example of an advertising/media exposure table;

FIG. 32 includes a schematic example of a DSTB intab table;

FIG. 33 includes a schematic example of a DSTB false positive table;

FIG. 34 includes a schematic example of a users table;

FIGS. 35A through 35C2 include examples of audience retention reports;

FIG. 36 includes a tabulation of various daypart options that may be applied in accordance with various embodiments of the invention;

FIGS. 37A and 37B include examples of reach frequency reports;

FIGS. 38A and 38B include examples of ROI reports;

FIGS. 39A and 39B include examples of AME reports;

FIGS. 40A and 40B include examples of TTI reports; and,

FIGS. 41 through 48 include examples of screen displays that may be accessed through a presentation tier configured in accordance with various advertising measurement system embodiments of the invention.

DESCRIPTION

Figure 1A:
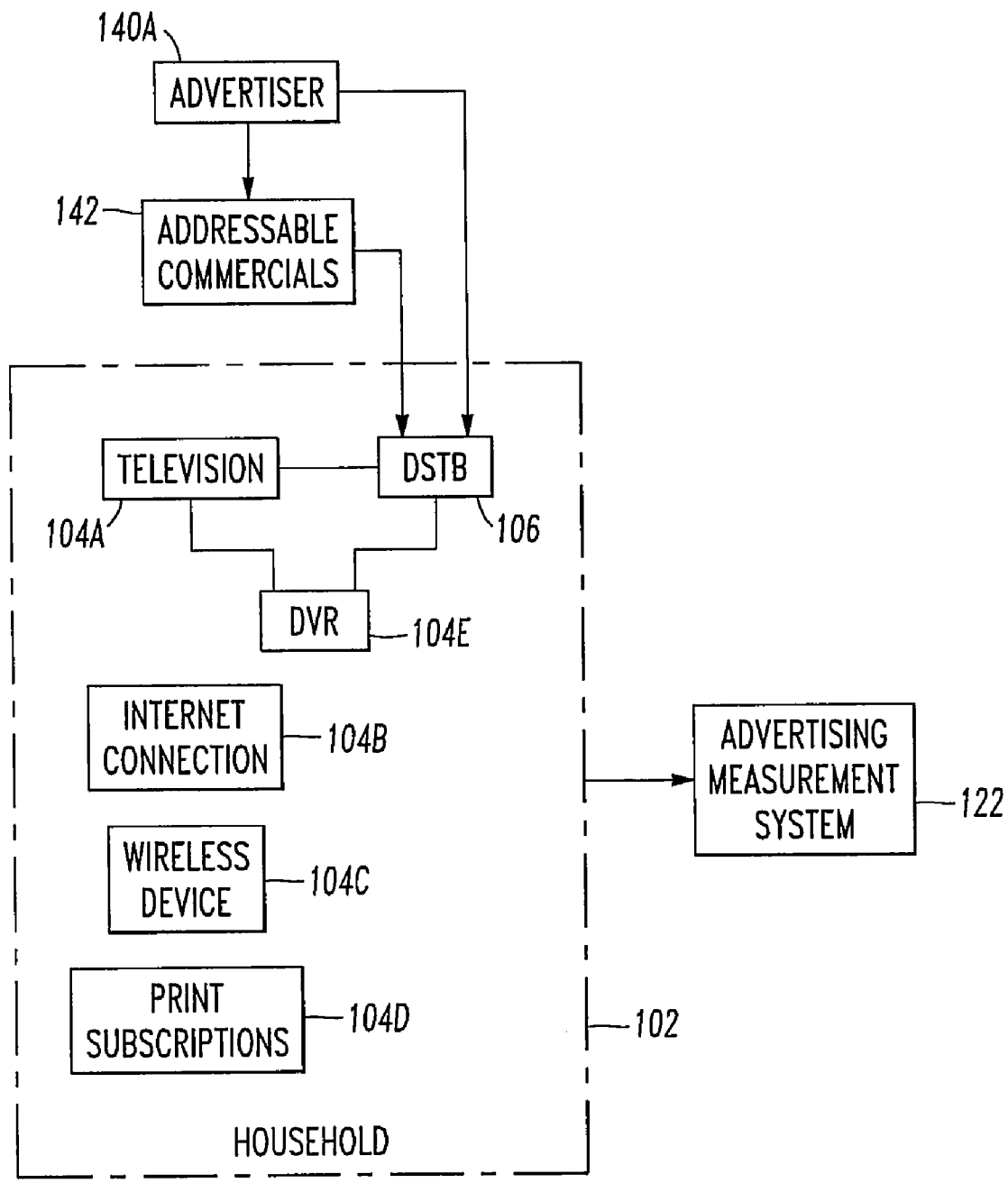
FIGS. 1A and 1B include schematic architectures for communicating and processing data in accordance with various embodiments of the invention.

In various embodiments, the present invention allows users to measure the sales effects of advertising, among various return on investment metrics, while utilizing household level data (e.g., as opposed to market level averages). Embodiments of the invention can facilitate cost effective data collection and analysis for relatively large sample sizes. In addition, embodiments of the invention can be implemented without the need to install or employ "supplemental data collection devices" in the household. Examples of such supplemental data collection devices include people meters, bar code scanning equipment, pager devices, and any other device or hardware that can be considered an item introduced into a household in addition to or to supplement a program delivery source (as described below) and which is externally operatively associated with the program delivery source. Items specifically not included within the definition of "supplemental data collection devices" include software or other computer-readable instructions, for example, that may be downloaded for internal use by a program delivery source and whose primary purpose is collection of viewership data or purchase data. Also, a store discount card may be used in connection with certain embodiments of the invention to collect purchase data, for example, but such cards are not considered within the scope of the term "supplemental data collection device" as applied herein.

In various embodiments, the present invention provides an advertising measurement system with the ability to cross-correlate advertising audience data collected via television distribution systems from television digital set-top boxes ("DSTBs"), for example, and other program delivery sources (e.g., Internet, radio, mobile devices, others) in multiple households, with television program data, with other market or media touchpoints (e.g., print, outdoor, web pages, radio), and with product purchase data derived from those same households, so that the purchase of a product or service can be viewed with regard to the stimuli that occurred prior to that purchase to the household making that purchase. Analyses conducted in accordance with embodiments of the invention benefit from being based on both individual household level data. Also, such analyses are not necessarily dependent on supplemental data collection devices installed in the household (i.e., devices supplemental to equipment already installed in the household, such as DSTB). As applied herein, the term "household" may include a single residential address, for example, or other like locations to which programming and/or advertising content is communicated for viewing by consumers. The processing system may be configured to collect television tuning data from DSTBs, validate the quality of clickstreams, and combine the data with additional sources of information such as purchasing data, demographic data, advertising data and programming data. As applied herein, a "clickstream" may be defined as a time-stamped minute/second record of media exposure events (e.g., channel changes, volume changes, start, stop, pause, etc.) generated by media or program delivery sources a consumer controls with buttons or keys, such as television, digital video recorder (DVR), Internet, or wireless devices (e.g., mobile phones), or digitized records produced by passive or active people-metering technology. In certain embodiments, "clickstream" may also encompass digitized data for media input from digital or non-digital records such as subscription records, newsstand sales or purchase records, survey data, diaries, observational/ethnographic research, or many other types of records. A "clickstream" may also include all data that represent media exposure and that can be attached at a household level. It can be appreciated that embodiments of the invention may be expanded to measure other advertising media or "program delivery sources" such as the Internet, radio, handheld devices, wireless devices (e.g., mobile phones), television distribution systems, cable, satellite, programs delivered through telephone networks, "TiVo" type systems, "DirectTV" type systems, or many others.

Through use of the advertising measurement system and associated calculations, metrics, data processing, and other methods and strategies described herein, advertisers and other users can be offered real-time, online access to web-based dashboard research reports of the processed, cross-correlated data. This can facilitate reallocation of advertising resources, perhaps shifting money from advertising with lower sales per dollar to advertising producing higher sales per dollar, thereby increasing the ROI of the advertising content. Users can generate media research reports from diverse databases of the processing system which employs specialized data analysis metrics.

In certain embodiments, the invention offers a software platform which allows advertising professionals, agencies, media, researchers, and other users to successfully measure and maximize advertisement campaign effectiveness and associated ROI. The invention can provide advertising customers with a portal to analyze the direct impact of marketing stimuli on ROI. Also, advertisers may be permitted to supplement existing data in the advertising measurement system with their own advertising campaign information to facilitate analyses of information from various households including media viewing habits, advertisement exposure levels, and subsequent consumer purchasing behavior as a result of the advertisement exposure.

For example and by way of illustration, embodiments of the invention may employ data collected directly from cable and satellite television DSTBs, a known television industry term for devices used by television distribution system providers to convert and process video signals received from a content provider for presentation on a consumer's television screen. DSTBs are typically microprocessor-based and generally also contain substantial memory and, in an increasing proportion of cases, return data communication paths. Downloadable software or other computer-readable instructions are also available which can be transmitted into the DSTBs from a head end of the television distribution system, for example, to empower the DSTBs with functional capabilities to track tuning behavior comparable to other types of meters previously used to monitor television usage by marketing/media research companies. The return data communication path capabilities can also be used to draw data originating from the DSTBs "upstream" to collectors and other data aggregators who can process and report the data. The technique may involve downloading a compact module of software into the DSTB over the satellite or cable transmission facilities. This module then acts like a hardware-based meter in date-stamping, time-stamping and logging the channel changes and other commands from the viewer to the DSTB (e.g., turn on, turn off, sound up, sound down, etc.). Uploading such logs daily or periodically can capture with a certain degree of granular precision the television exposure patterns of each television set so measured.

The inventors have discovered, however, that it is often insufficient to use the raw viewing data generated by DSTBs. Embodiments of the invention therefore can be configured to apply one or more cleansing and editing algorithms to the viewing data to remove inconsistencies and account for potential limitations of the DSTB data collection software, for example. Examples of such cleansing or editing algorithms include: false positive editing (to correct for the phenomenon of DSTB powered up when the television connected to the DSTB is powered down); intab determination (to remove data derived from households whose tuning records are insufficiently complete due to network outages, DSTB crashes, cable malfunctions, and other like factors); multi set top box editing (to reflect multiple DSTBs within the same household); outage/surfing determination (to adjust for DSTB record filtering performed by television distribution system providers or their software vendors); and/or, geographic and demographic weighting (to project the intab sample to the population of which it is a sample). More detailed discussion of examples of such cleansing and editing algorithms is provided hereinbelow.

However, advertisers are often concerned not only with measuring what consumers potentially see their advertising content, but also with how many of those consumers act (e.g., make purchases) in response to the advertisements. Therefore, in addition to the economic challenge of measuring television exposure for a relatively large sample size of households, it is also a challenge to measure the purchase behavior or purchase history of that same population of households. In various embodiments, the invention may employ matching of name/address lists obtained from the television distribution system providers with name/address lists of those who possess product purchase records (e.g., grocery stores or supermarket chains). For example, many stores offer discounts to customers who agree to use frequent shopper cards or other discount cards at the point of purchase. Data derived from such discount cards allows the store to maintain a record of purchases made by consumers. In addition to products or services sold through supermarkets, many other types of products can be tracked efficiently to name/address lists associated with advertiser records. For example, car companies, airlines, hotels, car rental companies, financial service providers, and other types of business entities and advertisers may maintain records of the names and addresses of consumers who bought their products. For example, in consumer electronics and appliance categories customers may register with the advertiser by completing a product warranty card.

By matching what programming each household has viewed or tuned to on a television, for example, with products the household has purchased, the advertiser can know which advertising has worked and which has not worked. Media other than television can also be measured by means of the list-matching approach. For example, magazines and newspapers typically have subscriber lists on a name/address basis which can be cross-correlated with matching households that have been measured for television programming and purchase data. Also, consumer Internet usage can be measured in these households by downloading tracking software into the computer systems of cooperating households to monitor Internet traffic, and/or by uploading Internet service provider (ISP) server records in a manner which protects privacy. Records of the household (e.g., name, address, telephone number, etc.) can be cross-correlated with matching households by adding the advertiser's direct mail, telemarketing, and other campaigns to the sphere of measurable marketing touchpoints. As applied herein, a "touchpoint" is a term understood by those skilled in the art and is intended to encompass all means or media by which consumers may be influenced by marketing or advertising, including but not limited to television, radio, magazines, newspapers, Internet, outdoor media, transit media, direct mail, telemarketing, event sponsorships, matchbook covers, skywriting, point of purchase materials, in-store marketing, display, mobile, press releases, and many others. In certain embodiments, household interviews or surveys may also be conducted to complement results obtained from the list matching strategy.

Figure 1B:
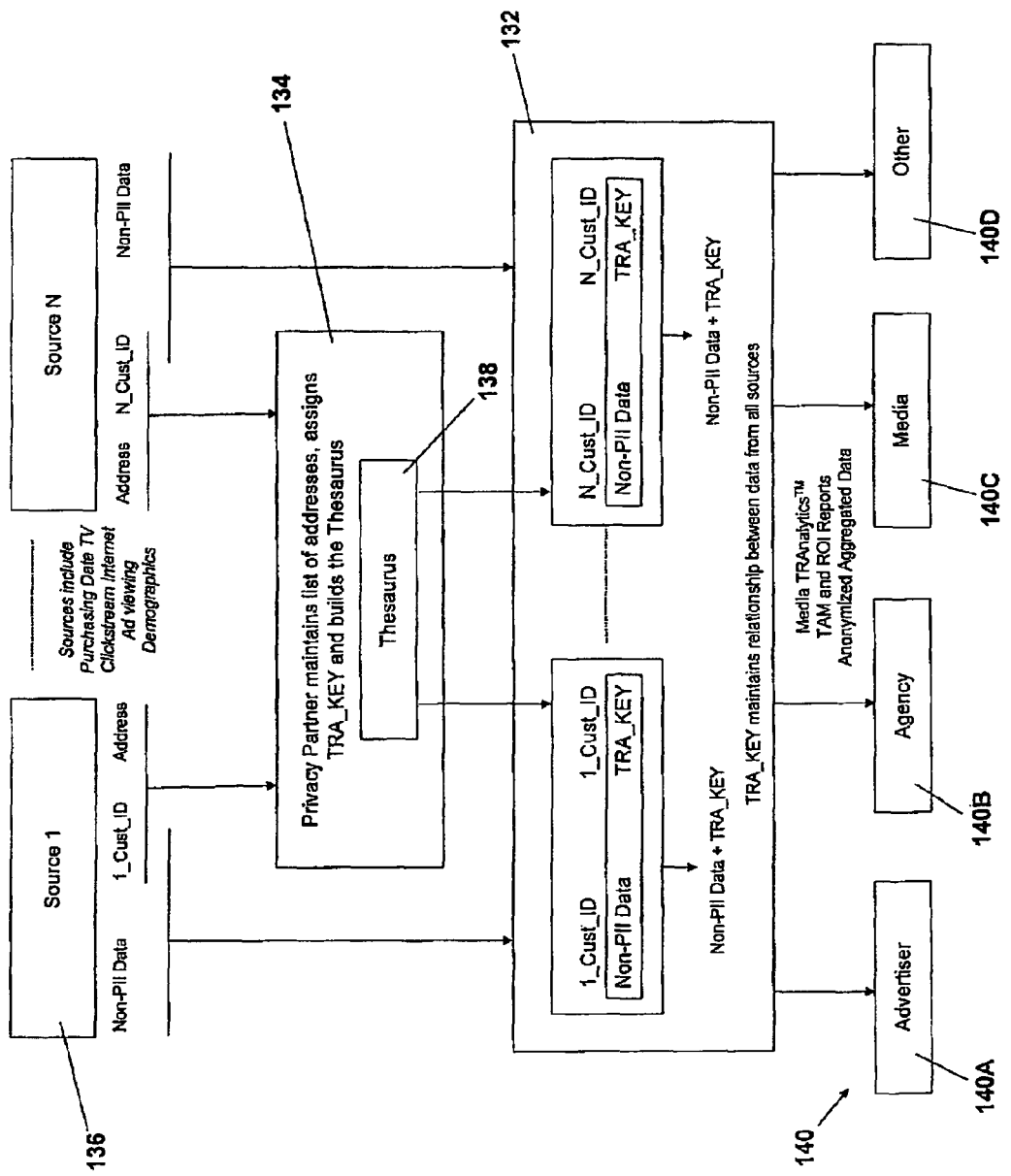
Figure 2:
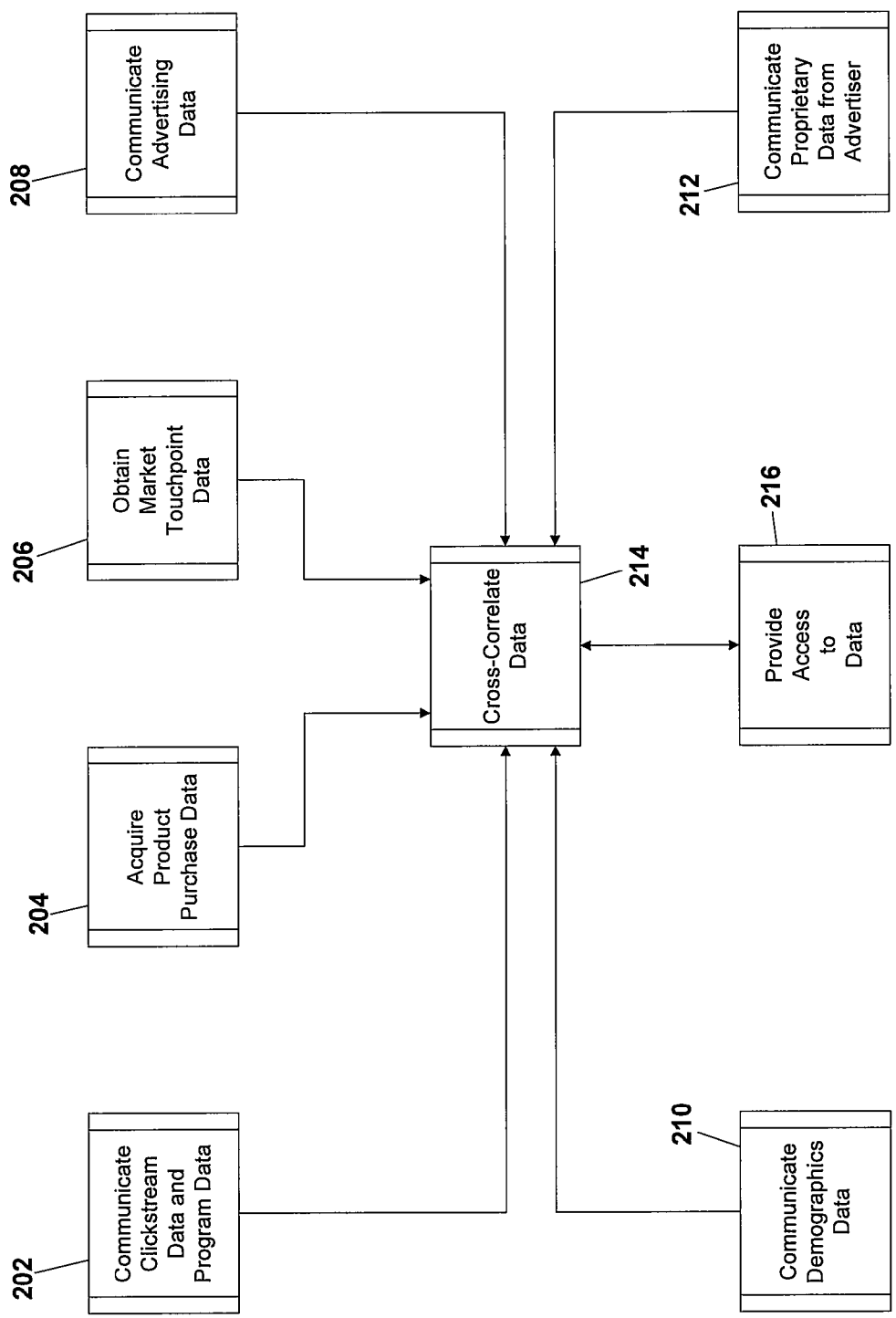
FIG. 2 includes a process flow diagram illustrating an example of a process for receiving and processing data in accordance with various embodiments of the invention.

In various embodiments, the invention addresses problems with prior market analysis approaches by making data collection cost effective for a variety of media and marketing communication channels at the household level with enhanced precision and within comparatively larger household sample sizes. FIGS. 1A, 1B and 2 schematically illustrate an overview of an exemplary architecture and associated processes for collecting, analyzing and processing clickstream data originating from a household 102 in which one or more content delivery sources 104 (e.g., television 104A, Internet 104B (e.g., web pages via an Internet connection through a modem, cable system, wireless connection, or other communication media), wireless device 104C, print subscriptions 104D, etc.) display or communicate programming content and advertising content to consumers within the household 102. In the example shown, a DSTB 106 is operatively associated with the television 104A and a digital video recorder (DVR) 104E. The DSTB 106 may be provided to the household 102 by a television distribution system provider, for example.

At step 202, program viewing data or clickstream data from the television 104A, for example, may be communicated from the DSTB 106 to an advertising measurement system 122 configured to receive and process such program data. It can be appreciated that clickstream data from the other content delivery sources 104B, 104C, 104D may also likewise be communicated to the system 122 at step 202. In addition, program data associated with content displayed or communicated by the content delivery sources 104 may also be communicated to the system 122 at step 202. Such program data may include actually aired program data, scheduled programming data, or other like program data. After edited data are uploaded to the advertising measurement system 122, the data can be parsed into a searchable database by automatic electronic conversion into a relational database format wherein attributes such as date, time, channel, viewing content (e.g., program or commercial code), household characteristics, DSTB data, and/or other characteristics can be stored. Also, one or more cleansing and editing algorithms may be applied to the uploaded data (see discussion below).

At step 204, product purchase data associated with the consumers in the household 102 can be acquired. This product purchase data can be combined with the data uploaded to the advertising measurement system 122 from the household 102. It can be appreciated that different product categories may employ different best methods to obtain or collect purchasing data within households 102. For example, for automobiles the best method may be a name/address match between the car manufacturer's sales database (e.g., by VIN or Vehicle Identification Number). For major appliances, warranty registrations provide a similar approach. For airline use, individual airline travel records by household 102 provide similar accuracy of purchasing data via name/address match. For prescription pharmaceuticals, the marketers themselves have access to household 102 level data that can be matched directly to the households 102 in a given sample. For financial services, financial institutions often have household 102 level information about their customers. Retailers analyzing their own ROI also have access to household 102 level data that can be matched. For packaged goods, RFID codes printed into packaging may be read by sensors attached to all doorway entries, for example. In certain embodiments, product purchases may also be self-reported by households 102 via Internet questionnaires, for example. It can be appreciated that ROI measurements based on such product data can be based on changes in attitude toward product brands that drive purchase behavior changes; and marketers generally accept that when their brand has increased its standing in the consumer's mind, that fact can be measured by self-reporting methods.

At step 206, exposure of the household 102 to other marketing influences or market touchpoints (such as Internet surfing, magazines, newspapers, radio, etc.) can be obtained or measured based on activity of the household 102. In certain embodiments, measuring household 102 exposure to market touchpoints can be facilitated by use of software modules downloaded into the computer systems of the household 102. Marketers are generally willing to accept that ROI patterns among the households 102 with a DSTB 106 are representative of ROI patterns among all households 102. In certain embodiments, a relatively small sample of DSTBs 106 may be placed in non-DSTB households 102, such that the artificially placed DSTBs 106 are constrained to not increase the number of channels made available to the household 102, and the non-DSTB sample can be used as a check to ensure that broad ROI patterns observed in non-DSTB households 102 do not differ significantly from those measured in DSTB 106 households 102. If ROI patterns do differ in such households 102, then the artificial non-DSTB household 102 sample can be enlarged to allow more granular ROI analysis, and the two samples can be weighted and applied together to represent their respective population proportions.

At step 208, advertising data may be communicated and received by the advertising measurement system 122. In general, such advertising data may reflect advertising content displayed on the television 104A of the consumer in the household 102, such as when ads were aired, at what times, on what channels, on what networks, and other like details (described below). The advertising data may also be derived from other content delivery sources 104B, 104C, 104D within the household 102. The advertising data may also be supplied by users such as advertisers who interact directly with the system 122 to enter data into the system 122. In addition, at step 210 demographics data may be communicated to the system 122; and proprietary data from advertisers or other users may be communicated at step 212.

At step 214, each of the different sets of data described above (i.e., clickstream data, program data, product purchase data, market touchpoint or media exposure data, and advertising data) can be aggregated, matched, and/or cross-correlated and then stored in a suitable data storage medium or database within the advertising measurement system 122. At step 216, this cross-correlated data can be made accessible in real-time to interested parties such as advertisers, agencies, programming networks, and other users. Embodiments of the invention offer advertisers, agencies, networks and other users with household-level data and report generators that can be employed to analyze the subjects of their respective interests. Among other functionality and features, the report generators may include standard tables, multiple regression analyses implemented at the household level, statistical comparisons of households that switched to a given product brand versus the rest of the product category, and model-based projections of what the findings suggest should be the optimal reallocation of the marketing mix for a given product brand. Report generators can be configured to process and present a range of data and calculations of data including, for example and without limitation, ratings, shares, households using television or HUT calculations, demographics of product users, reach/frequency, frequency distribution, trend, and many others. It can be seen that embodiments of the invention can facilitate more accurate analyses of ROI on marketing investments on a more granular, medium by medium basis. It can be appreciated that this tends to make marketing spending more cost effective and accountable. In the language of company management, marketing investment may cease to be a "black box" within the financial spreadsheet of the company.

In certain embodiments, data may be stored in the advertising measurement system 122 without any personally identifiable information ("PII"), such that users of the system 122 will have no way of knowing the identity of consumers in a given household 102. Most business entities selling products or services maintain customer lists. These customers may be identified not only in terms of PII, such as by name or address, but also by use of abstract identification numbers meaningless to anyone outside of the business entity that assigns the company assigning that identification number or account number.

To protect privacy of consumer information, embodiments of the invention may be associated with a marketing research company 132 and/or a list matcher 134. Both of these entities 132, 134 may be involved in the process of compiling data on an individual household 102 basis, such as information supplied by supermarket chains and other holders of product purchase data, information supplied by television distribution system providers and other suppliers of media data, or other data sources or data suppliers 136. Such data suppliers 136 may communicate their purchase data or media data, for example, to the marketing research company 132 without PII, grouping data instead by account number (e.g., a "TRA_KEY" number). Thus, the data of each individual household 102 can be identified by an account number associated with that household 102 when the data is communicated from the data suppliers 136 to the marketing research company 132.

In parallel, the data suppliers 136 may send to the list matcher 134 only the PII and the account number associated with each household 102. The list matcher 134 then creates a table or thesaurus 138 which relates on a company-by-company basis each account number to other account numbers associated with the same household 102. The resulting table indicates, for example, that the household 102 which cable company A calls account number ABC1234 is the same household 102 that supermarket chain B calls account Number DEF5678. After the list matcher 134 communicates the thesaurus 138 to the marketing research company 132, the thesaurus 138 can be used to cross-correlate media exposure data and product purchase data received from the data suppliers 136 so that all data relating to a unique household 102 can be anonymously associated with the records for that household 102. Thus, embodiments of the invention overcome privacy issues by separating PII from other data and information (e.g., media, purchase, etc.); no single party has access to both household 102 identity and household 102 purchase or viewing behavior. A party that knows a household 102 identity, for example, will not know the behavior of that household 102; likewise, a party that knows the behavior of a household 102 will not know the identity of that household 102. The anonymized data can then be accessed and used by a variety of users 140, such as advertisers 140A, agencies 140B, media 140C, or other users 140D.

In certain embodiments of the invention, methods and systems for identifying the value of specific households 102 and DSTBs 106 in those households 102 in terms of likelihood that a household 102 or consumer will respond favorably to advertisements for a brand (e.g., whom does the advertiser want to be exposed to a given ad?), and likelihood that a household 102 or consumer will be exposed to airings of advertisements for a brand (e.g., how does the advertiser best deliver advertisements for the brand?). Such methods and systems may serve as a guidance system for targeting television 104A commercials or other advertising content which can be delivered selectively by DSTB 106. Such commercials may be considered "addressable commercials" 142 as known to those skilled in the art and may be communicated to each household 102 by an advertiser 140A, as shown in FIG. 1A, for example. Addressable commercials 142 can be implemented using commercials stored on adjacent "feeder channels", on servers (e.g., as in IPTV, switched digital video, VOD, or network DVR), on hard drives in set top boxes or television appliances (TiVo, etc.). In the context of addressable commercials 142, various embodiments of the invention can be used to: (a) determine which households 102 should receive a specific commercial, how often, when, and in what type of program environment, based upon the correlation between the same type of household 102 (e.g., heavy purchaser of X product, occasional purchaser of Y brand, etc.), receipt of such messages, and its increased purchase of the advertised brand; and (b) track the purchase behavior inducing success of such placements so as to further correct or refine placement strategies and tactics to improve purchase behavior production rates. By providing a means for more closely aligning feasible placement of advertisements with ideal, unrestricted placement according to empirical purchase behavior correlation, addressable commercials 142 can increase return on investment yield for advertisers and other users.

In certain embodiments, the invention may use digital video recorder or DVR 104E clickstream data coupled with purchase data to measure and analyze ROI and to drive addressable advertising such as addressable commercials 142. For example, the system 122 may be configured to analyze the effects of DVR 104E usage on advertising effectiveness, in situations in which the DVR 104E is or is not used as a means of delivering addressable commercials 142. If DVR-based addressable commercials 142 are used, the system 122 can be configured to determine the degree to which use of the DVR 104E as a playback mechanism contributes to consumers fast-forwarding or skipping commercials and the degree to which such consumer behavior reduces sales response to such advertising. If the DVR 104E is used as a means of delivering addressable-to-DSTB commercials, either by insertion into normal pods or by means of showing self-selected advertising as an option on the list of content available on the DVR 104E, the system 122 can be configured to determine the degree to which that addressable advertising 142 of each type is not skipped or fast-forwarded over and to compare sales rates produced by addressable commercials 142 of both types versus non-addressable advertising.

Figure 3A:
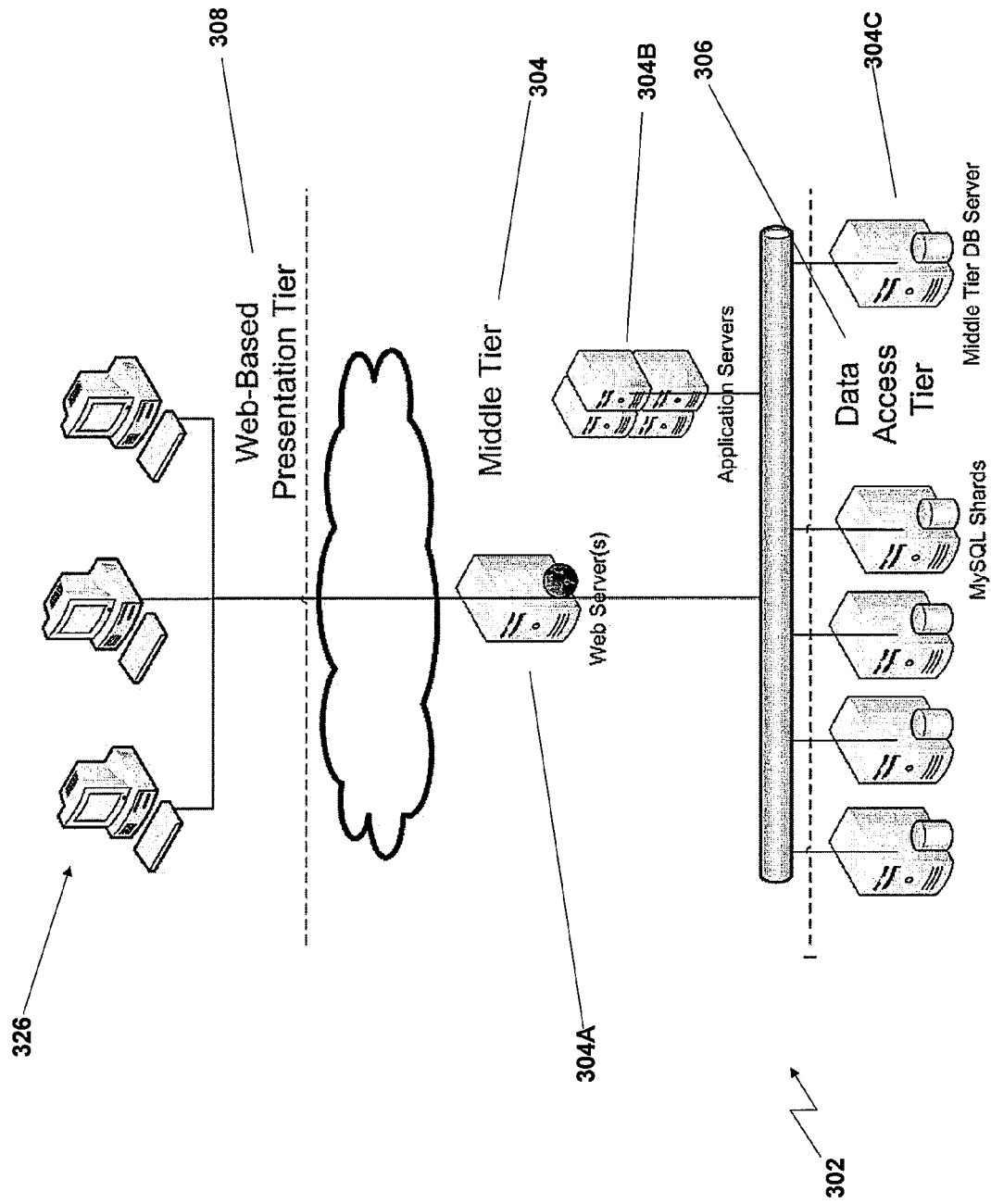
FIGS. 3A and 3B include schematics of an example of a system architecture that may be structured and configured in accordance with various embodiments of the invention.
Figure 3B:
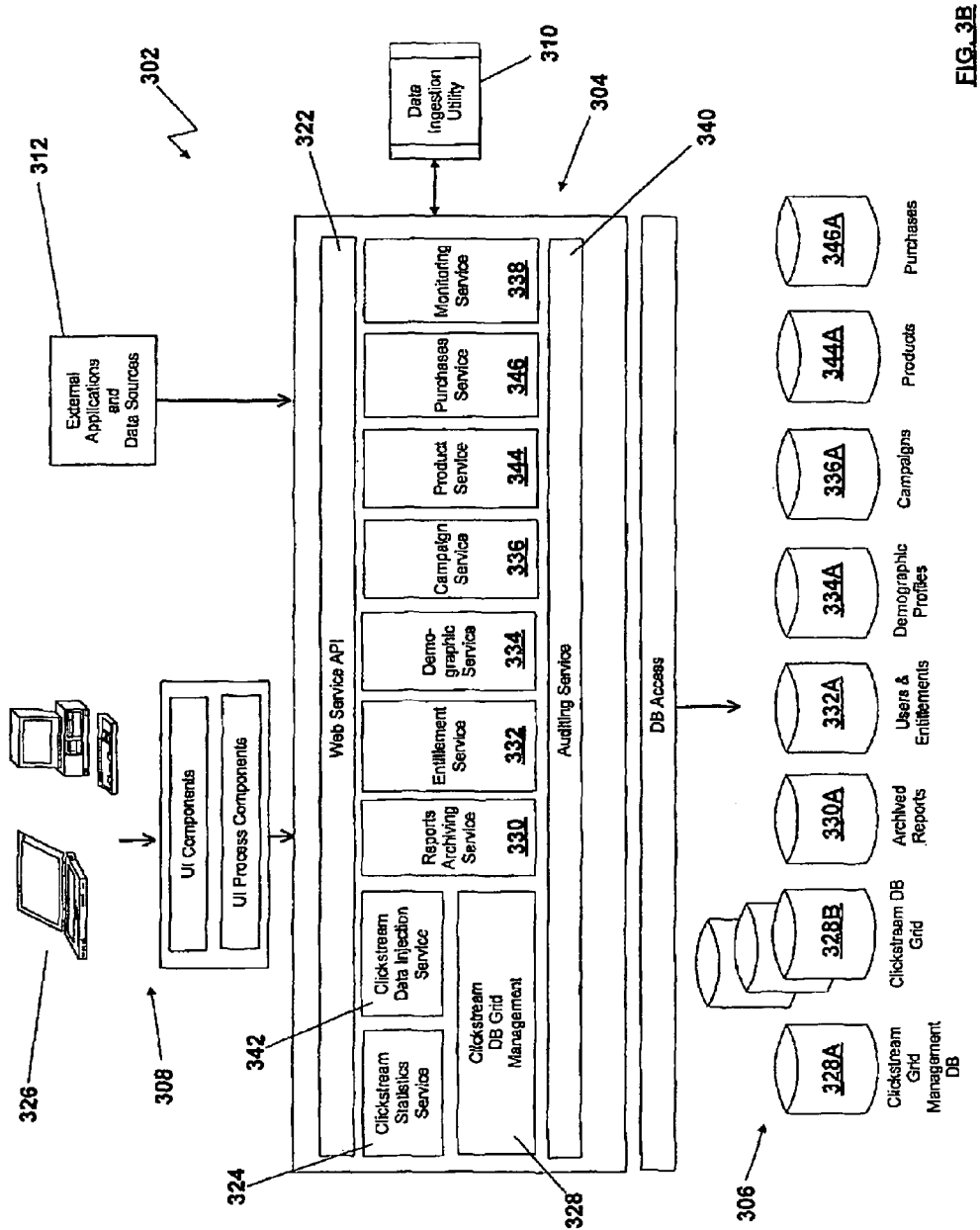

FIGS. 3A and 3B illustrate details of an example of an advertising measurement system 302 which may be configured in accordance with various embodiments of the invention. In the example shown in FIG. 3A, the advertising measurement system 302 may include a middle tier 304, a data access tier 306, and a presentation tier 308. Examples of each of these tiers 304, 306, 308 are described hereinafter as components of the advertising measurement system 302.

The middle tier 304 of the system 302 may be programmed with business logic and may provide various application services such as caching, distributing computing resources, distributing transactions, data transformation, authentication, security, and may serve as a coordinator of other application components. The middle tier 304 may be configured with one or more web servers 304A and/or application servers 304B configured for receiving input from the presentation tier 308, interacting with the data access tier 306 services to retrieve or update application persistent data, and/or sending processed results to the presentation tier 308, potentially merging dynamic content with static pages presented to various users. The middle tier 304 may be hosted on a set of clustered application servers 304B, providing a robust and scalable environment for many different potential users. The middle tier 304 may be configured to support multiple roles involved in the system 302, including administrator functions, session management, processing credentials, and security functions. The middle tier 304 may also be configured to coordinate the use of server resources (e.g., database servers 304C) and communication among various application components via messaging services, as well as managing itself in terms of memory and CPU utilization requirements.

In various embodiments, caching performed by the middle tier 304 allows the system 302 to store recently used persistent data in middle-tier 304 memory, for example, which potentially minimizes time spent on repeated data retrieves and reduces the load on the data access tier 306. Authentication performed by the middle tier 304 may be used to check and track user 326 credentials in the system 302 and manage user 326 rights and privileges to view or modify certain application data as well as executing certain application services.

The middle tier 304 may also record various operational events, such as dispatching database queries and their completion, users 326 logging in and out, starting and ending data ingestion tasks performed by a data ingestion utility 310, monitoring database node failures. By using distributed computing techniques, the middle tier 304 allows faster computation by splitting complex computational tasks into multiple subtasks and executing each of the subtasks in parallel on multiple processors. The middle tier 304 also coordinates transaction management and distributing transactions to allow certain functions to be executed across multiple data storage media, thereby promoting consistent performance of the function across all transaction participants. The middle tier 304 may also perform various data transformation functions such as transforming data between/among multiple formats such as HTML, XML, XSLT, binary formats, and many others.

The middle tier 304 may be operatively associated with the data ingestion utility 310 which can be embodied as a data feed control process configured to initiate acquisition of data from various external applications or data sources 312 (e.g., data suppliers or third party data vendors), to make internal system calls to data cleansing and validation algorithms (as described in more detail below), and/or perform other middle tier 304 services. Functions of the data ingestion utility 310 can be configured to execute automatically by scheduling data ingestion processes or can be manually initiated. The data ingestion process can be developed to clean, validate, transform and aggregate clickstream, demographic, programming and purchasing data received by or communicated from the advertising measurement system 302. The data ingestion utility 310 can be used to upload clickstream data, program data, demographic data, purchasing data, product data, and other types of data to the system 302. The utility 310 may also be responsible for data aggregation, index creation, data correlation or cross-correlation, and may coordinate the execution of various editing or cleansing algorithms (e.g., intab, false positive, outage/surfing, viewers per viewing household (VPVH), weighting, failure, etc.).

In certain embodiments, the middle tier 304 may include various services configured to interface with the data access tier 306 and the presentation tier 308 of the advertising measurement system 302, such as through a Web Services interface 322 (as shown in FIG. 3B). These services may be embodied as application programming interfaces (APIs) or other types of computer-executable applications or software instructions embodied in various modules that execute various functions within the system 302 and enable integration into one or more computer systems or legacy systems of an advertiser, media agency, creative agency, or other users 326. In certain embodiments, the system 302 may be configured for direct data communication and/or direct user interface (e.g., through application program interface or API calls) with one or more advertisers 326 to facilitate tasks or activities such as report generation, data collection (e.g., collecting supplemental household data), data analysis, and/or many other functions. For example, an advertiser 326 may establish a predetermined report or group of reports to be automatically generated for the advertiser 326 by accessing a direct data connection with the system 302.

A statistics service module 324 may be configured to encapsulate typical extraction calculations performed on clickstream data which can be used in reports and in macro functionality at the report level, such that a request from a user 326 to generate a report may only require making a single call or a single Web Service method. The module 324 may be configured to correlate transparently clickstream data with other data sources (programming, purchases, demographics, etc.). An API in the statistics module 324 may be configured to invoke supported reports (e.g., return on investment or ROI reports, true target index or TTI reports, audience retention or AR reports, advertising/media exposure or AME reports, reach frequency reports, and others—see below for detailed examples of such reports) with their corresponding parameters. Additional API calls may allow users 326 to set up report selection criteria and filtering common to all reports (e.g., date/time, demographics, etc.). Another API subset of the statistics module 324 may be configured to allow browsing campaigns, named demographic profiles, products, purchases, and other data sources. The statistics module 324 may function in connection with a database grid management service module 328 to launch parallel queries on relevant grid nodes, collect results, aggregate the results, perform calculations, and produce a final output. Working together, these modules 324, 328 may also monitor query execution on various database nodes in the data access tier 306 and potentially retry failed queries on alternative nodes on which duplicate clickstream data is stored, for example.

The database grid management service module 328 may be embodied as an intelligent component configured to route queries to appropriate servers for parallel execution, for example. The database grid management module 328 may manage data storage media 328A, 328B partitioned across a plurality of database servers, route queries to appropriate servers for parallel execution, keep track of data mapping and data distribution, track communications with database servers, track processing of the queries, track combining and calculating data aggregation results, duplicate clickstream data on additional database servers, provide failover support (if a server fails, a query still could be executed on an operative server), track availability of the database servers and schedule queries to available servers. The database grid management module 328 may also track availability of the database servers on the data access tier 306, and schedule queries only to available servers.

For example, in certain embodiments, to enhance system 302 availability, data ingestion can be implemented by "failing" an active database "shard" (see discussion of shards below) in the data access tier 306, or taking it out of service, so that queries can proceed on duplicate partitions, while the "failed" shard is updated with new information. Once updating is completed, the shard can be brought back online, while duplicate shards can likewise be taken out of service and updated with the same data. This sequence of tasks can be implemented automatically by the database grid management module 328. As described below, embodiments of the invention that employ shard architecture can be used to make a computer system and its storage media scalable and potentially massively scalable.

A report archiving service module 330 may be configured to archive reports results into tables in a dedicated database 330A, rather than in their final output format (HTML, PDF, etc.), making archived results searchable and more compact. Reports can be archived with all selected criteria. When needed, the archived data may be extracted and a report produced in the desired output format. Because reports are archived in database tables, they may also be used to produce trend reports over periods of time, which could be longer than the retention time for raw clickstream data, for example. Archived reports may also be used as a cache mechanism; as long as a report exists with the same selection criteria as currently requested report, there is no need to generate a new report and an archived version can be used instead. Generating a report may also be treated in the system 302 as an auditable event.

An entitlement service module 332 may be configured with an interface to a user management application which provides access to a database 332A of users 326 of the system 302 and their associated entitlements. This module 332 provides functions for provisioning, identifying, and authenticating users of the system 302. The module 332 may be configured to allow administrators to define user entitlement (e.g., which reports they are allowed to generate, which campaigns can be accessed, which demographics can be accessed, etc.). The module 332 may also be configured to allow system administrators to create multiple tenants (client companies) and add end users 326 belonging to each of them or to create a single-tenant environment. Users 326 belonging to a tenant will only be able to access the resources associated with that tenant resources, and may not be made aware of the existence of other tenants.

A demographic service module 334 supports creation and maintenance of named demographic profiles, which can be used as reports filters. Named demographic profiles may be stored in a dedicated database 334A. As applied herein, the term "demographic" as used in connection with data and other information includes, for example and without limitation, data that can be used to classify households 102 into types such as, when available, income, ethnicity, psychological characteristics, geographic data, household 102 composition data, as well as product ownership, product purchase data, media exposure data, and/or any other segmentation approach.

A campaign service module 336 may be configured to support creation and maintenance of advertisement campaigns, which can be used in certain report functions. Campaigns can be assigned to individual end users 326 and stored in a dedicated database 336A. As applied herein, a "campaign" may be defined as a set of advertisements specified by a user 326 of the advertising measurement system 302 to represent a cohesive advertising plan component executed during a time frame, media, and/or geography as specified by the user.

In various embodiments, advertisers and other users 326 may be permitted to supplement or revise data stored in the advertising measurement system 302 with supplemental household data of various types (e.g., purchase data, demographics data, advertising data, market exposure or market touchpoint data, and many other types). For example, such advertiser supplemental household data may be derived from customer newsletters, direct mail lists, coupon redemption records, special service or warranty contracts with consumers, a custom segmentation strategy of the advertiser, and/or from many other like sources of supplemental household data. The supplemental household data may be used in connection with data in the system 302 to enhance report generation or the performance of various data analyses, for example.

A monitoring service module 338 can be configured to provide visibility into the application state, such as by displaying logged-in users or showing currently running application tasks (e.g., queries, data uploads, etc.). This module 338 may also be configured to collect and make available performance statistics (e.g., response times, queue length, etc.), generate recommendations to rebalance shards or if to add additional components to improve system 302 performance.

An auditing service module 340 can be configured to preserve auditing events by documenting additions, deletions, and other modifications to data or information within the system 302 by various entities or users 326. Such auditing events may be stored by author or user 326, time stamp, action taken, or by other attributes of the event.

In various embodiments, a clickstream data injection module 342 may be configured to correlate clickstream data with other data sources (e.g., programming, purchases, demographics, and others). Also, a product module 344 may be configured to manage or process product-related data and information stored in a database 344A; and a purchases module 346 may be configured to manage or process purchase-related data and information stored in a database 346A, such as purchases made by consumers in a household 102.

In various embodiments, the advertising measurement system 302 may provide users 326 such as advertisers and agencies with tools to perform multivariate regression type analyses, for example, as well as marketing mix modeling. The system 302 can be configured to perform multivariate analyses using data stored in the system 302, such as granular and attribute-encoded observations of ad exposure and purchase events within specific households 102 over time, for example. Such analyses can facilitate the allocation of weights to certain components or variables for generating predictive estimates of the contribution of each such component to the combined sales effect of all of a given brand's advertising and promotion. For example, percentage ROI weights can be applied as a result of regression analyses which can be associated with specific creative, media, targeting, frequency, and recency attributes of a brand and its advertising strategy.

In operation, the middle tier 304 may undertake various data cleansing, editing, and format validation algorithms for data from television distribution system providers, such as identifying duplicate records, inconsistent records, and/or confirming that variables are within the range of allowed values and that data patterns match within predetermined parameters.

A multi-DSTB editing algorithm may be employed to ensure that multiple DSTBs 106 in a household 102 tuned to the same television 104A network or other program delivery source count only once for the household 102, such as for purposes of calculating rating and cumulative reach metrics. In the event that multiple DSTBs 106 in the household 102 are tuned to different networks, then the household 102 can be credited with tuning once to each different network. The multi-DSTB editing algorithm functions to ensure that a household 102 is not counted more than once toward calculation of households using television (HUT), among other calculations.

A DSTB 106 may not be able to tell when the television 104A itself is off even though the DSTB 106 is on. This can lead to erroneous measurements if the household 102 is treated as if it were continuing to view the television 104A when it actually is not. A false positives editing algorithm may be applied to identify when the DSTB 106 or television 104A is powered off and hence no viewing is in process. The false positives editing algorithm can use defined heuristics or rules to eliminate the false positive viewing periods when it is most likely that no one in the household 102 is tuning to any station. The false positives editing algorithm yields edited tuning data that closely track the expected HUT (Household Using Television) as reported by other sources. In various embodiments, the false positives editing algorithm can apply a rule that assumes that a household 102 not making any clicks after X minutes means that the household 102 is no longer tuning, then after that specified time interval all further "apparent tuning" can be edited out. The inventors have discovered that optimal values for X can be between one and four hours. Additionally, the value of X can be modified by demographics, program type or genre, specific program, and/or by permutations of these values, and/or can integrate information about signs for searching for weather or acceptable program choices prior to a period of extended inactive remote control usage, for example. The false positive editing algorithm can be further refined by truncating the tuning at the next half-hour, hour or other daypart boundary beyond the X minutes duration parameter. The false positive editing algorithm may also be adjusted by allowing the value for X to vary by hour of the day or other daypart. Also, this technique can be further refined by varying the parameter X in response to number of children in a household, for example, or age of household members, among other demographic distinctions. The inventors have discovered that such adjustments can account for the nature of programs by daypart and by other variations in tuning behavior (program duration, retention rate, etc.).

Alternatively, another solution to the false positives problem include detecting changes in the input impedance of the television set 104A as a proxy to determine that one or both of the television set 104A or the DSTB 106 have been powered down. Also, this technique may be refined by identifying a "turn-off signature" for each household by investigating the behavior of the household prior to powering down the television for the night (e.g., certain households may check for interesting programs across channels before giving up, or the household may habitually check the Weather Channel before turning off the television, etc.). In certain embodiments, home entertainment networks that allow different devices to communicate together and query the status of other devices on the network can be used to assist with solutions for addressing false positive tuning and other measurement challenges.

A weighting algorithm may be applied to match a panel (i.e., a sample size of consumers in different households 102) to census or demographics information. When using a sample or panel of households 102 (a subset of the total television population), the households 102 can be weighted so that the sample represents the same basic demographic statistics as United States census data, for example. United States census data extracts can be obtained from external data sources 312. A data weighting algorithm can also be applied for outages, such as when a geographical area suffers outages over a significant part of the measured households 102, then the remaining in-service households 102 should be weighted so that the total demographic profile and the area's weight within the total measure universe matches what would have been the case had the outage not occurred. Factors to consider in applying the outage weighting algorithm may include the percentage of households 102 affected or the duration (e.g., time) of the outage.

An algorithm may be applied to distinguish between lost data and data derived from "channel surfing" or other repeated changing of channels by the consumer to identify programming available for viewing. This algorithm addresses the issue of when tuning duration less than X seconds is invisible due to decisions made by data suppliers for minimizing the amounts of data they need to transport over bandwidth, and it cannot be determined whether the invisible tuning is due to short duration "surfing" or to a lost data condition. In certain embodiments, the algorithm may consider any invisible interval less than 60 seconds (parameterized and could be set to values up to about 5 minutes), for example, as short duration surfing. Times longer than this predetermined interval are considered lost data. The inventors have found such an interval sufficient because it implies that the user continuously surfed for 60 contiguous seconds while never pausing more than X seconds on a channel. In various embodiments, a minimum dwell time filter may be applied to data received by the advertising measurement system 302 to identify and distinguish data derived from actual program viewing versus data derived from mere channel surfing.

An intab editing algorithm may be applied to address households 102 that cannot tune to a television 104A (e.g., because of cable service disruptions) and which should be excluded from reporting statistics and data supplied to the advertising measurement system 302. In certain embodiments, to be considered intab for a report period, a DSTB 106 must be intab a minimum of 75% of days, by day of week, for example. For instance, if the report period is four weeks, then the DSTB 106 must be intab for at least three Mondays, three Tuesdays, and so on. After applying the 75% rule, the number of days can be rounded up. Thus, for example, a one-week report requires DSTBs 106 to be intab every day of the week. If reports are run on daily, weekly, and monthly periods, then interim versions of these reports may have been based on households 102 that were intab when first run, but became not-intab for a later report period. Thus, for example, interim reports may not be identical to the same report run at the end of a month. A DSTB 106 can be considered not-intab for any day in which the DSTB 106 was inoperable or could not return the status of the DSTB 106 for more than 10 minutes, or another predetermined time interval, during the day. A household 102 explicitly turning off the DSTB 106 does not necessarily make the DSTB 106 not-intab. Conditions that could cause not-intab periods include wide area failures affecting many DSTBs 106, such as general system failures in the cable plant (hardware or software), a major weather event that impairs a significant portion of the system off-line, or area-wide utility or power failures. Individual failure may also be a reason to make a DSTB 106 not-intab, which can be caused by buffer overflow that causes lost data, application software aborts and resets that cause buffered data to be lost, or days when service was not provided to the DSTB (e.g., service new or not yet been established or service disconnected). Any report period during which a DSTB 106 cannot be unambiguously associated with a single household 102 may be a reason for applying the not-intab designation. For example, a not-intab designation may apply if the DSTB 106 was moved to a different household 102, but the DSTB 106 still reported using the same ID as when it was in the previous household 102. Also, any day for which the household 102 opted-out of allowing its tuning to be measured may be considered not-intab. The actual tuning of these rules based on empirical results and validation methods allows the finalization of rules upon which media investment decisions may be made.

In the event that there is an absence of any positive indication that a DSTB 106 is intab or not-intab, the following heuristics may guide intab decisions: a household 102 that shows no activity because the decision is made not to view television (e.g., vacation) may still be considered intab; a DSTB 106 that does not submit data for more than four consecutive weeks may be considered not-intab for each of those weeks it failed to submit data (this heuristic assumes that few households 102 will be on vacation for more than one month, therefore the failure to return any data is assumed to be due to a system or DSTB 106 problem); data integrity errors, such as the DSTB 106 was not associated with a valid household 102 or no associated demographics with the household 102 may produce a not-intab designation; not all data sources provide explicit information when DSTBs 106 may have errors, so a rule can be applied to require the DSTB 106 to have at least one tuning record in the clickstream for the report period.

A viewership to purchase correlation algorithm may be applied to assist with measuring the effect of advertising on subsequent buying or product purchase behavior (the terms "viewership", "viewing" and "viewer" can be defined as television 104A usage as measured by household 102 and DSTB 106 tuning records). In certain embodiments, this algorithm can be executed to determine correlation coefficients relating advertisement effectiveness (advertisement creative quality and related effectiveness, advertisement scheduling parameters including specific creative execution, commercial length, pod position, competitive protection (distance from commercials for competing brands), target segment, day of week, reach, frequency, recency, network, daypart, program environment, sponsorship versus commercial versus product placement, etc.) to changes in buying behavior. Such a measure could guide the decisions of an advertiser in deriving the most benefit from an advertising budget and advertising campaign. An ROI index report can be generated that includes two measures of the relationship: increasers as percentage of targets reached and percentage increase in purchase revenue among targets. These measurements allow comparing ROI and ROI Index values among different advertising strategies, under the assumption that advertising effectiveness differs by characteristics such as daypart and network hosting the advertisement airing. Such metrics can be divided by different product categories and their typical lead-lag time to purchase. Non-limiting examples of lag times between advertising and buying include: weekly (food), monthly (cleaning supplies), seasonally (clothing), or multi-yearly (automobiles). The analysis of such dose-response relationships may be further aided by the use of fitting to alternative shaped curves (diminishing returns, sigmoid, etc.), which have been found in marketing and in epidemiology in detecting, predicting and explaining the response of populations to stimuli.

A data fusion algorithm can be employed to ascribe marketing demographics, media exposure or other data from a marketing database to a second database or other databases. For example, product usage data from a marketing database may be fused to household 102 data that does not itself include that product usage data. Data fusion works on a statistical basis: the data in common between the multiple databases is used to group households 102. For example, if X percent of the group of households 102 in a first database uses a given product, then X percent of the households 102 in a second database can be ascribed as users of the product.

Figure 4:
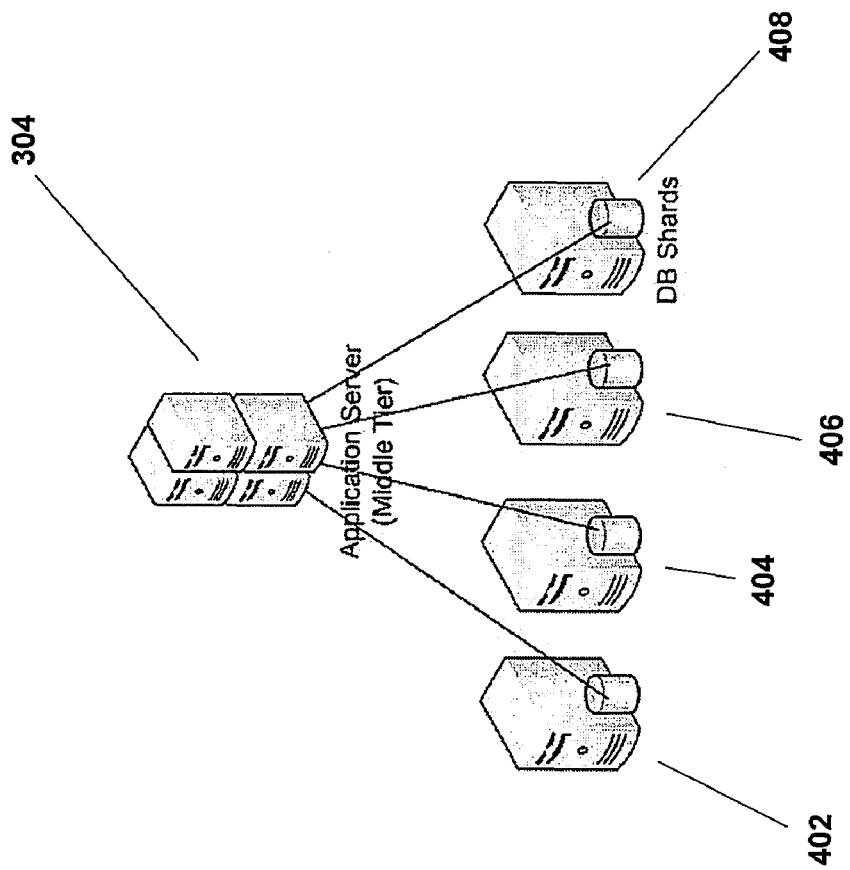
FIG. 4 includes a schematic of a data storage and retrieval architecture that may be structured and configured in accordance with various embodiments of the invention.

Within the data access tier 306 of the advertising measurement system 302, data may be stored and partitioned in association with multiple database management system (DBMS) servers or shards 402, 404, 406, 408, as shown in the system architecture example of FIG. 4 (for sake of convenience of disclosure, only four shards are displayed, but those skilled in the art will appreciate that more or less such shards are possible within the scope of the invention). Every shard 402-408 can be configured to maintain the same data structure or data tables while storing different data. The amount of data stored on a single shard 402-408 can be determined by the smaller of the following two factors: the largest cost effective disk storage size, and the largest amount of data still allowing a desired query response time (e.g., five seconds or less). As shown, the shards 402-408 may be configured to communicate with the middle tier 304 of the advertising measurement system 302.

The inventors appreciate that the way data is partitioned in the data access tier 306 affects the efficiency of queries. For example, the number of distinct households 102 tuned at least once over a report period to the identified time interval, source, or content can be used to calculate a reach measurement. However, calculating this measurement becomes difficult if the same household 102 is exposed to identified time interval, source, or content multiple times over the report period, and records of those events are dispersed among different shards 402-408. To validate that each household 102 is distinct, the ID of each household 102 could instead be aggregated and compared at a level higher than the data access tier 306. But such a data aggregation level would be external to the shards 402-408, and this could cause potentially excessive data traffic between the shards 402-408 and the middle tier 304, thus adding more time to query processing. Therefore, in embodiments of the present invention, all information pertaining to a specific household 102 may be confined to a single shard 402-408. In addition, certain information may be spread evenly across the shards 402-408 to avoid the situation in which some shards 402-408 work harder than others. A hash function may be used to determine a location of a specific household 102 on the shards 402-408, such as when household 102 related data needs to be accessed or updated.

As the amount of information within the advertising measurement system 302 grows, more shards 402-408 may be needed to sustain a desired data processing response time. After a new shard 402-408 is added to the system 302, existing data can be rebalanced between the shards 402-408 with a hash function, taking into account any new shards 402-408 now available. A similar technique may be used to constantly monitor performance of the shards 402-408 and rebalance data between/among them according to the actual average response time achieved over a period of time, for example. This can be achieved by accounting for shard 402-408 capacity, which would be limited by the shard 402-408 physical capacity, but could be comparatively smaller for active shards 402-408 and comparatively larger for less active shards 402-408. As a result of monitoring, the capacity of each shard 402-408 can be changed over time in response to its activity, thus distributing the data processing load between shards 402-408 more evenly. Such performance analyses, load balancing, tuning and optimization can be configured to be automated within the advertising measurement system 302 to provide the system 302 with a self-balancing quality.

Figure 5:
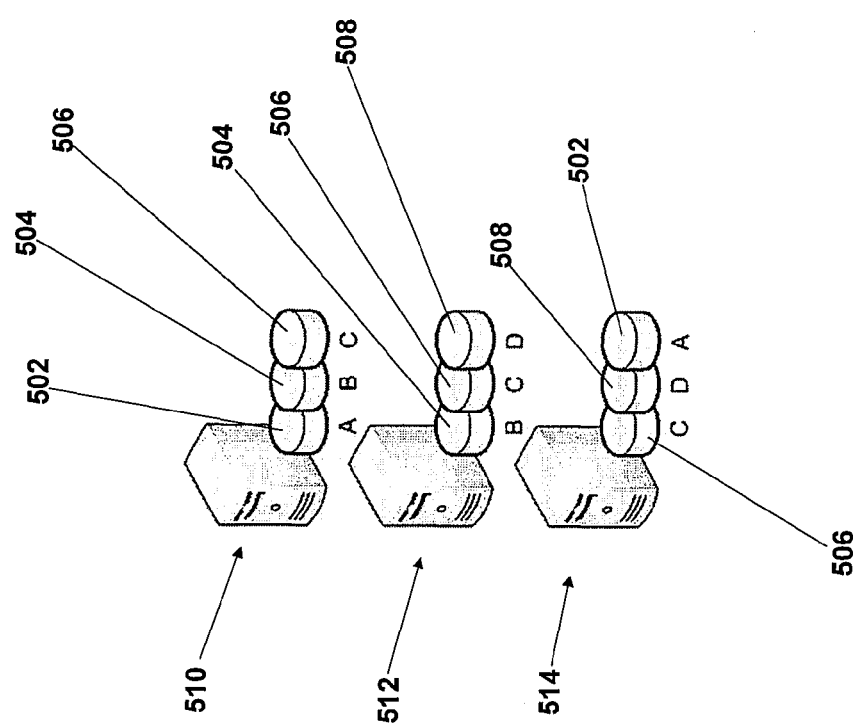
FIG. 5 includes a schematic of a data storage and retrieval architecture that may be structured and configured in accordance with various embodiments of the invention.
Figure 6:
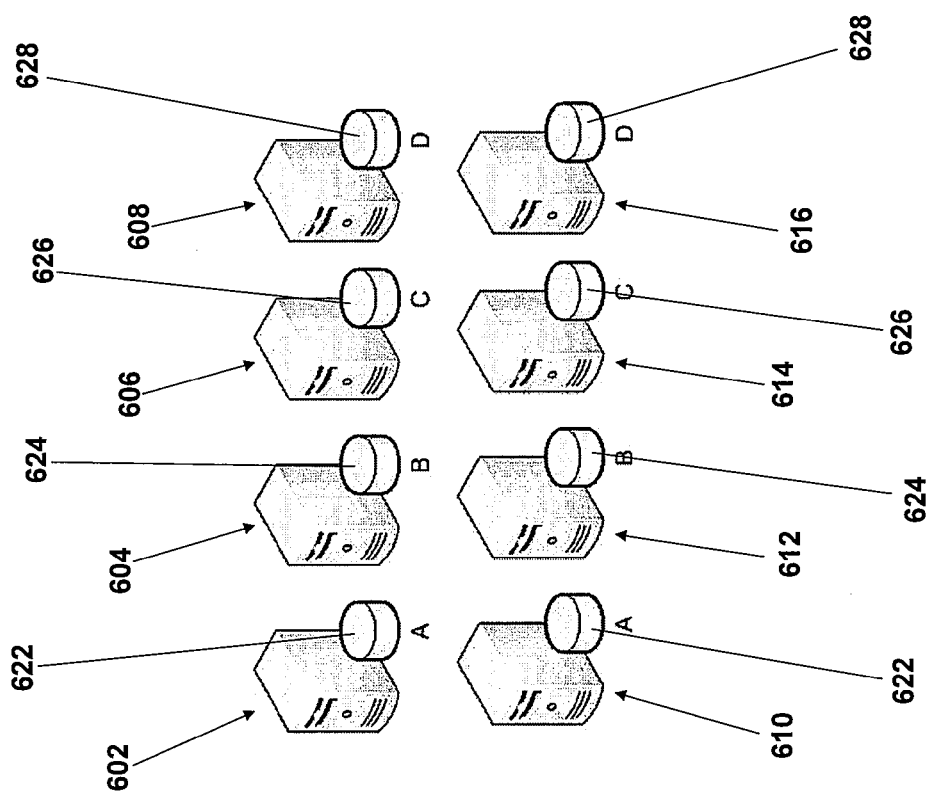
FIG. 6 includes a schematic of a data storage and retrieval architecture that may be structured and configured in accordance with various embodiments of the invention.

As shown in FIG. 5, an example of an architecture having multiple copies of different partitions 502, 504, 506, 508 in multiple shards 510, 512, 514 is shown. This arrangement allows for the event that if any one of the shards 510, 512, 514 fails, then the remaining shards 510, 512, 514 would still possess copies of every single partition available, and the system 302 thus remains fully available. FIG. 6 shows a redundant configuration with eight shards 602-616, each holding one of four duplicated partitions 622, 624, 626, 628. In this example, a failure of any one of the shards 602-616 would still leave the system 302 fully available, but eight servers would be needed instead of three (as shown in the example of FIG. 5). However, the additional servers could be used to load balance concurrent queries, and improve the overall system 302 responsiveness.

As noted previously, query response time depends on data size. The fact that the data is partitioned into shards makes the shard data size, not the overall database size, a determining factor affecting the query response time. That data size should be small enough to sustain a suitable query response time, which in turn may determine the number of shards needed, if and to the degree that the data storage is sufficient. To further improve response time, the existence of duplicate partitions could be utilized by load balancing queries between the partitions. For example, if a query was scheduled against the first instance of partition A, the next concurrent query could be scheduled against the second instance of the same partition A instead of running both queries on the same shard. The existence of duplicate partitions could be also leveraged during data updates. A partition instance could be taken off line and updated without significantly affecting system 302 responsiveness, in comparison to having the partition instance remain online still responding to queries. Similarly, data staging, cleansing, and transformation can be performed on off-line partitions to avoid affecting system 302 responsiveness. The system can be continuously monitored, measuring and tracking partition response time and generating rebalancing recommendations, to move household 102 data from one partition to another, less loaded one. This can also help to improve the overall response time of the system 302 by limiting the situations in which individual partitions become too slow. Also, in addition to rebalancing, the system 302 can be configured to recommend adding components (e.g., data storage media, shards, etc.) to achieve an improvement.

The need to rebalance partitions may arise because some shards become overloaded, or because additional partitions are created. In both cases, the sequence performed by a partition to be rebalanced can be conducted as follows: obtain a new hash algorithm from the middle tier 304, accounting for additional partitions; generate a list of households 102 to be moved to different partitions and output them into multiple files, one for every destination partition; when households 102 are added to new target partition, obtain a signal from the middle tier 304 and delete the moved household 102 from the source partition. This algorithm may be applied to all existing partitions.

Figure 7:
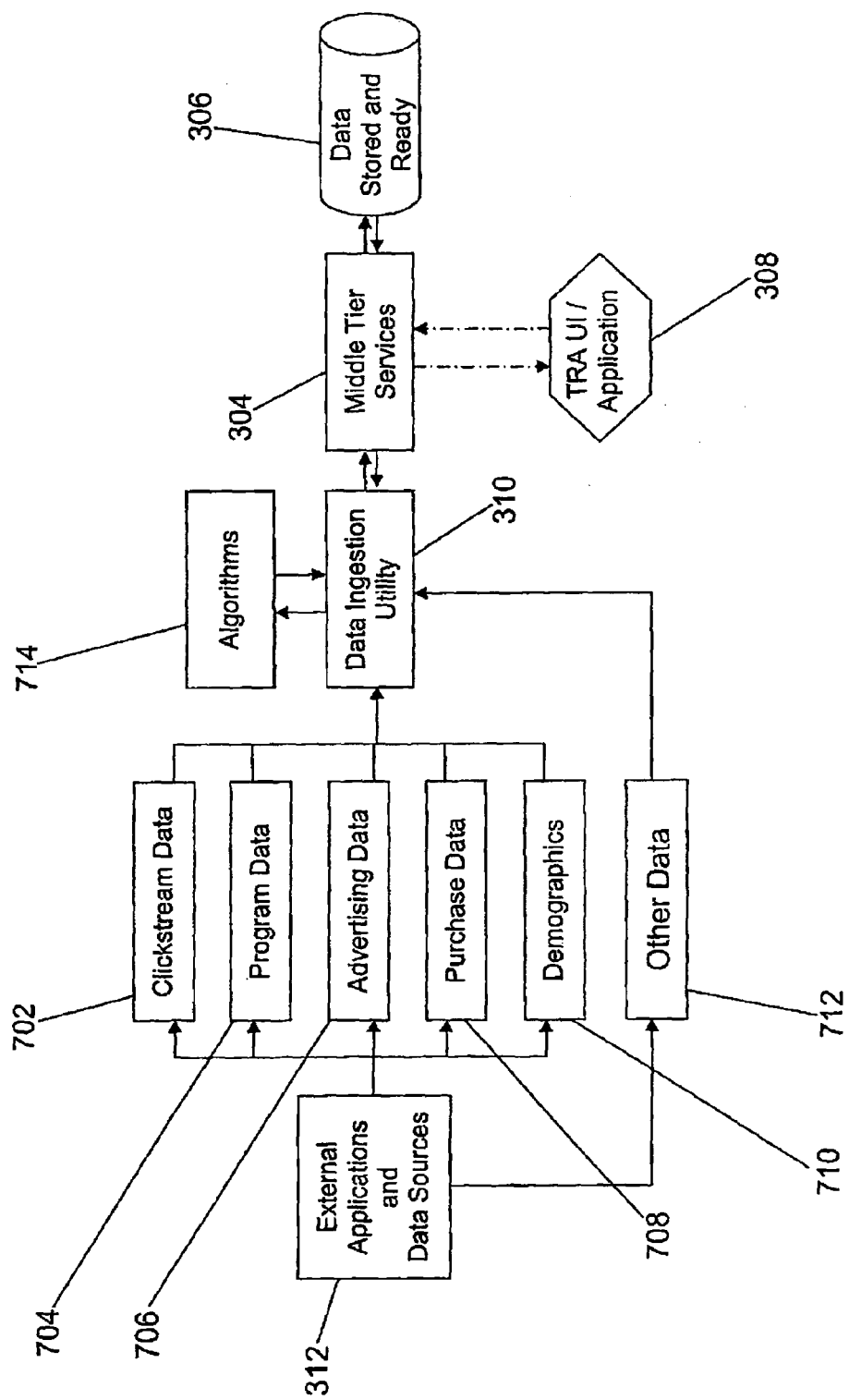
FIG. 7 includes a process flow diagram illustrating various exemplary aspects of a data feed process that may be performed in accordance with various embodiments of the invention.

With reference to FIG. 7, multiple data feeds may flow into the advertising measurement system 302 from various business partners, vendors and other external applications or data sources 312 on a continuous basis. The system 302 may acquire data stream feeds on a predefined frequency and timeframe from the external applications and data sources 312 including the following types of data, for example and without limitation: clickstream data 702 (e.g., in the context of television programming, this may be data generated by the DSTB 106 which provides detailed information about a clicking event such as changing the television channel—it may specify a cable box ID, time of the event, active channels, or other data); program data 704 including scheduled program data and actual program data (a "program" or "programming" may be defined as a specific piece of content such as "Friends" episode #100, for example, which is a television program); advertising data 706 such as ad schedules; purchase data 708 such as purchase type data, purchase information data, or product category data; demographics data 710; and/or other data 712 such as marketing or markets data, zones (MSO) data, or many other types of data.

Upon receiving the data, the system 302 may execute various algorithms 714 (as previously described herein) for initial data cleaning, editing, quality assurance and formatting purposes. Also, data and other information obtained from the data feeds can be loaded into and stored in the data access tier 306 for ready access to perform various measurements, calculations, report generation, and other uses within the system 302 such as various user interface applications of the presentation tier 308.

In the process of receiving and processing data, the advertising measurement system 302 may preserve the original raw data while making a copy of the original raw data set. The algorithms 714 may be applied to the data set to format or prepare the prior to system 302 data load, and data within each feed may be validated prior to system 302 data load. Initially, data extraction may be performed to store the data in a landing area of the system 302. Once the data is extracted to the landing area, there are numerous transformations that may be performed, such as cleansing the data, combining data from multiple sources, filtering out duplicates, and/or assigning database keys. A staging area of the system 302 may be configured with various database tables to contain the data in an intermediate form, where it can be readily manipulated. At this stage, applicable algorithms 714 (e.g., intab, false positive, outage/surfing, failure, or others) can be applied to the data and derived tables can be built. In a further step, loading of data into the data access tier 306 can be performed. This step may be implemented as part of the middle tier 304 processing in order to partition the new data, for example, in association with storing the data in the data access tier 306.

In certain embodiments, clickstream data 702 originating from DSTBs 106 of televisions 104A, for example, may be supplied in data feeds by television distribution system providers working in conjunction with DSTB 106 technology providers. Program data 704 supplied to the advertising measurement system 302 may originate from cable operators, advertising media firms, and other third-party data providers who communicate daily or periodic data feeds of scheduled television program data, for example. Such data may identify what was scheduled to air on each television channel. In addition, files containing replacement data for actual programs aired (as ran logs) can be communicated after (e.g., three weeks after) the scheduled program data 704 is communicated. This data can be combined with other data streams to calculate ad campaign efficiency and ROI impact, among other measurements.

Advertising data 706 supplied to the advertising measurement system 302 may originate from periodic raw data files received directly from television networks (e.g., CBS) which may be sent via electronic mail as a flat file with post programming data (actual program data) and ad data or may be derived from user input. Unless available from the television network, ad schedule data can be provided by advertising customers along with advertising campaign definitions as entered through the user interface functionality of the presentation tier 308 of the system 302, for example. A sample of an ad schedule as entered by a user through the presentation tier 308 is shown in FIG. 8. Campaign definitions may be used for advertising based analyses and campaigns may include one or more ads.

Purchase data 708 supplied to the advertising measurement system 302 may be provided by consumer goods data scanning and data vendors. The purchase data 708 may include purchase data types and product categories which can be used to cross-correlate consumer buying patterns with data such as household 102 and program and channel viewing patterns obtained from DSTB 106 clickstream data to measure marketing and ROI impact. In certain embodiments, category/product selections may be presented to users 326 to identify which universal product codes ("UPCs") have associated data and which UPC codes to assign to different product brands. Purchase type data may represent static data used to designate the data grouping as "CPG" (consumer packaged goods), "durable goods", or "Auto", for example. Purchase type data classification can be used to group data from other streams to allow raw tuning and program viewing data to be analyzed in terms of marketing and ROI impact, for example. Examples of purchase data 708 are shown in FIGS. 9A through 9C (FIG. 9A illustrates a mapping between UPC and product category; FIG. 9B illustrates a mapping between UPC and brand of product; and, FIG. 9C illustrates a sample purchase category format).

Data feeds including demographic data 710 can be provided by multiple sources including cable operators, the United States Census Bureau, credit agencies, advertising customers and other third-party data providers. The demographic data 710 can be combined with other data streams to allow the raw tuning and program viewing data to be analyzed in terms of marketing and ROI impact. In certain embodiments, the same demographic data 710 per household 102 may be used and stored for the entire report period being measured, even when the demographic data 710 may have changed during that period. The demographic data 710 used are those that applied for the mid-day of the report, for example. Demographic data 710 profiles can be preserved within the system 302 to create the ability to view old reports using the then-current demographic data 710 profiles. In certain embodiments, if the demographic data 710 has changed during a reporting interval, then the system 302 may use the most recent demographic data 710 available for reporting purposes. The demographic data 710 can be applied at any geographic level, and may include data such as, for example and without limitation: state, county, ZIP Code, ZIP code (+4), precinct, voting district, city, block group, block, census block, census tract, markets, or other like data.

Other data 712 communicated to the advertising measurement system 302 may include market data. For example, there are different designated television market areas across the United States, typically defined by county. Zone data may also be communicated to the system 302. Zone data is an MSO specific definition of markets within the customer base of the MSO and can be supplied by each individual MSO. Users 326 may be permitted to specify zone data when defining the target group for any report.

In various embodiments of the advertising measurement system 302, data stored in the system 302 may be organized into various table structures for ready access and processing of the stored data, such as for generating reports through the presentation tier 308, for example. Many reports offered and generated through the system 302 require ad hoc demographic, geographic and consumer-specific data filtering, making it challenging to aggregate data or pre-calculate certain results. For example, relevant target households 102 matching numerous demographic criteria comprising many different demographic elements may need to be selected and processed in real-time. Even if a general population is the basis of a query, households 102 may be limited by geographic criteria. Subsequently, many queries may be centered on ad viewing or program viewing fact tables which reflect instances of a DSTB 106 viewing of advertising content such as commercials and program airings. As shown in FIG. 10, the ad viewing table contains basic facts about a program viewing event (e.g., viewing start time, household ID, and DSTB ID, ad airing ID (and the associated program ID foreign keys), viewing duration, jump-in second, and number of stay away seconds). The viewing start field can be calculated as a number of seconds. The household ID and the DSTB ID can be combined into a single four-byte field, leaving one byte for the DSTB ID within a household. Viewing start and jump-in second data can be used to calculate the ad airing start. The viewing duration and stay away second data complete the data set. The program viewing table has similar structure and its relationships are shown on the sample table illustrated in FIG. 11.

An example of a purchases table is shown in FIG. 12 which contains purchases made by household 102. Also, an example of a households table is shown in FIG. 13. The households table may be used to maintain information about individual households 102 and household-specific demographics. For compactness, demographic elements may be preserved in the table as individual bits in a demographic bitmap.

In another example, a geographic area table may be provided to define geographic areas, their names and types. A sample geographic area table is shown in FIG. 14A. Also, a geographic area ZIP codes table may be used to determine which ZIP codes belong to certain geographic areas. This table may be used in connection with queries and reports that require geographic filtering. A sample of a geographic ZIP codes table is shown in FIG. 14B.

In certain embodiments, a clickstream table may be provided to contain raw clickstream data. The raw clickstream data may be completely decomposed into the ad viewing and program viewing tables during extraction, transformation and loading processes performed by the middle tier 304 of the system 302. An example of a clickstream table is shown in FIG. 15.

In various embodiments, the ad viewing, program viewing, and purchases tables can be subject to partitioning and placed into shards. The remaining tables may or may not be partitioned, and may be maintained either only in the middle tier 304 database, such as in the case of the geographic area table; or may be replicated to every partition, such as in the case of the households table and the geographic area ZIP codes. Certain fully replicated tables may be designed sufficiently small to be loaded into and maintained in fast access memory, rather than on a slower data storage medium such as a disk based file system. This approach may be employed to improve the performance of queries and report generation by the system 302.

Additional table structures which may be employed in the advertising measurement system 302 include, for example and without limitation, the following sample tables: an ads table (see FIG. 16); an ad airings table (see FIG. 17); a campaigns table (see FIG. 18); a channels table (see FIG. 19); a clients table (see FIG. 20); a dayparts table (see FIG. 21); a networks table (see FIG. 22); a product categories table (see FIG. 23); a products table (see FIG. 24); a purchases table (see FIG. 25); a program airing table (see FIG. 26); a programs table (see FIG. 27); a report selection criteria table (which shows various report characteristics that can be selected or uses for generating reports—see FIG. 28); an audience retention report table (for use with generating an audience retention report—see FIG. 29); an ROI report table (for use with generating ROI reports—see FIG. 30); an AME report table (for use with generating advertising/media exposure or AME reports—see FIG. 31); a DSTB intab table (for use with making intab calculations, for example—see FIG. 32); a DSTB false positive table (for use with making false positive algorithms, for example—see FIG. 33); and, a users table (for use with maintaining information for various users 326 of the system 302, for example—see FIG. 34). It can be appreciated that these are merely samples of table layouts, format and content, and many aspects of these tables may be varied or expanded within the scope of the invention.

In various embodiments, the presentation tier 308 may be web-based and configured to respond to many different kinds of user 326 interaction, such as gathering information from the user 326, sending the user information to business services of the middle tier 304 for processing, receiving results from the middle tier 304, and presenting those results to the user 326. The presentation tier 308 may employ a number of web applications which involve the middle tier 304 receiving, processing, storing, and communicating data with the presentation tier 308. In certain embodiments, the presentation tier 308 may be used to receive requests from users 326, collect input from user interfaces, provision and administer end users 326 and manage their entitlements, create and manage demographic profiles, create and manage advertisement campaigns, execute on demand and scheduled reports, or return results for display at the presentation tier 308. The data presentation tier 308 may be configured to allow users 326 to manipulate report result sets, add columns, hide columns, sort columns, change report layouts, add charts and pivot tables, or filter data without requiring additional access to the storage media of the data access tier 306, for example. Also, other administrative and reporting functions may be performed through access to the presentation tier 308, such as provisioning and administrating client organizations, provisioning and administrating end users and managing their entitlements, creating and managing demographic profiles, and creating and managing advertisement campaigns.

All or part of the following information may be displayed on a given report generated by the advertising measurement system 302: market (this will display the geographical area type and specific geographical area that the user 326 selected to generate the report); target group (this will display the demographic options selected); time frame (this will display whether a broadcasting day, week, month or other period was selected); name of schedule (the name of the schedule used to generate the report); intab sample size (this will display the sample size of the target group); date report run (date and time that the report was generated); and/or, user name (the user name of the current user 326 of the system 302).

Figure 35C:
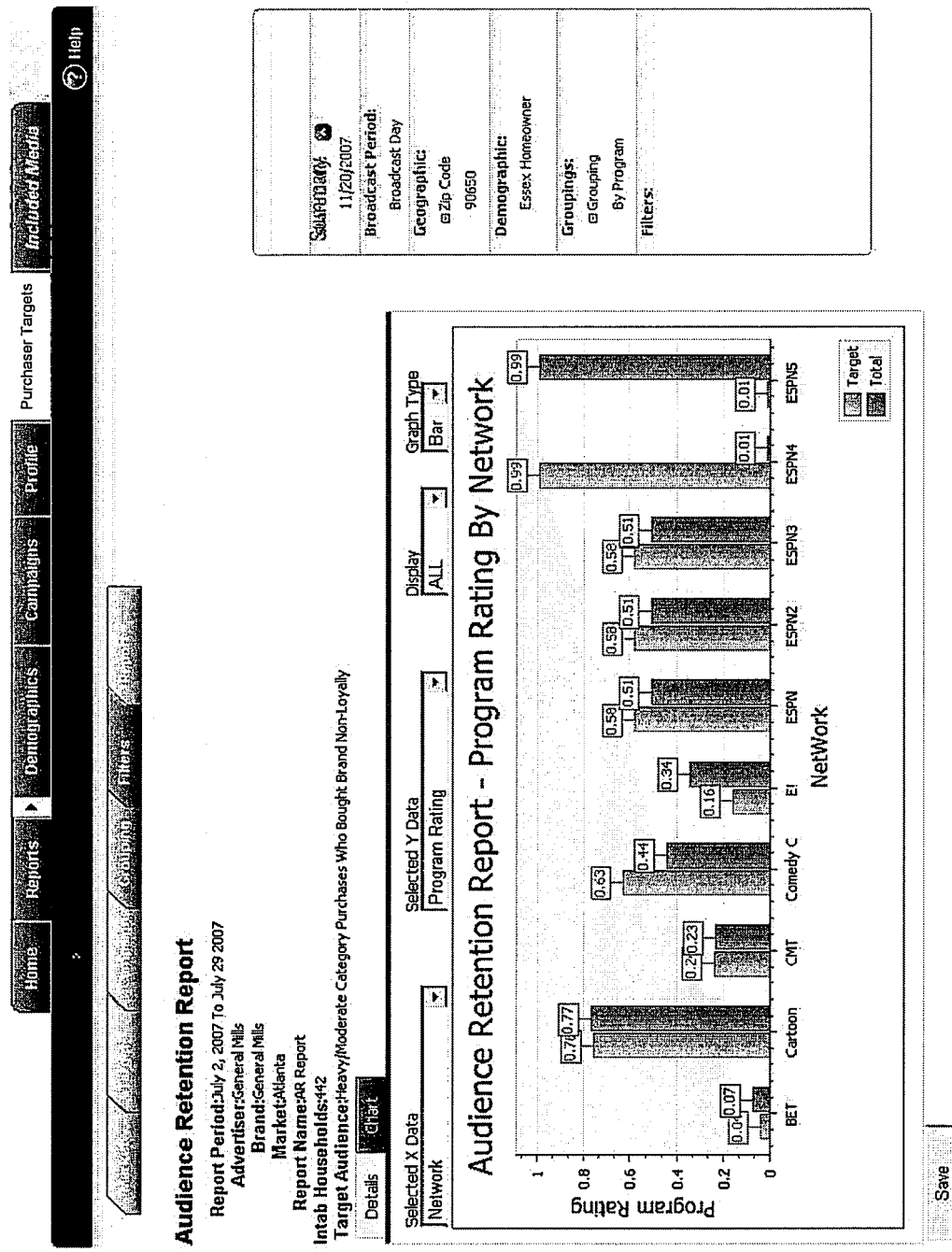

In certain embodiments, an audience retention report may be generated by the advertising measurement system 302 for access and display through the presentation tier 308, for example. The audience retention or AR report measures how well an ad maintains its audience without switching away based on when and how the ad is delivered and the ad creative itself. Several examples of audience retention reports are displayed in FIGS. 35A-35C2. The audience retention report may use the following data as inputs, for example: campaign data, if applicable; time selection; report date range; geography; demographics; column selection; weighted or unweighted statistics; ad airing selection; included/excluded media list/ratings threshold; and, desired report groupings (e.g., by daypart, network or channel, program, half hour, or target/total). A daypart is a segregation of a broadcasting week into different hour and day parts. Examples of potential daypart options are shown in the tabulation of FIG. 36 (these dayparts may be applicable to a variety of different reports generated by the system 302). The system 302 may then process the input data and return audience retention report calculations. This processing may include matching clickstream data 702 and/or applying one or more algorithms 714 (e.g., false positive; outage vs. surfing; multiset edit (MSE); census weighting; projection to population; lead lag time optimization; conformance to existing statistics; or others).

For example, in generating the audience retention report in a specified format, a first column may include selection criteria of the user 326 (e.g., by daypart, network, program, etc.). For each instance of a selection, a target record and a general record can be created and an audience column can identify which record is the target record (labeled as "Target"), and which record is the general record (labeled as "Total"). The "Target" group and the "Total" group each may have their own calculated statistics. A sample size column includes the number of households 102 who watched at least part of the advertisement defined by the advertising campaign selected by the user 326. A program rating column includes the rating for the television program associated with the advertisement. A rating column includes the percentage of households 102 in the population tuned to the row-identified time interval, source, or content averaged over the report period. A commercial rating includes a rating for the commercial. The rating can be calculated in the same manner as a program rating. A program cost per impression ("CPM") column includes the cost per one thousand impressions on a program basis. CPM may be calculated as follows: Media Cost/Number of Impressions*1000, wherein a value for Media Cost may be supplied by the user 326. A commercial CPM column includes a cost per one thousand impressions for a campaign and can be calculated in a manner similar to the program CPM value. The user 326 may supply the cost per advertisement, which is a subset of a campaign. A perfect play percentage column includes the percentage of viewers that watched a commercial in its entirety. A switch away percentage column includes the percentage of viewers that switched away from the advertisement while it was playing. A jump in percentage column includes the percentage of viewers that switched to the channel while the advertisement was playing. A modal switch away second column includes the number of seconds after the commercial started playing when viewers switched away from the commercial most often.

In certain embodiments, the audience retention report may also include a stay away column indicating the percentage of viewers that switched away from the advertisement while it was playing and did not return to the channel the advertisement was playing on for at least an hour (or another predetermined time period). Also, a stay away seconds column may provide an indication of the average number of seconds that the viewer user stayed away, for those viewers who switched away from the advertisement while it was playing and returned to the channel on which the advertisement was playing within an hour.

The audience retention report may also take into account a ratings threshold, so that if the report output is to be grouped by program or network (or both), programs and networks that are infrequently watched can be filtered out of the report. Also, if the report output is to be grouped by program or network, and a ratings threshold is selected, then the user 326 may be able to add programs to an included media list (if grouping by program) or networks to an included media list (if grouping by network). Adding a program/network to an included media list causes that program/network to always appear on the report, regardless of the ratings threshold. Likewise, if the report output is to be grouped by program or network, and a ratings threshold is selected, then the user 326 may be permitted to add programs to an excluded media list (if grouping by program) or networks to an excluded media list (if grouping by network). This is similar to the concept of an included media list, except that adding a program/network to an excluded list will cause that program/network to never appear on the report, regardless of the ratings threshold. Campaigns and advertisements used in various reports may be entered by the user 326 in advance, including times and channels advertisements were aired, for example. Also, specific measurements may be limited to the amount and scope of data correlated to the DSTB 106 data or demographic data 710, for example.

In the audience retention report, sample size may be determined by selecting all of the DSTBs 106 that fall under the given selection of input data (e.g., matching geographic, demographic and/or consumer-specific inputs). The system 302 may then count the DSTBs 106 that meet the selected criteria and the number of matching target DSTBs 106 can be displayed on the report. If the total grouping feature is also enabled, then the total DSTBs 106 can be displayed on the total row of the report.

In certain embodiments, a reach frequency report may be generated by the advertising measurement system 302. A reach frequency or RF report may be designed to measure how many times an ad is exposed in a household 102 and how many households 102 are reached by that exposure. Examples of reach frequency reports are displayed in FIGS. 37A and 37B. The reach frequency report may use the following data as inputs, for example: campaign data, if applicable; time selection; report date range; geography; demographics; column selection; weighted or unweighted statistics; ad airing selection; included/excluded media list/ratings threshold; frequency grouping and selection; and, desired report groupings (e.g., by daypart, network or channel, program, half hour, or target/total).

The system 302 may generate the reach frequency report in a specified format, including columns for audience (noting which record is the target record and which record is the general or total record); cost (this is the reported cost of the advertisements that were aired during the given time period); rating points (this is the sum of all ratings for the advertisement over the report period); cost per impression (CPM—this is the cost to the advertiser for one thousand impressions); impressions (the total number of impressions received by a population); average frequency (this statistic is the average number of times that the target households viewed the selected advertisement out of those who saw the advertisement at least once); and, frequency (of the all the selected households who saw at least one ad airing, this is the percentage of households who were exposed to between Y and Z airings).

In certain embodiments, a return on investment or ROI report may be generated by the advertising measurement system 302. The ROI report can be created on demand and allow users to determine how purchasing habits of a target group of consumers changed as the result of viewing an advertisement. The ROI report can be configured to compare the ROI achieved under different scenarios of target household 102 demographics and ad delivery. This will allow users 326, such as advertisers, to see which parts of the day, on which channels, during which programs airing advertisements aimed at a target group, or other demographics data yielded the best returns on investment. Examples of ROI reports are displayed in FIGS. 38A and 38B.

The ROI report may use the following data as inputs, for example: time selection (current and base period); report date range; purchase data; user type (heavy, medium, or light category purchase rate); user loyalty; and/or, report groupings (e.g., by daypart, network or channel, or frequency). The system 302 may generate the ROI report in a specified format, including one or more of the following columns or data fields: first grouping criteria; second grouping criteria (if applicable); percentage target reach (the percentage of households 102 of the selected demographic who tuned at least once over the base report period to the specified advertisement); target average frequency (out of the households 102 that viewed the advertisement at least once, this is the average number of times that a household 102 within the selected demographic viewed the advertisement within the base report period); target rating points (the sum of ratings for the advertisement over the base report period); cost per thousand impressions (CPM) targets (the cost to the advertiser for one thousand impressions from households 102 in the target demographic); increasers as percentage of targets reached (the percentage of households 102 in the target group that increased their level of purchasing of the product advertised between the base period and the current period); percentage increase in purchase revenue among targets (of the target population that increased spending, the percentage increase of money spent on a certain brand between the base period and the current period); ROI (return on investment on the specified advertising); and/or, ROI Index (ROI for the specific media vehicle or type versus the average ROI for all media employed by the brand during the time period specified and within other report filters the user 326 has specified). The user 326 can be provided with additional parameters to manipulate to allow the user 326 to calculate an ROI measurement consistent with a specific approach of the user 326 to calculating ROI (e.g., based on total retail sales dollars versus incremental retail sales dollars, gross or net revenue, with or without long-term advertising effects multiplier, with or without consumer lifetime value (CLV), and many others).

In certain embodiments, an advertising/media exposure report or AME report may be generated by the advertising measurement system 302. The AME report may be designed to measure how well an ad delivery schedule reaches the desired target audience. Examples of AME reports are displayed in FIGS. 39A and 39B. The AME report may use the following data as inputs, for example: time selection; report date range; geography; demographics; column selection; weighted or unweighted statistics; included/excluded media list/ratings threshold; minimum tuning parameter; and/or, grouping (e.g., by daypart, network or channel, or frequency). The system 302 may generate the AME report in a specified format, including one or more of the following columns or data fields: selection (the first column includes the user 326 selection criteria, listing the dayparts, half hours or programs that are applicable to the analysis); household rating (the percentage of households 102 using DSTBs 106 during a specific daypart, half-hour, or were watching a specific program divided by the total households 106); household rating index (a measurement of the rating of the target group with respect to the rating of the entire population); households using television (HUT is the percentage of all households 102 tuned into any channel during a time period); household share is the percentage of households 102 tuned to a particular channel during a daypart divided by the total households 102 tuned to any channel during the same daypart; reach is the percentage of households 102 tuned to the identified time interval, source, or content of households using television); cumulative reach (CUME is the number of distinct households 102 tuned sometime during the daypart to the specified channel divided by the total number of households 102). Ratings and share calculations described herein may also be made per average second or in response to another suitable time period.

In certain embodiments, a true target index or TTI report may be generated by the advertising measurement system 302. The TTI report analyzes the target composition of alternative media environments across large number of different target groups in a single report. The TTI report may be configured to compare the efficiency of reaching the true target audience (e.g., defined by demographics, purchase history, etc.) by different ad delivery means (e.g., channel, program, time of day, etc.). The TTI report may allow users to compare the effectiveness of defined advertising campaigns against each other when shown during specific shows via a rating index (described below). Advertisers can use this information to reallocate advertising dollars to television programs with increased exposure to a target audience. Examples of TTI reports are displayed in FIGS. 40A and 40B.

The TTI report may use the following data as inputs, for example: campaign data; time selection (current and base period); report date range; consumer purchase data; user type (e.g., heavy, medium, light category purchase); user loyalty (may be measured as SOR or share of requirements, meaning the percentage share that the household 102 spends in a given product category or on a given product brand); report groupings (e.g., daypart, network or channel, frequency). The TTI report may be generated in a specified format including columns or data fields for program (the first column may be an enumeration of the programs that are shown during the selected time period); and, a campaign rating index (for each advertising campaign that is set up by the user executing the report).

A number of pre-calculations, system processing algorithms, and post user input processing may occur throughout the generation of the reports. In generating the reports, various data may be appended to a household 102, which can then be distributed across analyzed segments according to the report parameters. For example, some parameter values specify analysis of the viewership of discrete household 102 populations; while others split a single household 102 viewership across multiple dimensions.

Figure 41:
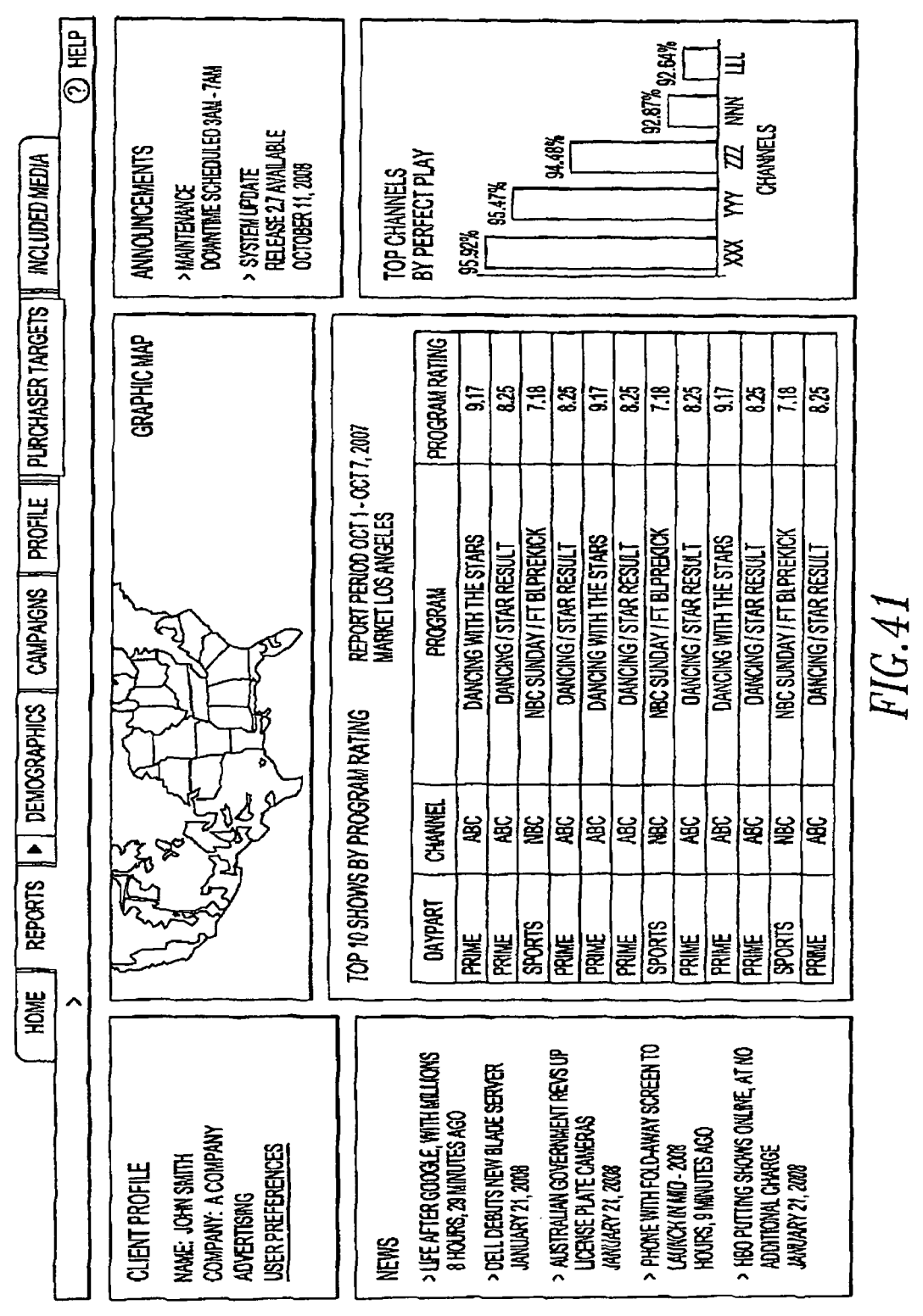
Figure 42:
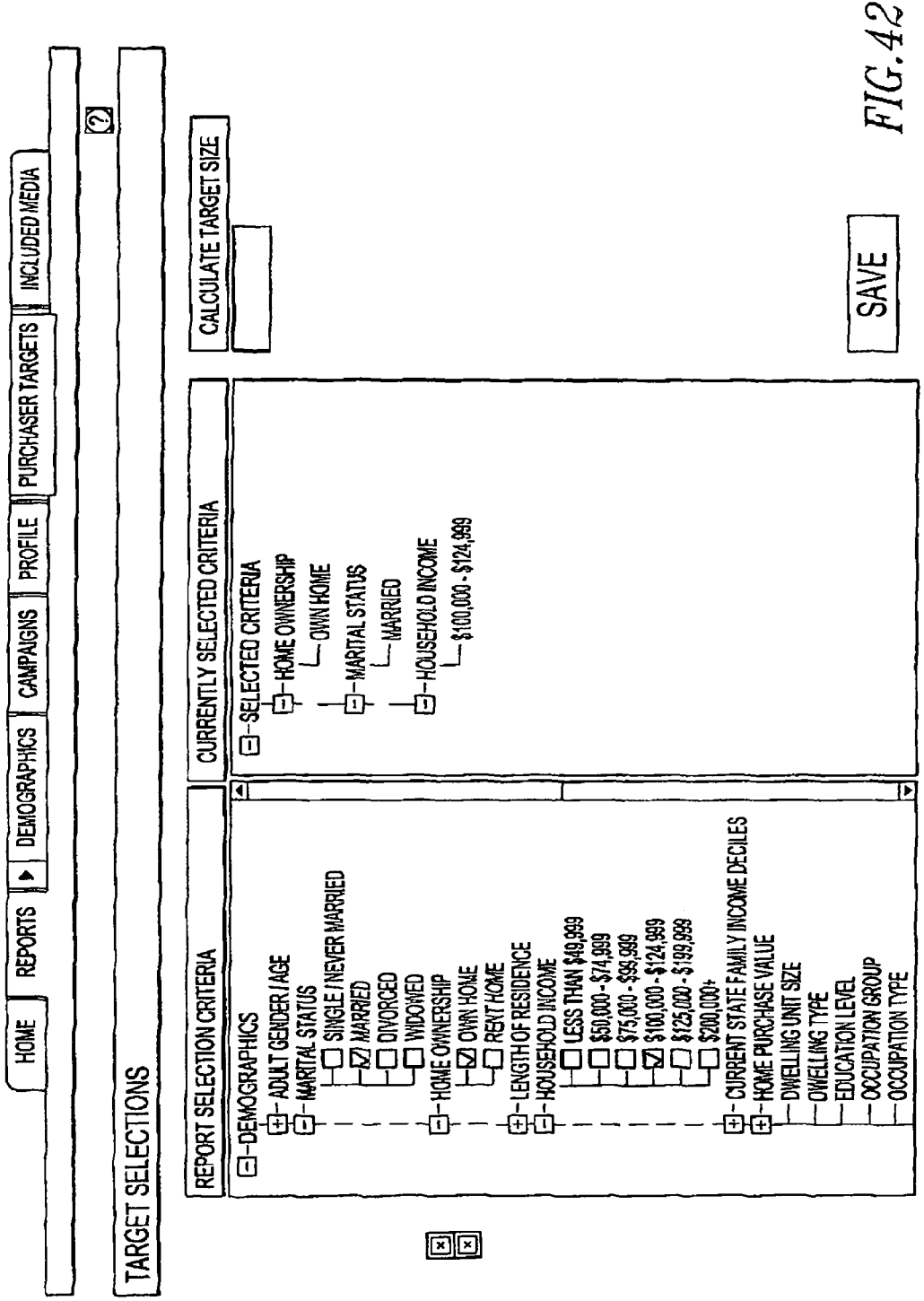
Figure 43:
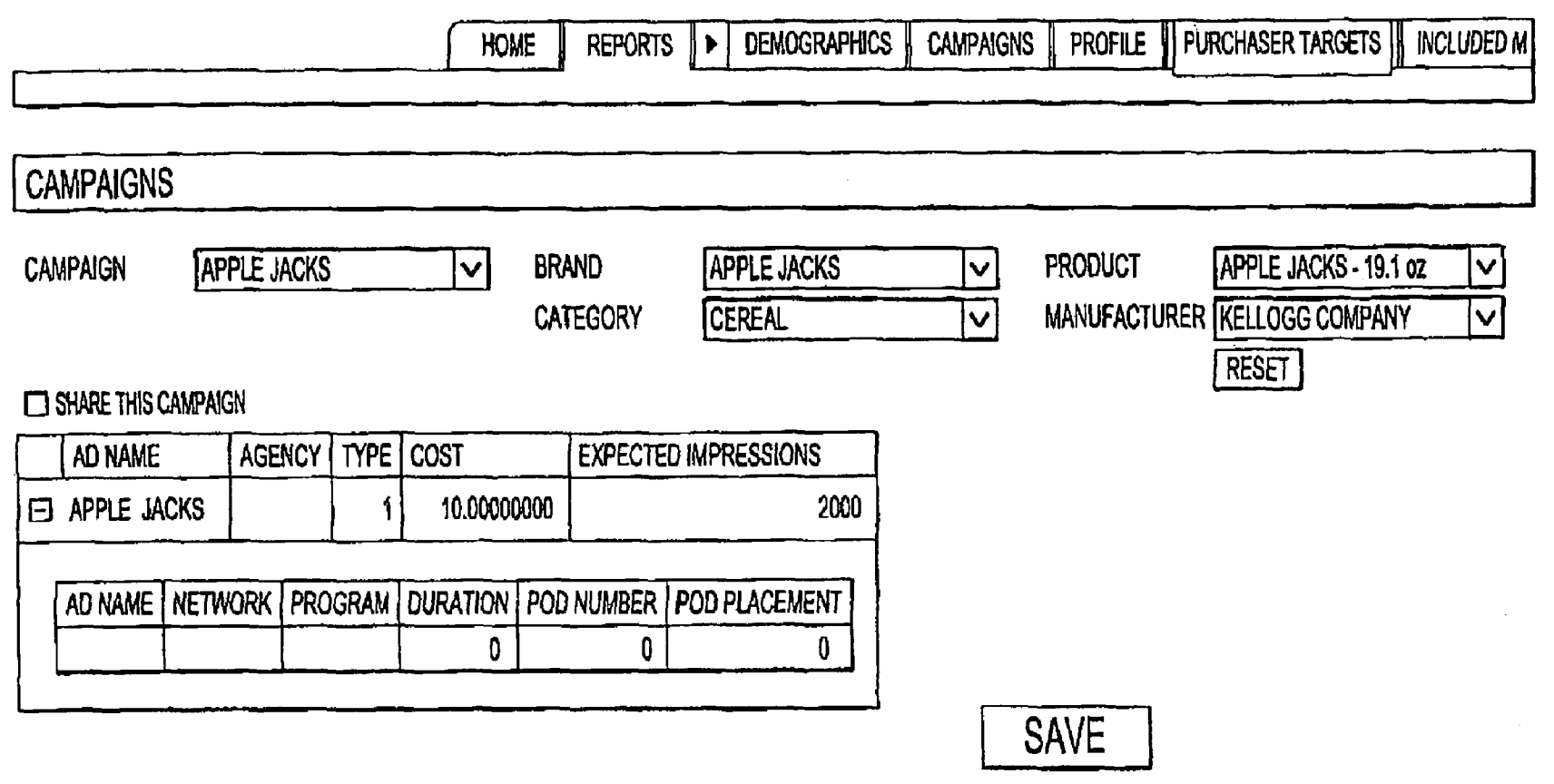
Figure 46:
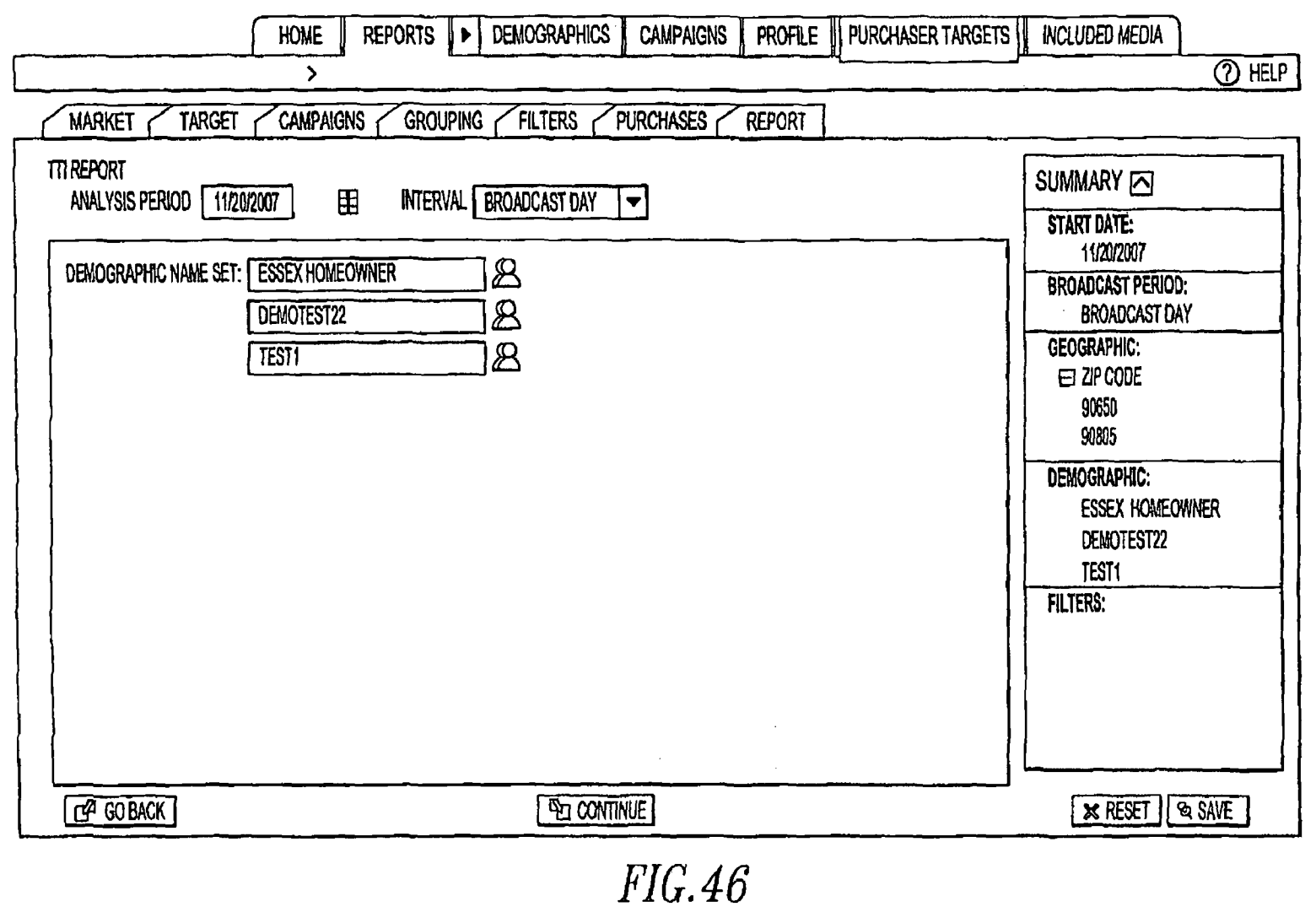
Figure 47A:
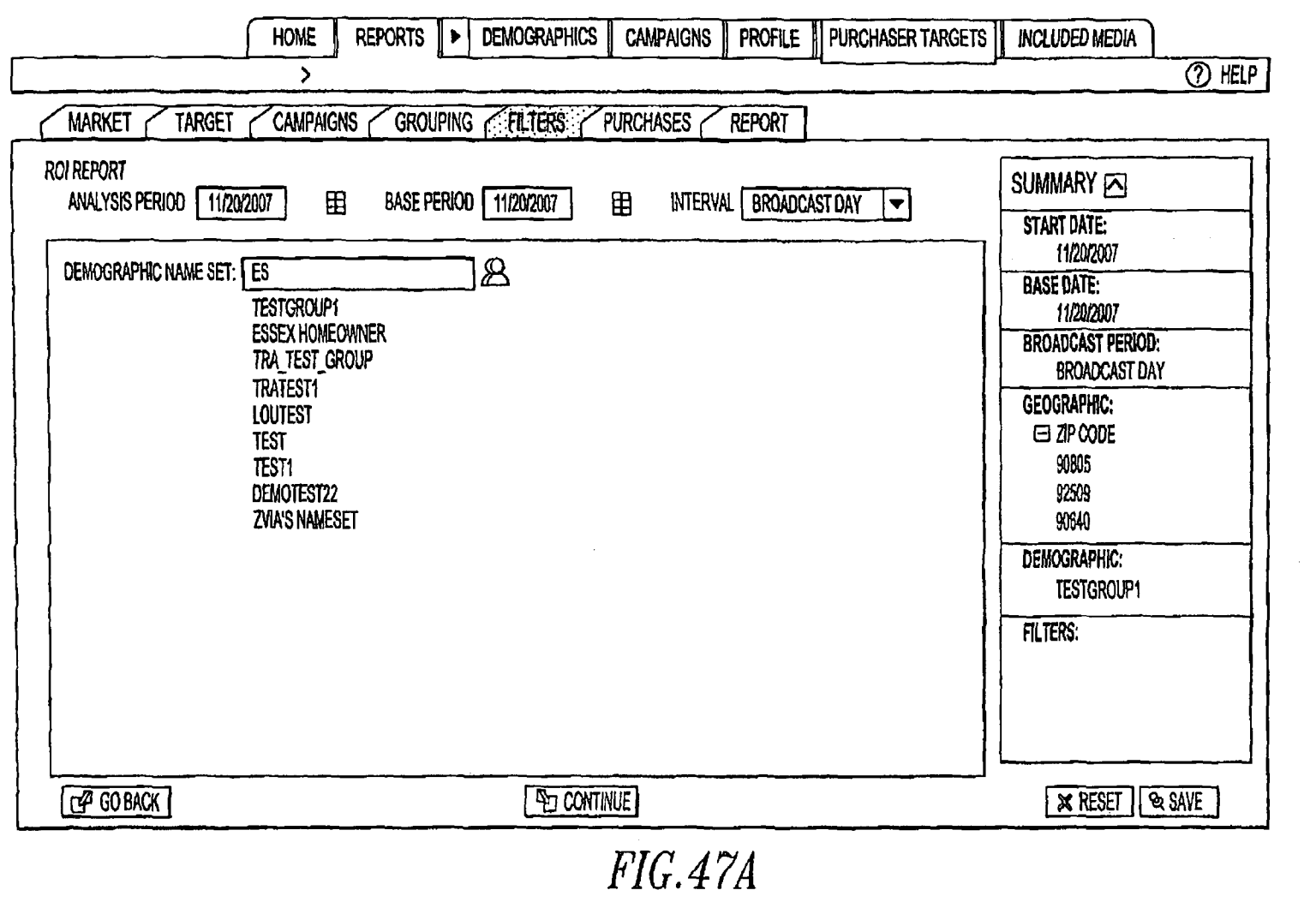
Figure 47B:
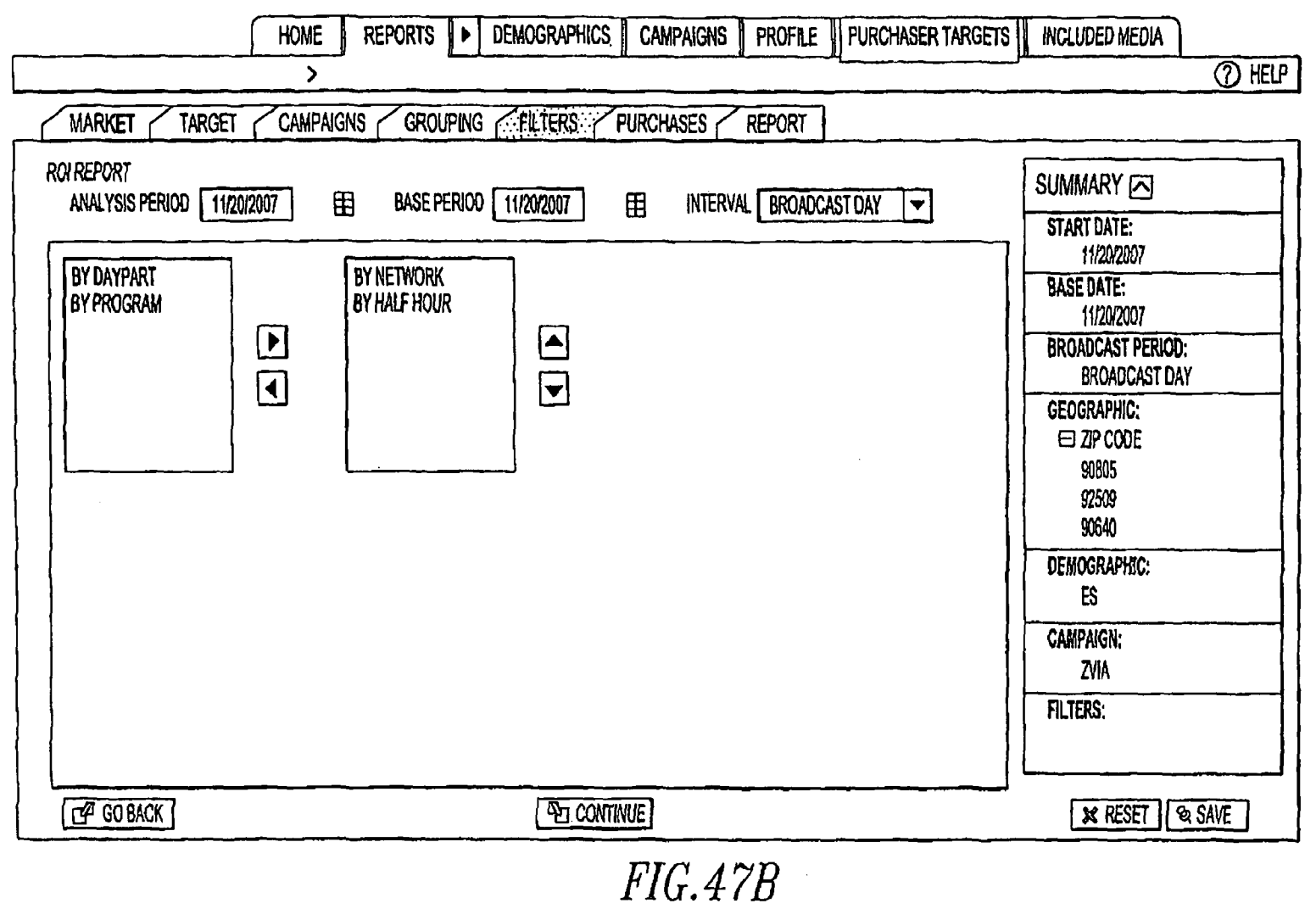
Figure 48:
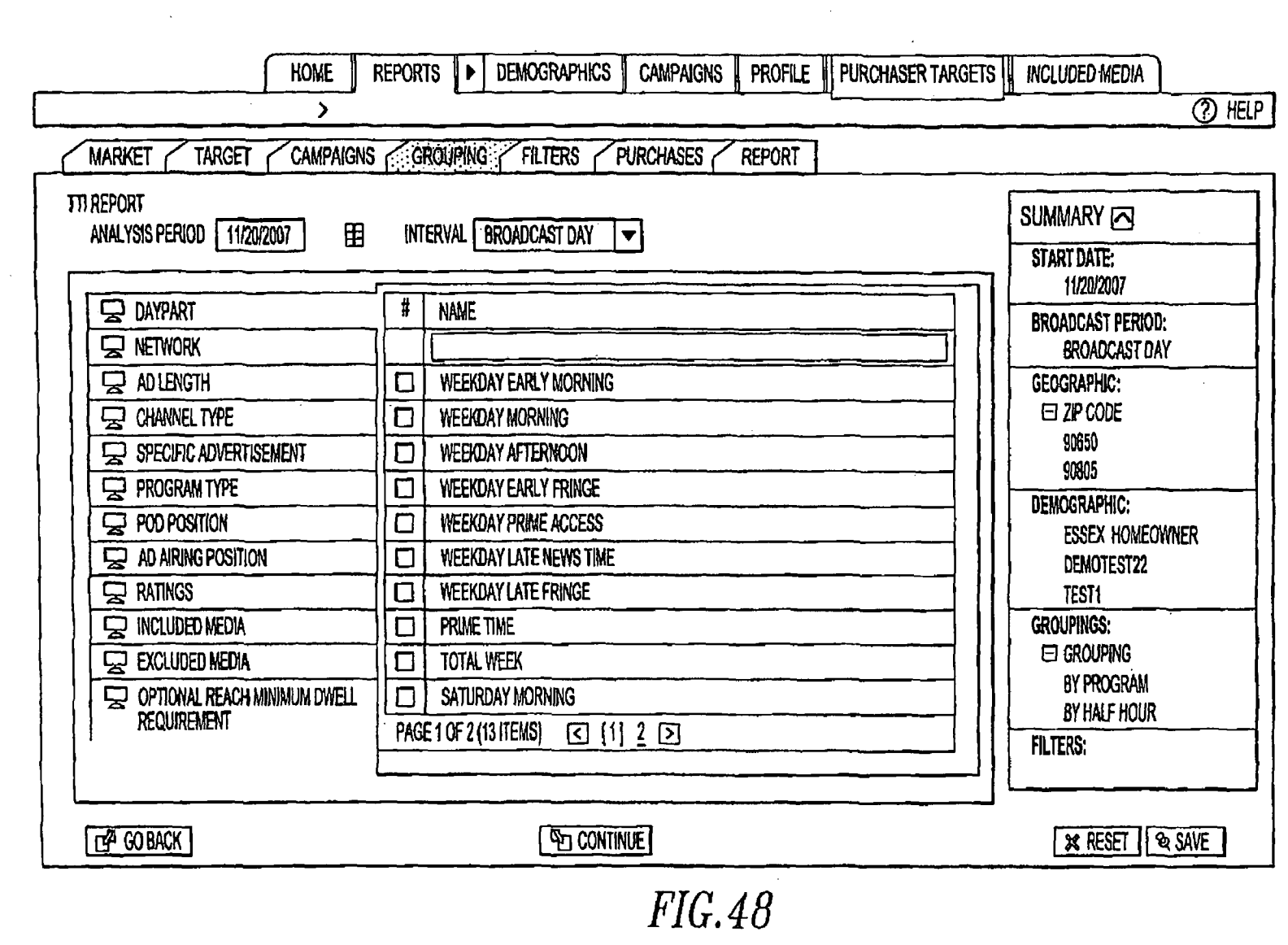

In association with various embodiments of the invention, FIG. 41 illustrates an example of a login screen that may be presented to users 326 upon first accessing the presentation tier 308 of the advertising measurement system 302. FIG. 42 illustrates an example of a demographic selections screen display that permits the user 326 to make various selections associated with the kind of reports or calculations that the user 326 wants to generate in connection with using the system 302. FIG. 43 illustrates an example of a campaigns screen display that permits the user 326 to manage various advertising campaigns which the user 326 is permitted to access through the system 302. FIG. 44 includes an example of an included media screen display that allows users 326 to specify which programming content or television shows should be included or excluded from analyses or reports generated in connection with the system 302. FIG. 45 shows an example of a purchaser targets screen display that can be used to make certain selections regarding the purchasing behavior, for example, of households 102 involved in a given analysis. FIG. 46 includes an example of a targets screen display which may be used in connection with generating a true target index (TTI) report. FIGS. 47A and 47B include examples of screen displays which may be used for generating ROI reports in connection with the system 302. FIG. 48 includes an example of a filter screen display that can be employed in generating various reports or conducting various analysis win connection with the system 302.

Various metrics or formulas may be calculated in connection with various embodiments of the invention. Non-limiting examples of these metrics include perfect play (percentage of DSTBs 106 that also tuned unbrokenly to the first and to the last second of an ad airing compared to the number of DSTBs 106 that tuned to any part of the ad airing); switch away (percentage of DSTBs 106 that tuned to the first second of an ad but switched away before the last second, compared to the number of DSTBs 106 that tuned to any part of the ad airing); jump in (percentage of DSTBs 106 that tuned to the last second of the ad airing but not to the first second compared to the number of DSTBs 106 that tuned to any part of the ad airing); average stay away seconds (average number of seconds the DSTBs 106 stayed away from a channel after switching away from the given ad airing); stayed away (percentage of those DSTBs 106 that switched away from a channel and did not return to that channel for X hours, wherein X can be a settable parameter, such as one hour); no play (for a given ad that aired in a given program, the percentage of DSTBs 106 that tuned to that program for at least X seconds (X being a settable parameter such as 600 seconds), but that missed being tuned to that ad); partial play (percentage of DSTBs 106 that were tuned to any part of an ad airing but did not tune to either the first or the last second of the ad, compared to the number of DSTBs 106 that tuned to any part of the ad airing); and, program partial play seconds (average number of total seconds tuned by DSTBs 106 to a program airing versus the length of the program).

Program metrics for program switch away, program jump in, program perfect play, program no play, program partial play, program stay away seconds, and program stayed away may be provided which correspond analogously to metrics defined for ad airings. In the context of programs, equivalent behavior can be readily modified to metrics such as average percentage of total program tuned, average percentage of ad time tuned, average percentage of ads tuned/missed, and average number of switch-aways, among others.

One example of a metric is a rating. A rating defines what percentage of the total possible audience tunes to a time period of interest. Time period can be defined by one or more program airings, commercial airings, dayparts, or arbitrary time intervals. Ratings can be based on a single channel or multiple channels. Ratings can be by DSTB 106, by household 102, or by households 102 having applied a multi-STB edit algorithm, for example. The ratings can be aggregated as the rating per average second, per average minute, etc. The generalized formula below describes the idea of average second household ratings:

$$\text{RATING} = \frac{\sum_{HH} \text{seconds\_tuned}}{\text{total\_seconds} * \text{number\_HH}}$$

A program/network CPM can be calculated by determining the number of ad airings from the selected campaign that were aired during a given program or network during the selected time interval. This can be done by examining the households 102 that have been selected in accordance with the input data. Next, these households 102 may be filtered to determine which households 102 watched at least part of an ad airing during a particular program or on a certain network. This can be calculated by taking the ad airings times and overlaying them onto clickstream data 702 from the appropriate households 102 and determining if a household was tuned into a given program/network. Using the cost ratio of ad airings belonging to a selected campaign, and the number of impressions gained during a program or network, the system 302 can calculate the program/network CPM as follows:

$$Program/NetworkCPM = \frac{\frac{eImpressions * inputCPM}{1000} * \frac{associatedAds}{totalAds}}{\sum_{i=1}^{numPro/Net} \sum_{j=1}^{numHHs} impression_{ij}} * 1000$$

wherein, numPro/Net is the number of instances of programs during the selected time period (if the selection is network, then this variable is 1); numHHs is the number of households 102 that fall under the inputted graphic information; eImpressions is the expected number of impressions (this may be input by the user 326 when an advertisement campaign is created); inputCPM is the expected CPM, based in eImpressions (data input by user); impressions equals 1 if $HH_i$ watched any portion of $Program_j$ or $Network_j$, or equals 0 if it did not; associatedAds is the number of ad airings associated with a given program or network that belong to the given advertisement; and, totalAds is the number of ad airings that belong to the given advertisement.

In a like manner, commercial CPM may be calculated as follows:

$$CommercialCPM = \frac{\frac{eImpressions * inputCPM}{1000} * \frac{associatedAds}{totalAds}}{\sum_{i=1}^{associatedAds}\sum_{j=1}^{numHHs} impression_{ij}} * 1000$$

wherein, numHHs is the number of households 102 that fall under the inputted graphic information; eImpressions is the expected number of impressions (data input by user); inputCPM is the expected CPM, based in eImpressions (data input by user when an advertisement campaign is created); $impression_{ij}$ equals 1 if $HH_i$ watched any portion of $AdAiring_j$, or equals 0 if it did not; associatedAds is the number of ad airings that aired during the given time selection that belong to the given advertisement; and, totalAds is the number of ad airings that belong to the given advertisement.

A perfect play percentage may calculated by examining the DSTBs 106 that have been selected in accordance with the input data. These DSTBs 106 may be filtered to determine which DSTBs 106 watched at least part of an ad airing. This can be done by taking the ad airings times and overlaying them onto clickstream data 702 from the appropriate DSTBs 106 to determine if a DSTB 106 was tuned into a channel that an ad airing was playing on at the same time that an ad airing was playing. Next, the DSTB 106 may be further examined to determine if the time span that the DSTB 106 was watching the channel started before and ended after the time of the given ad airing. The perfect play percentage can be calculated as the number of DSTBs 106 that watched an entire ad airing (determined by comparing the time spans of the DSTB 106 viewing versus the playing time of an ad airing) divided by the number of DSTBs 106 that watched at least part of an ad airing, as follows:

$$PerfectPlay = \frac{\sum_{i=1}^{numAdAirings}\sum_{j=1}^{numSTBs} viewWhole_{ij}}{\sum_{i=1}^{numAdAirings}\sum_{j=1}^{numSTBs} viewPart_{ij}}$$

wherein numAdAirings is the number of ad airings defined by the campaign; numSTBs is the number of DSTBs 106 that fall under the input data; viewWhole equals 1 if $STB_i$ watched $AdAiring_j$ in its entirety, or equals 0 if it did not; and, viewPart equals 1 if $STB_i$ watched at least some portion of $AdAiring_j$, or equals 0 if it did not.

A switch away percentage can be calculated by examining the DSTBs 106 that have been selected in accordance with the input data. These DSTBs 106 may be filtered to determine which DSTBs 106 watched at least part of an ad airing. This can be done by taking the ad airings times and overlaying them onto clickstream data 702 from the appropriate DSTBs 106 and determining if a DSTB 106 was tuned to a channel on which an ad airing was playing at the same time the ad airing was playing. Next, the DSTB 106 may be further examined to determine if the time span that the DSTB 106 was watching the channel started before the given ad airing started, and ended before the given ad airing ended. This signifies that the consumer switched the channel before the ad airing was over. The switch away percentage is the number of DSTBs 106 that started watching an ad airing but did not finish (determined by comparing the time spans of the DSTB 106 viewing versus the playing time of an ad airing), divided by the number of DSTBs 106 that watched at least part of an ad airing, as follows:

$$SwitchAway = \frac{\sum_{i=1}^{numAdAirings}\sum_{j=1}^{numSTBs} viewStart_{ij}}{\sum_{i=1}^{numAdAirings}\sum_{j=1}^{numSTBs} viewPart_{ij}}$$

wherein numAdAirings is the number of ad airings defined by the campaign; numSTBs is the number of DSTBs 106 that fall under the input data; viewStart equals 1 if $STB_i$ watched the beginning of $AdAiring_j$ but did not finish, or equals 0 if this is not the case; and, viewPart equals 1 if $STB_i$ watched at least some portion of $AdAiring_j$, or equals 0 if it did not.

A jump in percentage can be calculated by examining the DSTBs 106 that have been selected in accordance with the input data. These DSTBs 106 may be filtered to determine which DSTBs 106 watched at least part of an ad airing. This can be done by taking the ad airings times and overlaying them onto clickstream data 702 from the appropriate DSTBs 106 and determining if a DSTB 106 was tuned to a channel on which an ad airing was playing on at the same time that the ad airing was playing. The DSTB 106 can be further examined to determine if the time span that the DSTB 106 was watching the channel started after the given ad airing started. This signifies that the consumer switched onto the channel that the ad airing was on television during the ad airing. The jump in percentage can be calculated as the number of DSTBs 106 that started watching an ad airing starting in the middle of the ad airing (determined by comparing the time spans of the DSTB 106 viewing versus the playing time of an ad airing), divided by the number of DSTBs 106 that watched at least part of an ad airing, as follows:

$$JumpIn = \frac{\sum_{i=1}^{numAdAirings}\sum_{j=1}^{numSTBs} viewAfterStart_{ij}}{\sum_{i=1}^{numAdAirings}\sum_{j=1}^{numSTBs} viewPart_{ij}}$$

wherein numAdAirings is the number of ad airings defined by the campaign; numSTBs is the number of DSTBs 106 that fall under the input data; viewAfterStart equals 1 if $STB_i$ watched part of $AdAiring_j$ but was not watching when the ad airing started, or equals 0 if this is not the case; and, viewPart equals 1 if $STB_i$ watched at least some portion of $AdAiring_j$, or equals 0 if it did not.

A modal switch away second can be calculated by examining the DSTBs 106 that have been selected in accordance with the input data. These DSTBs 106 may be filtered to determine which DSTBs 106 watched at least part of an ad airing. This can be done by taking the ad airings times and overlaying them onto clickstream data 702 from the appropriate DSTBs 106 and determining if a DSTB 106 was tuned to a channel on which an ad airing was playing on at the same time that the ad airing was playing. The DSTB 106 can be further examined to determine if the time span that the DSTB 106 was watching the channel ended before the given ad airing ended. This signifies that the consumer switched the channel during the ad airing. Furthermore, how far into the ad airing the switch occurred can be determined. Then, after examining all DSTBs 106, determine at which second most DSTB 106 users switched the channel. The modal switch away second can be calculated as the number of seconds after the commercial started that most DSTBs 106 switched away from the ad airing, which is equal to the kth second that is used to maximize the following function:

$$\text{MAX}_{k=1}^{AdSeconds} \sum_{i=1}^{numAdAirings} \sum_{j=1}^{numSTBs} switch_{ijk}$$

wherein numAdAirings is the number of ad airings defined by the advertisement; numSTBs is the number of DSTBs 106 that fall under the input data; AdSeconds is the total number of seconds in the ad airing; $switch_{ijk}$ equals 1 if $STB_i$ watched part of $AdAiring_j$ and switched to another channel during second k, or equals 0 if this is not the case; and, $\text{MAX}_{b=i}^{a} f_i$ is a function that returns the greatest value of $f_i$, starting by using input parameter b for i and incrementing by one up until input parameter a.

A stay away value can be calculated by examining the DSTBs 106 that have been selected in accordance with the input data. These DSTBs 106 may be filtered to determine which DSTBs 106 watched at least part of an ad airing. This can be done by taking the ad airings times and overlaying them onto clickstream data 702 from the appropriate DSTBs 106 and determining if a DSTB 106 was tuned to a channel on which an ad airing was playing on at the same time that the ad airing was playing. The DSTB 106 can be further examined to determine if the time span that the DSTB 106 was watching the channel ended before the given ad airing ended. This signifies that the consumer switched away from the channel during the ad airing. If this is the case, how long it was until the DSTB 106 tuned back to the channel that the ad airing was on can be determined. The stay away percentage can be calculated as the number of DSTBs 106 that started watching an ad airing at some point during the ad airing and then switched away for at least an hour before returning (determined by comparing the time spans of the DSTB 106 viewing versus the playing time of an ad airing), divided by the number of DSTBs 106 that watched at least part of an ad airing, as follows:

$$StayedAway = \frac{\sum_{i=1}^{numAdAirings} \sum_{j=1}^{numSTBs} viewStayAway_{ij}}{\sum_{i=1}^{numAdAirings} \sum_{j=1}^{numSTBs} viewPart_{ij}}$$

wherein numAdAirings is the number of ad airings defined by the campaign; numSTBs is the number of DSTBs 106 that fall under the input data; viewStayAway equals 1 if $STB_i$ watched part of $AdAiring_j$, switched the channel before the ad airing ended, and stayed off the channel for at least an hour, or equals 0 if this is not the case; and, viewPart equals 1 if $STB_i$ watched at least some portion of $AdAiring_j$, or equals 0 if it did not.

A stay away seconds value can be calculated by examining the DSTBs 106 that have been selected in accordance with the input data. These DSTBs 106 may be filtered to determine which DSTBs 106 watched at least part of an ad airing. This can be done by taking the ad airings times and overlaying them onto clickstream data 702 from the appropriate DSTBs 106 and determining if a DSTB 106 was tuned to a channel on which an ad airing was playing on at the same time that the ad airing was playing. After this has been determined, the DSTB 106 can be further examined to determine if the time span when the DSTB 106 was watching the channel ended before the given ad airing ended. This signifies that the consumer switched away from the channel during the ad airing. If this is the case, how long it was until the DSTB 106 tuned back to the channel that the ad airing was on can be determined. The stayed away seconds can be calculated as the average number of seconds that it took for a DSTB 106 to return to a channel after it switched away during a given ad airing, out of the DSTBs 106 that returned within an hour of the switch away, as follows:

$$StayAwaySeconds = \frac{\sum_{i=1}^{numAdAirings} \sum_{j=1}^{numSTBsSwitch_i} secondsStayAway}{\sum_{i=1}^{numAdAirings} numSTBsSwitch_i}$$

wherein numAdAirings is the number of ad airings defined by the campaign; $numSTBsSwitched_i$ is the number of DSTBs 106 that fall under the input data, who also switched away during the $AdAiring_i$ and returned to the channel within an hour of the time of the switch; and, secondsStayAway is the number of seconds that $STB_j$ stayed away from the channel that $AdAiring_i$.

Cost can be calculated by determining the number of ad airings from the selected campaign that were aired during the selected time interval. Using the expected number of impressions, the expected CPM, and determining the fraction of ad airings in a campaign that are selected by the inputted time frame and grouping, the system 302 can calculate the cost of the given ad airings, as follows:

$$\text{Cost} = \frac{eImpressions * inputCPM}{1000} * \frac{associatedAds}{totalAds}$$

wherein eImpressions is the expected number of impressions (data input by user); inputCPM is expected CPM, based in eImpressions (data input by user when an advertisement is created); associatedAds is the number of ad airings that aired during the given time selection that belong to the given advertisement; and, totalAds is the number of ad airings that belong to the given advertisement.

Ratings points can be calculated by determining the number of ad airings from the selected campaign that were aired during the selected time interval and determining the rating of each applicable ad airing, which can be calculated as:

$$\text{RATING} = \frac{\sum_{HH} seconds\_tuned}{total\_seconds * number\_HH}$$

wherein rating is the average second rating for the population tuning to the row-identified time interval, source, or content;

HH is the households in the designated population (either target or total); num_HH is the number of households in the designated population (either target or total); tunedHH is the total number of seconds household HH tuned to the row-designated time interval, source, or content during the report period; and, total_seconds is the total possible number of seconds in the specified time interval during which viewing can take place. For example, for a half-hour program that airs five times a week, total_seconds is 1800*5=9000 seconds.

Next, grouping and summing the rating for all ad airings for specific time intervals and channels, as specified by user input, can be calculated as follows:

$$RatingsPoints = \sum_{i=1}^{Report\_period} rating_i$$

wherein $rating_i$ is the average second rating for the specified population for the given ad airing; and, report_period is the number of ad airings that belong to a given time selection.

Percentage target reach can be calculated by examining the DSTBs 106 that have been selected in accordance with the input data. Next, those DSTBs 106 tuned to the identified time interval, source, or content can be determined. Then, multi-DSTB household algorithms can be used to determine and count overlap of DSTBs 106 within a household 102. Dividing this result by the total number of DSTBs 106 that were selected in accordance with the input data then yields reach as follows:

$$reach = \frac{count(HH\_tuned)}{totalTargetHH} * 100$$

wherein HH_tuned is the number of distinct target households that were tuned to a given time interval, source, or content; and, totalTargetHH is the number of distinct target households that exist in the graphic selection.

Cost per impression (CPM) can be calculated by determining the number of ad airings from the selected campaign that were aired during the selected time interval. Next, the DSTBs 106 selected in accordance with the input data can be examined by filtering these DSTBs 106 to determine which were watched at least part of an ad airing. This can be done by taking the ad airings times and overlaying them onto clickstream data 702 from the appropriate DSTBs 106 to determine if a DSTB 106 was tuned to a channel on which a given ad airing was being played. Using the cost, ratio of ad airings belonging to a selected campaign, and the number of impressions gained during an ad airing, the system 302 can calculate the CPM as follows:

$$CPM = \frac{\frac{eImpressions * inputCPM}{1000} * \frac{associatedAds}{totalAds}}{\sum_{i=1}^{associatedAds} \sum_{j=1}^{numSTBs} impression_{ij}} * 1000$$

wherein numSTBs is the number of DSTBs 106 that fall under the input data; eImpressions is the expected number of impressions (entered by user); inputCPM is the expected CPM, based in eImpressions (input by user); impressions equals 1 if $STB_i$ watched any portion of $AdAiring_j$, or equals 0 if it did not; associatedAds is the number of ad airings that aired during the given time selection that belong to the given advertisement; and, totalAds is the number of ad airings that belong to the given advertisement.

Impressions can be calculated as the number of impressions for a group of ad airings. An impression can be defined as a consumer interacting with an advertisement once for some period of time. Viewing the entire advertisement is an impression, while viewing a small segment of the advertisement is also an impression. For example, a DSTB 106 consumer may yield one impression per ad airing. This is determined by analyzing clickstream data 702 and determining which DSTBs 106 from a selected population were able to view which selected ad airings.

Average frequency can be calculated by determining the number of ad airings from the selected campaign that were aired during the selected time interval. Next, the DSTBs 106 selected in accordance with the input data can be examined by filtering the DSTBs 106 to determine which were watched at least part of an ad airing. This can be done by taking the ad airings times and overlaying them onto clickstream data 702 from the appropriate DSTBs 106 to determine if a DSTB 106 was tuned to a channel on which a given ad airing was being played. The system 302 can calculate how many times each DSTB 106 was tuned into one of the selected ad airings, as follows:

$$AverageFrequency = \frac{\sum_{j=1}^{adAirings} \sum_{i=1}^{viewingHH} viewed_{ij}}{viewingHH}$$

wherein adAirings is the number of ad airings that are selected; viewingHH is the number of households that are selected who saw at least one part of one ad airing once; and, $viewed_{ij}$ equals 1 if $household_i$ viewed some part of $adAiring_j$, or equals 0 otherwise.

The definition of the frequency Y-Z column of the report may depend on input received from the user 326. It enumerates the number of households 102 who viewed at least a part of Y airings, Y+1 airings, . . . , Z−1 airings, or Z airings. As many as X of these columns may exist, depending on the input data. Finally, if this is the last of these X airings, the column is defined as Frequency Y-∞, which represents the number of households 102 who saw an ad airing Y or more times. It can be calculated by determining the number of ad airings from the selected campaign that were aired during the selected time interval. Next, the DSTBs 106 selected in accordance with the input data can be examined by filtering the DSTBs 106 to determine which were watched at least part of an ad airing. This can be done by taking the ad airings times and overlaying them onto clickstream data 702 from the appropriate DSTBs 106 to determine if a DSTB 106 was tuned to a channel on which a given ad airing was being played. The system 302 can calculate how many times each DSTB 106 was tuned into one of the selected ad airings ad airing, or how many DSTBs 106 viewed an ad airing between Y and Z times, as follows:

$$FrequencyYZ = \sum_{i=1}^{viewingHH} viewYZ_i$$

-continued $$viewedYZ_i = f\left(\sum_{j=1}^{adAirings} viewed_{ij}, Y, Z\right)$$

wherein adAirings is the number of ad airings that are selected; viewingHH is the number of households that are selected who saw at least one part of one ad airing once; viewed$_{ij}$ equals 1 if household$_i$ viewed some part of adAiring$_j$, or equals 0 otherwise; and, viewedYZ$_i$ equals 1 if $$\sum_{j=1}^{adAirings} viewed_{ij}$$

for household$_i$ is between Y and Z, or equal to Y or Z, or equals 0 otherwise.

In certain embodiments, users 326 may be able to view implications of moving cut-off points using a slider (e.g., by moving the slider, the user 326 would be able to see that moving the predetermined limit for a "heavy" category designation from 144 ounces per week to 120 ounces per week causes the "heavy" category to account for 40% of sales dollars versus 33% of sales dollars).

In generating the reports described herein, analysis of matchable clickstream data 702 may be performed, including identifying DSTBs 106 that were watching a given advertisement during a base period; determining the number of times that a DSTB 106 user viewed part of or the entire given advertisement during a base period and counting each instance of an advertisement at most once per DSTB 106 user; and, determining what channel, what program, and at what time the DSTB 106 user viewed the advertisement during a base period. Analysis of purchase data 708 may be performed by determining if a DSTB 106 user increased consumption of the advertised brand between a base period and a subsequent analysis period. If consumption was increased, the amount by which the DSTB 106 user increased consumption can be calculated.

Additional statistics that may be calculated by the system 302 include, for example and without limitation: the percentage of the population that viewed the advertisement at least once over the base period; the number of households 102 that viewed advertisement at least once; the average number of times that households 102 saw at least part of the advertisement; the sum of the ratings achieved by each instance of the advertisement over the base period; the cost of the advertisement per viewing, given the cost of the advertisement by the user; the percentage increase in the spending of the population that increased their consumption of a given product; the percentage ROI on the advertisements aired during the base period with respect to spending in the analysis period; and, a normalized index of the ROI measurement.

Also, an ROI matched weighting algorithm may be executed, wherein the report can be run on an ROI-matched subset of an intab sample, with geographic or demographic weighting applied to cause the weighted sample to reflect external data sources. A projection to population algorithm may permit a user 326 to input a number that represents a total population, and the system 302 can convert ratings and percentages into numbers in thousands, for example. A lead-lag time optimization algorithm may be executed to optimize the lead-lag time interval between causal exposure and sales effect based on a least squares or alternative mathematical model to determine best fit with results (i.e., to explain a maximum percentage of variance). Example lag times between advertising and buying include: weekly (food/beverage), monthly (cleaning supplies), seasonally (clothing), and, annually/multi-yearly (automobiles).

The household rating index can be calculated by calculating the rating for the target group selected with the demographic, consumer-specific, and geographic input data; and then calculating the rating for the total group (selected with only the geographic input). The household rating index can then be calculated by dividing the rating for the target group by the rating for the total group and multiplying by 100.

$$ratingIndex = \frac{targetRating}{totalRating} * 100$$

wherein targetRating is the rating for the target population, using the definition of rating as it appears above; and, totalRating is the rating for the total population, using the definition of rating as it appears above. A campaign rating index can be calculated in a like manner; a campaign rating index represents the percentage of households 102 in the population tuned to the row-identified time interval, source, or content averaged over the report period.

Households using television or HUT can be calculated by examining the DSTBs 106 that have been selected in accordance with the input data and determining how many seconds each DSTB 106 was using television during the selected period of time. Next, the total amount of time that each DSTB 106 could have been using television if they continuously were watching television can be calculated. HUT is then calculated as the quotient of these two values, as follows:

$$HUT_{daypart} = \frac{\sum_{HH} seconds\_tuned_{HH, daypart}}{totalSeconds_{daypart} * numberHH}$$

wherein seconds_tuned$_{i,j}$ is the number of seconds that household$_i$ was tuned into a channel during daypart$_j$; HH is the households 102 in the designated population; numberHH is the number of households 102 in the designated population; and, totalSeconds is the total number of seconds that were available for viewing to take place (e.g., for the weekday afternoon daypart (M-F 12-4 PM) the total_secondsdaypart is the total number of seconds in that daypart per period).

Household share can be calculated by calculating the rating for a given channel, daypart, and time interval; calculating the households using television for a given daypart and time interval; and share is the quotient of these two values, as follows:

$$share_{channel, daypart, timePeriod} = \frac{rating_{channel, daypart, timePeriod}}{HUT_{daypart, timePeriod}}$$

wherein timePeriod is the period of time inputted into the report (e.g., a broadcasting day, week, or month); HUT is the households using television for the given daypart and time period, as defined above; and, rating is the rating for a channel during a given daypart and period of time, as defined above.

Reach can be calculated by examining the DSTBs 106 that have been selected in accordance with the input data and determining how many of those DSTBs 106 were tuned to the identified time interval, source, or content. Reach can be calculated as follows:

$$\text{reach} = \frac{\text{count(HH\_tuned)}}{\text{totalTargetHH}} * 100$$

wherein HH_tuned is the number of distinct target households 102 that were tuned to a given time interval, source, or content; and, totalTargetHH is the number of distinct target households 102 that exist in accordance with the input data.

Cumulative reach or CUME can be calculated by examining the DSTBs 106 that have been selected in accordance with the input data and determining how many of those DSTBs 106 were tuned to the specified channel during a given daypart. The minimum tuning daypart parameter may be used as a criterion for determining whether a given household 102 should count towards CUME or not. If the household 102 tunes into a channel less than the amount specified by minimum tuning daypart, then it should not be counted toward CUME. CUME can be calculated as follows:

$$CUME = \frac{\text{count(HH\_tunedChannel)}}{\text{totalTargetHH}} * 100$$

wherein HH_tunedChannel is the number of distinct target households 102 that were tuned to a given channel during a given daypart; and, totalTargetHH is the number of distinct target households that exist in the selection in accordance with the input data.

As described above, data such as clickstream data can be partitioned within the data access tier 306 such that all information related to a single household 102 is located in a single data partition. In order to calculate the reach or reach ratio across multiple partitions, both counts (distinct_target_HH_tuned and total_num_target_HH) can be summarized for every partition and the results divided into each other, as follows:

$$\text{target\_reach} = \frac{\sum_s \text{count(distinct\_target\_HH\_tuned)}_s}{\sum_s \text{total\_num\_target\_HH}_s} * 100$$

wherein count(distinct_target_HH_tuned)$_s$ is the count of distinct households 102 among the target population tuned at least once over a report period (week, month, etc.) to the identified time interval, source, or content for partition s; and, total_num_target_HH$_s$ is the total number of households 102 in the target population for partition s.

In connection with certain reach calculations, the data access tier 306 can be configured to be responsible for: choosing a sequence of partitions (A, B, C, . . . , n) out of all duplicate partitions and shards (load balancing); scheduling queries (e.g., count(distinct_target_HH_tuned) and total_num_target_HH); waiting for and collecting responses from individual shards; calculating the final result; and, communicating the final result to a service or module of the middle tier 304.

Those skilled in the art will appreciate that both of the reach and CUME calculations described above can be performed for any selected set of target households 102.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, table layouts, or report formats described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer software language type such as, for example, C, C#, .NET, SQL, MySQL, HTML, or C++ using, for example, conventional or object-oriented techniques. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site).

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "propagation medium" may include one or more data signals transmitted on one or more carrier waves. Such a medium may include any of the forms listed above with respect to storage devices and may further include, for example, a carrier wave modulated, or otherwise manipulated, to convey instructions that may be read, demodulated/decoded and executed by a computer.

A "computer" or "computer system" may be, for example, a wireless or wire line variety of a microcomputer, minicomputer, server, mainframe, laptop, personal data assistant (PDA), wireless e-mail device (e.g., "BlackBerry" trade-designated devices), phone, smart phone, cellular phone, cable box, pager, processor, fax machine, scanner, or any programmable device configured to transmit and receive data over a network. Computer devices disclosed herein may include memory for storing certain software applications used in obtaining, processing and communicating data. It can be appreciated that such memory may be internal or external to the disclosed embodiments. The memory may also include any means for storing software, including a hard disk, an optical disk, floppy disk, ROM (read only memory), RAM (random access memory), PROM (programmable ROM), EEPROM (electrically erasable PROM), and other computer-readable media.

In various embodiments of the present invention disclosed herein, a single component may be replaced by multiple components, and multiple components may be replaced by a single component, to perform a given function or functions. Except where such substitution would not be operative to practice embodiments of the present invention, such substitution is within the scope of the present invention.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A computer-implemented method for facilitating analysis of consumer behavior in association with advertising exposure or program delivery, the method comprising:
   collecting in an advertising measurement system:
   (i) clickstream data from a program delivery source of a consumer, wherein collecting the clickstream data is not dependent on a supplemental data collection device, and also wherein the collected clickstream data includes household level data associated with multiple consumer households;
   (ii) advertising data associated with delivery of the program by the program delivery source, wherein collecting the advertising data is not dependent on a supplemental data collection device, and also wherein the collected advertising data includes household level data associated with multiple consumer households;
   (iii) program data associated with the program delivered on the program delivery source, wherein collecting the program data is not dependent on a supplemental data collection device, and also wherein the collected program data includes household level data associated with multiple consumer households; and,
   (iv) purchase data from a purchase data source, wherein collecting the purchase data is not dependent on a supplemental data collection device, and also wherein the collected purchase data includes household level data associated with multiple consumer households;
   matching at least portions of the collected advertising data, the collected clickstream data, the collected purchase data, and the collected program data in the advertising measurement system at a household data level with a centrally located electronic computer processor configured for centrally processing data received from the program delivery source, the advertising data source, the program data source, and the purchase data source, wherein the matching further includes:
   (i) grouping the collected data in association with an account identifier of each consumer household without processing any personally identifiable information associated with the consumer household, and
   (ii) matching each account identifier associated with each consumer household with other account identifiers associated with the same consumer household without processing any personally identifiable information associated with the consumer household;
   storing the matched advertising data, clickstream data, purchase data, and program data in at least one centrally located electronic data storage medium operatively associated with the computer processor;
   applying at least one cleansing and editing algorithm to the matched and stored data; and,
   calculating at least one return on investment metric based on the matched and stored data.

2. The method of claim 1, further comprising receiving clickstream data derived from a program delivery source comprising a television set-top box operatively associated with a television distribution system.

3. The method of claim 1, further comprising receiving clickstream data from a program delivery source comprising web pages via an Internet connection.

4. The method of claim 1, wherein at least a portion of the advertising data includes advertising campaign information.

5. The method of claim 1, wherein the cleansing and editing algorithm includes a multi-set top box editing algorithm for accounting for multiple set-top boxes in the same household.

6. The method of claim 1, wherein the cleansing and editing algorithm includes a false positives editing algorithm for identifying when a television is not powered and a set-top box operatively associated with the television is powered.

7. The method of claim 1, wherein the cleansing and editing algorithm includes a demographics weighting algorithm.

8. The method of claim 1, wherein the cleansing and editing algorithm includes an outage weighting algorithm calculated in response to an outage of at least one program delivery source in at least one household for applying a weight to data collected from in-service households.

9. The method of claim 1, wherein the cleansing and editing algorithm includes an algorithm for distinguishing between lost data and data derived from repeated changing of channels on the program delivery source by the consumer by applying a minimum dwell time filter prior to receiving the data in the advertising measurement system.

10. The method of claim 1, wherein the cleansing and editing algorithm includes an intab editing algorithm for excluding data collected from at least one household from which at least some data has been lost due to a technical difficulty experienced by at least one of the program delivery source or a program source.

11. The method of claim 1, further comprising receiving data in the advertising measurement system from at least one external application or data source.

12. The method of claim 11, wherein the received data includes demographics data.

13. The method of claim 1, further comprising generating a reach frequency report in the advertising measurement system.

14. The method of claim 1, further comprising generating an advertising/media exposure report in the advertising measurement system.

15. The method of claim 1, further comprising generating an audience retention report in the advertising measurement system.

16. The method of claim 1, further comprising calculating a stayed away metric in response to at least the clickstream data.

17. The method of claim 1, further comprising calculating a stay away metric in response to at least the clickstream data.

18. The method of claim 1, further comprising calculating a no-play metric in response to at least the clickstream data.

19. The method of claim 1, further comprising calculating a partial play metric in response to at least the clickstream data.

20. The method of claim 1, further comprising:
   receiving market touchpoint data and demographic data from one or more data suppliers in the advertising measurement system, the received data being grouped by one or more account numbers associated with a household of a consumer and not including any personally identifiable information associated with the household;
   in parallel, facilitating communication of at least the demographic data and the market touchpoint data from the data suppliers to a list matcher, the communicated data including personally identifiable information associated with the household and the account numbers associated with the household and excluding the market touchpoint data and the demographic data;
   receiving a thesaurus from the list matcher, wherein the thesaurus relates each account number of the household to other account numbers associated with the same household; and,
   using the thesaurus to match data received from the data suppliers for associating data relating to the household to records for the household in the advertising measurement system.

21. The method of claim 1, further comprising using at least a portion of the matched data to drive at least one addressable commercial to the household.

22. The method of claim 1, further comprising:
   receiving market touchpoint data in the advertising measurement system; and,
   matching the market touchpoint data with at least a portion of the matched advertising data, clickstream data, purchase data, and program data.

23. The method of claim 1, further comprising receiving supplemental household data from an advertiser in the advertising measurement system.

24. The method of claim 1, further comprising facilitating direct data communication between the advertising measurement system and a computer system of an advertiser via at least one application program interface.

25. The method of claim 1, wherein the purchase data is associated with product purchase records of a consumer held by at least one of a manufacturer, a distributor, or a retailer.

26. The method of claim 1, wherein the purchase data is associated with product purchase records of a discount card associated with the consumer.

27. The method of claim 1, wherein the purchase data is associated with product warranty card completed by the consumer.

28. The method of claim 1, further comprising generating a true target index report in the advertising measurement system.

29. The method of claim 1, further comprising generating a return on investment report in the advertising measurement system.

30. The method of claim 1, further comprising calculating a cost of an advertisement per viewing.

31. The method of claim 1, further comprising calculating a percentage increase in spending of households increasing consumption of a given product.

32. The method of claim 1, further comprising calculating the return on investment metric in response to one or more advertisements aired during a base period with respect to spending by the consumer in an analysis period.

33. The method of claim 32, further comprising using at least a portion of the collected data to drive at least one addressable commercial to the household in response to the calculated return on investment metric.

34. The method of claim 1, further comprising facilitating at least one multivariate analysis in connection with the matched data to generate a predictive estimate of the contribution of each component in the multivariate analysis to a sales effect of advertising associated with a brand.

35. The method of claim 1, wherein collecting the clickstream data further comprises collecting an indication of a consumer-initiated change in a program delivered on the program delivery source.

36. A computer system for facilitating analysis of consumer behavior in association with advertising exposure or program delivery, the system comprising:
   an advertising measurement system including a centrally located electronic computer processor configured for:
   (i) collecting clickstream data from a program delivery source of a consumer, wherein collecting the clickstream data is not dependent on a supplemental data collection device, and also wherein the collected clickstream data includes household level data associated with multiple consumer households;
   (ii) collecting advertising data associated with delivery of the program by the program delivery source, wherein collecting the advertising data is not dependent on a supplemental data collection device, and also wherein the collected advertising data includes household level data associated with multiple consumer households;
   (iii) collecting program data associated with the program delivered on the program delivery source, wherein collecting the program data is not dependent on a supplemental data collection device, and also wherein the collected program data includes household level data associated with multiple consumer households;

(iv) collecting purchase data from a purchase data source, wherein collecting the purchase data is not dependent on a supplemental data collection device, and also wherein the collected purchase data includes household level data associated with multiple consumer households;

(v) matching at least portions of the collected advertising data, the collected clickstream data, the collected purchase data, and the collected program data at a household data level, wherein the matching further includes:

(a) grouping the collected data in association with an account identifier of each consumer household without processing any personally identifiable information associated with the consumer household, and (b) matching each account identifier associated with each consumer household with other account identifiers associated with the same consumer household without processing any personally identifiable information associated with the consumer household;

at least one centrally located electronic data storage medium operatively associated with the computer processor, the data storage medium configured for storing the matched advertising data, clickstream data, purchase data, and program data;

a module programmed for applying at least one cleansing and editing algorithm to the matched and stored data; and, a module programmed for calculating at least one return on investment metric based on the matched and stored data.

37. The system of claim 36, further comprising a data ingestion utility configured to receive clickstream data derived from a program delivery source comprising a television set-top box operatively associated with a television distribution system of the consumer.

38. The system of claim 36, further comprising a data ingestion utility configured to receive clickstream data derived from a program delivery source comprising web pages via an Internet connection.

39. The system of claim 36, wherein at least a portion of the advertising data includes advertising campaign information.

40. The system of claim 26, wherein the cleansing and editing algorithm includes a multi-set top box editing algorithm for accounting for multiple set-top boxes in the same household.

41. The system of claim 36, wherein the cleansing and editing algorithm includes a false positives editing algorithm for identifying when a television is not powered and a set-top box operatively associated with the television is powered.

42. The system of claim 36, wherein the cleansing and editing algorithm includes a demographics weighting algorithm.

43. The system of claim 36, wherein the cleansing and editing algorithm includes an outage weighting algorithm calculated in response to an outage of at least one program delivery source in at least one household for applying a weight to data collected from in-service households.

44. The system of claim 36, wherein the cleansing and editing algorithm includes an algorithm for distinguishing between lost data and data derived from repeated changing of channels on the program delivery source by the consumer by applying a minimum dwell time filter prior to receiving the data in the advertising measurement system.

45. The system of claim 36, wherein the cleansing and editing algorithm includes an intab editing algorithm for excluding data collected from at least one household from which at least some data has been lost due to a technical difficulty experienced by at least one of the program delivery source or a program source.

46. The system of claim 36, further comprising the advertising measurement system being configured to receive data from at least one external application or data source.

47. The system of claim 46, wherein the received data includes demographics data.

48. The system of claim 36, further comprising a module configured to generate a reach frequency report in the advertising measurement system.

49. The system of claim 36, further comprising a module configured to generate an advertising/media exposure report in the advertising measurement system.

50. The system of claim 36, further comprising a module configured to generate an audience retention report in the advertising measurement system.

51. The system of claim 36, further comprising a module configured to calculate a stayed away metric in response to at least the clickstream data.

52. The system of claim 36, further comprising a module configured to calculate a stay away metric in response to at least the clickstream data.

53. The system of claim 36, further comprising a module configured to calculate a no-play metric in response to at least the clickstream data.

54. The system of claim 36, further comprising a module configured to calculate a partial play metric in response to at least the clickstream data.

55. The system of claim 36, further comprising:

the advertising measurement system being configured to receive market touchpoint data and demographic data from one or more data suppliers, the received data being grouped by one or more account numbers associated with a household of a consumer and not including any personally identifiable information associated with the household;

a module configured to facilitate parallel communication of at least the demographic data and the market touchpoint data from the data suppliers to a list matcher, the communicated data including personally identifiable information associated with the household and the account numbers associated with the household and excluding the market touchpoint data and the demographic data;

a module configured to receive a thesaurus from the list matcher, wherein the thesaurus relates each account number of the household to other account numbers associated with the same household; and, a module configured to use the thesaurus to match data received from the data suppliers for associating data relating to the household to records for the household in the advertising measurement system.

56. The system of claim 36, further comprising a module configured to use at least a portion of the matched data to drive at least one addressable commercial to the household.

57. The system of claim 36, further comprising:

a module configured to receive market touchpoint data in the advertising measurement system; and, the processor further configured to match the market touchpoint data with at least a portion of the matched advertising data, clickstream data, purchase data, and program data.

58. The system of claim 36, further comprising a module configured for receiving supplemental household data from an advertiser in the advertising measurement system.

59. The system of claim 36, further comprising a module configured for facilitating direct data communication between the advertising measurement system and a computer system of an advertiser via at least one application program interface.

60. The system of claim 36, wherein the purchase data is associated with product purchase records of a consumer held by at least one of a manufacturer, a distributor, or a retailer.

61. The system of claim 36, wherein the purchase data is associated with product purchase records of a discount card associated with the consumer.

62. The system of claim 36, wherein the purchase data is associated with product warranty card completed by the consumer.

63. The system of claim 36, further comprising a module configured for generating a true target index report in the advertising measurement system.

64. The system of claim 36, further comprising a module configured for generating a return on investment report in the advertising measurement system.

65. The system of claim 36, further comprising a module configured for calculating a cost of an advertisement per viewing.

66. The system of claim 36, further comprising a module configured for calculating a percentage increase in spending of households increasing consumption of a given product.

67. The system of claim 36, further comprising a module configured for calculating the return on investment metric in response to one or more advertisements aired during a base period with respect to spending by the consumer in an analysis period.

68. The system of claim 36, further comprising a module configured for using at least a portion of the collected data, to drive at least one addressable commercial to the household in response to the calculated return on investment metric.

69. The system of claim 36, further comprising a module configured for facilitating at least one multivariate analysis in connection with the matched data to generate a predictive estimate of the contribution of each component in the multivariate analysis to a sales effect of advertising associated with a brand.

70. A non-transitory computer-readable memory storage device including instructions for directing a computer system to execute a method for facilitating analysis of consumer behavior in association with advertising exposure or program delivery, the device comprising:
- instructions for collecting clickstream data from a program delivery source of a consumer, wherein collecting the clickstream data is not dependent on a supplemental data collection device, and also wherein the collected clickstream data includes household level data associated with multiple consumer households;
- instructions for collecting advertising data associated with delivery of the program by the program delivery source, wherein collecting the advertising data is not dependent on a supplemental data collection device, and also wherein the collected advertising data includes household level data associated with multiple consumer households;
- instructions for collecting program data associated with the program delivered on the program delivery source, wherein collecting the program data is not dependent on a supplemental data collection device, and also wherein the collected program data includes household level data associated with multiple consumer households; and,
- instructions for collecting purchase data from a purchase data source, wherein collecting the purchase data is not dependent on a supplemental data collection device, and also wherein the collected purchase data includes household level data associated with multiple consumer households;
- instructions for matching at least portions of the collected advertising data, the collected clickstream data; the collected purchase data, and the collected program data at a household data level with a centrally located electronic computer processor configured for centrally processing data received from the program delivery source, the advertising data source, the program data source, and the purchase data source, wherein the matching instructions further include:
  (i) instructions for grouping the collected data in association with an account identifier of each consumer household without processing any personally identifiable information associated with the consumer household, and
  (ii) instructions for matching each account identifier associated with each consumer household with other account identifiers associated with the same consumer household without processing any personally identifiable information associated with the consumer household;
- instructions for storing the matched advertising data, clickstream data, purchase data, and program data in at least one centrally located electronic data storage medium operatively associated with the computer processor;
- instructions for applying at least one cleansing and editing algorithm to the matched and stored data; and,
- instructions for calculating at least one return on investment metric based on the matched and stored data.

71. A computer-implemented method for facilitating analysis of consumer behavior in association with advertising exposure or program delivery, the method comprising:
- collecting in an advertising measurement system:
  (i) clickstream data from a program delivery source of a consumer, wherein collecting the clickstream data is not dependent on a supplemental data collection device, and also wherein the collected clickstream data includes household level data associated with multiple consumer households;
  (ii) advertising data associated with delivery of the program by the program delivery source, wherein collecting the advertising data is not dependent on a supplemental data collection device, and also wherein the collected advertising data includes household level data associated with multiple consumer households;
  (iii) program data associated with the program delivered on the program delivery source, wherein collecting the program data is not dependent on a supplemental data collection device, and also wherein the collected program data includes household level data associated with multiple consumer households; and,
  (iv) purchase data from a purchase data source, wherein collecting the purchase data is not dependent on a supplemental data collection device, and also wherein the collected purchase data includes household level data associated with multiple consumer households;
- matching at least portions of the collected advertising data, the collected clickstream data, the collected purchase data, and the collected program data in the advertising measurement system at a household data level with a centrally located electronic computer processor configured for centrally processing data received from the program delivery source, the advertising data source, the program data source, and the purchase data source, wherein the matching further includes:
(i) grouping the collected data in association with an account identifier of each consumer household without processing any personally identifiable information associated with the consumer household, and
(ii) matching each account identifier associated with each consumer household with other account identifiers associated with the same consumer household without processing any personally identifiable information associated with the consumer household;

storing the matched advertising data, clickstream data, purchase data, and program data in at least one centrally located electronic data storage medium operatively associated with the computer processor;

applying at least one cleansing and editing algorithm to the matched and stored data; and, calculating at least one true target index metric based on the matched and stored data.

\* \* \* \* \*